(12) United States Patent
Chang et al.

(10) Patent No.: US 10,203,484 B2
(45) Date of Patent: *Feb. 12, 2019

(54) OPTICAL IMAGE CAPTURING SYSTEM

(71) Applicant: ABILITY OPTO-ELECTRONICS TECHNOLOGY CO. LTD., Taichung (TW)

(72) Inventors: Yeong-Ming Chang, Taichung (TW); Chien-Hsun Lai, Taichung (TW); Yao-Wei Liu, Taichung (TW)

(73) Assignee: ABILITY OPTO-ELECTRONICS TECHNOLOGY CO. LTD., Taichung (TW)

(*) Notice: Subject to any disclaimer, the term of this patent is extended or adjusted under 35 U.S.C. 154(b) by 0 days.

This patent is subject to a terminal disclaimer.

(21) Appl. No.: 15/386,704

(22) Filed: Dec. 21, 2016

(65) Prior Publication Data

US 2018/0059368 A1 Mar. 1, 2018

(30) Foreign Application Priority Data

Aug. 23, 2016 (TW) .............................. 105126951 A

(51) Int. Cl.
| | | |
|---|---|---|
| *G02B 13/00* | (2006.01) | |
| *G02B 9/62* | (2006.01) | |
| *G02B 5/00* | (2006.01) | |
| *G02B 5/20* | (2006.01) | |
| *G02B 27/00* | (2006.01) | |
| *G02B 13/18* | (2006.01) | |
| *G02B 5/22* | (2006.01) | |

(52) U.S. Cl.
CPC ........... *G02B 13/008* (2013.01); *G02B 5/005* (2013.01); *G02B 5/208* (2013.01); *G02B 5/226* (2013.01); *G02B 9/62* (2013.01); *G02B 13/0045* (2013.01); *G02B 13/18* (2013.01); *G02B 27/0025* (2013.01)

(58) Field of Classification Search
None
See application file for complete search history.

(56) References Cited

U.S. PATENT DOCUMENTS

| | | | |
|---|---|---|---|
| 9,904,014 B1* | 2/2018 | Chang | G02B 6/2848 |
| 2015/0062720 A1* | 3/2015 | Lai | G02B 13/04 |
| | | | 359/713 |
| 2017/0269336 A1* | 9/2017 | Lai | G02B 13/0045 |
| 2018/0059369 A1* | 3/2018 | Chang | G02B 5/005 |
| 2018/0074290 A1* | 3/2018 | Chang | G02B 5/208 |
| 2018/0074291 A1* | 3/2018 | Chang | G02B 27/0025 |
| 2018/0106979 A1* | 4/2018 | Chang | G02B 7/02 |

(Continued)

*Primary Examiner* — Derek S Chapel
(74) *Attorney, Agent, or Firm* — Muncy, Geissler, Olds & Lowe, P.C.

(57) ABSTRACT

A six-piece optical lens for capturing image and a six-piece optical module for capturing image are provided. In the order from an object side to an image side, the optical lens along the optical axis includes a first lens element with refractive power, a second lens element with refractive power, a third lens element with refractive power, a fourth lens element with refractive power, a fifth lens element with refractive power and a sixth element lens with refractive power. At least one of the image-side surface and object-side surface of each of the six lens elements is aspheric. The optical lens can increase aperture value and improve the imaging quality for use in compact cameras.

23 Claims, 30 Drawing Sheets

(56) References Cited

U.S. PATENT DOCUMENTS

2018/0106985 A1* 4/2018 Chang ................. G02B 13/008
2018/0188489 A1* 7/2018 Chang ................ G02B 13/0045
2018/0188490 A1* 7/2018 Chang ................ G02B 13/0045

* cited by examiner

OPTICAL IMAGE CAPTURING SYSTEM

CROSS-REFERENCE TO RELATED APPLICATION

This application claims priority from Taiwan Patent Application No. 105126951, filed on Aug. 23, 2016, in the Taiwan Intellectual Property Office, the content of which is hereby incorporated by reference in its entirety for all purposes.

BACKGROUND OF THE INVENTION

1. Field of the Invention

The present disclosure relates to an optical image capturing system, and more particularly to a compact optical image capturing system which can be applied to electronic products.

2. Description of the Related Art

In recent years, the popularization of portable electronic devices with camera functionalities has spurred the demand for optical image capturing systems. The image sensing device of ordinary photographing camera is commonly selected from charge coupled device (CCD) or complementary metal-oxide semiconductor sensor (CMOS Sensor). Owing to the advancement in semiconductor devices manufacturing technology, the pixel size of the image sensing device is gradually minimized, and this allows more pixels to be squeezed into the image sensing device. Therefore, more and more high resolution optical image capturing systems are developed, and the bar for the image quality of the optical image capturing system is raised accordingly.

Conventional optical image capturing systems of portable electronic devices usually adopt four-lens or five-lens designs. However, since the resolution of the portable electronic devices is improving constantly, not to mention more and more end-users are demanding for cameras having large aperture, which is equipped with functionalities such as low light mode or night mode, the optical image capturing systems of the state of the art may not be sufficient to meet those advanced photography requirements.

Therefore, it is a pressing issue to come up a way to effectively increase the amount of light admitted into the optical image capturing system and improve the image quality thereof.

SUMMARY OF THE INVENTION

The aspect of embodiment of the present disclosure directs to an optical image capturing system and an optical image capturing lens which use combination of refractive powers, convex and concave surfaces of six-piece optical lenses (the convex or concave surface in the disclosure denotes the change of geometrical shape of an object-side surface or an image-side surface of each lens element at different heights from an optical axis) to increase the amount of light admitted into the optical image capturing system, and to improve quality of image formation, so that the optical image capturing system can be disposed in minimized electronic products.

Furthermore, when it comes to certain application of optical imaging, there will be a need to capture image via light sources with wavelengths in both visible and infrared ranges, an example of this kind of application is IP video surveillance camera, which is equipped with the Day & Night function. The visible spectrum for human vision has wavelengths ranging from 400 to 700 nm, but the image formed on the camera sensor includes infrared light, which is invisible to human eyes. Therefore, under certain circumstances, an IR cut filter removable (ICR) is placed before the sensor of the IP video surveillance camera, in order to ensure that only the light that is visible to human eyes is picked up by the sensor eventually, so as to enhance the "fidelity" of the image. The ICR of the IP video surveillance camera can completely filter out the infrared light under daytime mode to avoid color cast; whereas under night mode, it allows infrared light to pass through the lens to enhance the image brightness. Nevertheless, the elements of the ICR occupy a significant amount of space and are expensive, which impede to the design and manufacture of miniaturized surveillance cameras in the future.

The aspect of embodiment of the present disclosure directs to an optical image capturing system and an optical image capturing lens which utilize the combination of refractive powers, convex surfaces and concave surfaces of four lens elements, as well as the selection of materials thereof, to reduce the difference between the imaging focal length of visible light and imaging focal length of infrared light, in order to achieve the near "confocal" effect without the use of ICR elements.

The terms and their definition for the lens element parameters in the embodiment of the present invention are shown as below for further reference.

The Lens Element Parameters Related to the Magnification of the Optical Image Capturing System The optical image capturing system can be designed and applied to biometrics, for example, facial recognition. When the embodiment of the present disclosure is configured to capture image for facial recognition, the infrared light can be adopted as the operation wavelength. For a face of about 15 centimeters (cm) wide at a distance of 25-30 cm, at least 30 horizontal pixels can be formed in the horizontal direction of an image sensor (pixel size of 1.4 micrometers (μm)). The linear magnification of the infrared light on the image plane is LM, and it meets the following conditions: LM≥0.0003, where LM=(30 horizontal pixels)*(1.4 μm pixel size)/(15 cm, width of the photographed object). Alternatively, the visible light can also be adopted as the operation wavelength for image recognition. When the visible light is adopted, for a face of about 15 cm wide at a distance of 25-30 cm, at least 50 horizontal pixels can be formed in the horizontal direction of an image sensor (pixel size of 1.4 micrometers (μm)).

The Lens Element Parameter Related to a Length or a Height in the Lens Element

For visible spectrum, the present invention may adopt the wavelength of 555 nm as the primary reference wavelength and the basis for the measurement of focus shift; for infrared spectrum (700 nm-1300 nm), the present invention may adopt the wavelength of 850 nm as the primary reference wavelength and the basis for the measurement of focus shift.

The optical image capturing system includes a first image plane and a second image plane. The first image plane is an image plane specifically for the visible light, and the first image plane is perpendicular to the optical axis; the through-focus modulation transfer rate (value of MTF) at the first spatial frequency has a maximum value at the central field of view of the first image plane; the second image plane is an image plane specifically for the infrared light, and second image plane is perpendicular to the optical axis; the through-focus modulation transfer rate (value of MTF) at the first spatial frequency has a maximum value in the central of field of view of the second image plane. The optical image capturing system also includes a first average image plane and a second average image plane. The first average image plane is an image plane specifically for the visible light, and the first average image plane is perpendicular to the optical axis. The first average image plane is installed at the average position of the defocusing positions, where the values of MTF of the visible light at the central field of view, 0.3 field of view, and the 0.7 field of view are at their respective maximum at the first spatial frequency. The second average image plane is an image plane specifically for the infrared light, and the second average image plane is perpendicular to the optical axis. The second average image plane is installed at the average position of the defocusing positions, where the values of MTF of the infrared light at the central field of view, 0.3 field of view, and the 0.7 field of view are at their respective maximum at the first spatial frequency.

The aforementioned first spatial frequency is set to be half of the spatial frequency (half frequency) of the image sensor (sensor) used in the present invention. For example, for an image sensor having the pixel size of 1.12 μm or less, the quarter spatial frequency, half spatial frequency (half frequency) and full spatial frequency (full frequency) in the characteristic diagram of modulation transfer function are at least 110 cycles/mm, 220 cycles/mm and 440 cycles/mm, respectively. Lights of any field of view can be further divided into sagittal ray and tangential ray.

The focus shifts where the through-focus MTF values of the visible sagittal ray at the central field of view, 0.3 field of view, and 0.7 field of view of the optical image capturing system are at their respective maxima, are denoted by VSFS0, VSFS3, and VSFS7 (unit of measurement: mm), respectively. The maximum values of the through-focus MTF of the visible sagittal ray at the central field of view, 0.3 field of view, and 0.7 field of view are denoted by VSMTF0, VSMTF3, and VSMTF7, respectively. The focus shifts where the through-focus MTF values of the visible tangential ray at the central field of view, 0.3 field of view, and 0.7 field of view of the optical image capturing system are at their respective maxima, are denoted by VTFS0, VTFS3, and VTFS7 (unit of measurement: mm), respectively. The maximum values of the through-focus MTF of the visible tangential ray at the central field of view, 0.3 field of view, and 0.7 field of view are denoted by VTMTF0, VTMTF3, and VTMTF7, respectively. The average focus shift (position) of both the aforementioned focus shifts of the visible sagittal ray at three fields of view and focus shifts of the visible tangential ray at three fields of view is denoted by AVFS (unit of measurement: mm), which equals to the absolute value $|(VSFS0+VSFS3+VSFS7+VTFS0+VTFS3+VTFS7)/6|$.

The focus shifts where the through-focus MTF values of the infrared sagittal ray at the central field of view, 0.3 field of view, and 0.7 field of view of the optical image capturing system are at their respective maxima, are denoted by ISFS0, ISFS3, and ISFS7 (unit of measurement: mm), respectively. The average focus shift (position) of the aforementioned focus shifts of the infrared sagittal ray at three fields of view is denoted by AISFS (unit of measurement: mm). The maximum values of the through-focus MTF of the infrared sagittal ray at the central field of view, 0.3 field of view, and 0.7 field of view are denoted by ISMTF0, ISMTF3, and ISMTF7, respectively. The focus shifts where the through-focus MTF values of the infrared tangential ray at the central field of view, 0.3 field of view, and 0.7 field of view of the optical image capturing system are at their respective maxima, are denoted by ITFS0, ITFS3, and ITFS7 (unit of measurement: mm), respectively. The average focus shift (position) of the aforementioned focus shifts of the infrared tangential ray at three fields of view is denoted by AITFS (unit of measurement: mm). The maximum values of the through-focus MTF of the infrared tangential ray at the central field of view, 0.3 field of view, and 0.7 field of view are denoted by ITMTF0, ITMTF3, and ITMTF7, respectively. The average focus shift (position) of both of the aforementioned focus shifts of the infrared sagittal ray at the three fields of view and focus shifts of the infrared tangential ray at the three fields of view is denoted by AIFS (unit of measurement: mm), which equals to the absolute value of $|(ISFS0+ISFS3+ISFS7+ITFS0+ITFS3+ITFS7)/6|$.

The focus shift (difference) between the focal points of the visible light and the infrared light at their central fields of view (RGB/IR) of the entire optical image capturing system (i.e. wavelength of 850 nm versus wavelength of 555 nm, unit of measurement: mm) is denoted by FS, which satisfies the absolute value $|(VSFS0+VTFS0)/2-(ISFS0+ITFS0)/2|$. The difference (focus shift) between the average focus shift of the visible light in the three fields of view and the average focus shift of the infrared light in the three fields of view (RGB/IR) of the entire optical image capturing system is denoted by AFS (i.e. wavelength of 850 nm versus wavelength of 555 nm, unit of measurement: mm), which equals to the absolute value of $|AIFS-AVFS|$.

The maximum height of an image formed by the optical image capturing system is denoted by HOI. The height of the optical image capturing system is denoted by HOS. The distance from the object-side surface of the first lens element to the image-side surface of the sixth lens element is denoted by InTL. The distance from an aperture stop (aperture) to the first image plane is denoted by InS. The distance from the first lens element to the second lens element is denoted by In12 (example). The central thickness of the first lens element of the optical image capturing system on the optical axis is denoted by TP1 (example).

The Lens Element Parameter Related to the Material in the Lens Element

An Abbe number of the first lens element in the optical image capturing system is denoted by NA1 (example). A refractive index of the first lens element is denoted by Nd1 (example).

The Lens Element Parameter Related to View Angle in the Lens Element

A view angle is denoted by AF. Half of the view angle is denoted by HAF. A major light angle is denoted by MRA.

The Lens Element Parameter Related to Exit/Entrance Pupil in the Lens Element

An entrance pupil diameter of the optical image capturing system is denoted by HEP. The exit pupil diameter of the optical image capturing system is the image formed with respect to the image space after the light passing through lens elements assembly behind the aperture stop. The exit pupil diameter is denoted by HXP. The maximum effective half diameter (EHD) of any surface of a single lens element refers to a perpendicular height between the optical axis and an intersection point, and the intersection point is where the incident ray with the maximum angle of view passes through the outermost edge of the entrance pupil and intersects with the surface of the lens element. For example, the maximum effective half diameter of the object-side surface of the first lens element is denoted by EHD 11. The maximum effective half diameter of the image-side surface of the first lens element is denoted by EHD 12. The maximum effective half diameter of the object-side surface of the second lens element is denoted by EHD 21. The maximum effective half diameter of the image-side surface of the second lens element is denoted by EHD 22. The maximum effective half diameters of any surfaces of other lens elements in the optical image capturing system are denoted in the similar way.

The Lens Element Parameter Related to the Arc Length of the Lens Element Shape and the Outline of Surface The length of the maximum effective half diameter outline curve at any surface of a single lens element refers to an arc length of a curve, which starts from an axial point on the surface of the lens element, travels along the surface outline of the lens element, and ends at the intersection point that defines the maximum effective half diameter, and this arc length is denoted as ARS. For example, the length of the maximum effective half diameter outline curve of the object-side surface of the first lens element is denoted as ARS11. The length of the maximum effective half diameter outline curve of the image-side surface of the first lens element is denoted as ARS12. The length of the maximum effective half diameter outline curve of the object-side surface of the second lens element is denoted as ARS21. The length of the maximum effective half diameter outline curve of the image-side surface of the second lens element is denoted as ARS22. The lengths of the maximum effective half diameter outline curve of any surface of other lens elements in the optical image capturing system are denoted in the similar way.

The length of ½ entrance pupil diameter (HEP) outline curve of any surface of a single lens element refers to an arc length of curve, which starts from an axial point on the surface of the lens element, travels along the surface outline of the lens element, and ends at a coordinate point on the surface where the vertical height from the optical axis to the coordinate point is equivalent to ½ entrance pupil diameter; the arc length is denoted as ARE. For example, the length of the ½ entrance pupil diameter (HEP) outline curve of the object-side surface of the first lens element is denoted as ARE11. The length of the ½ entrance pupil diameter (HEP) outline curve of the image-side surface of the first lens element is denoted as ARE12. The length of the ½ entrance pupil diameter (HEP) outline curve of the object-side surface of the second lens element is denoted as ARE21. The length of the ½ entrance pupil diameter (HEP) outline curve of the image-side surface of the second lens element is denoted as ARE22. The lengths of the ½ entrance pupil diameter (HEP) outline curve of any surfaces of the other lens elements in the optical image capturing system are denoted in the similar way.

The Lens Element Parameter Related to the Surface Depth of the Lens Element

The distance paralleling an optical axis, which is measured from the axial point on the object-side surface of the sixth lens element to the terminal point of the maximum effective half diameter outline curve on the object-side surface of the sixth lens element is denoted by InRS61 (depth of the EHD). The distance paralleling an optical axis, which is measured from the axial point on the image-side surface of the sixth lens element to the terminal point of the maximum effective half diameter outline curve on the image-side surface of the sixth lens element is denoted by InRS62 (depth of the EHD). The depths of the EHD (sinkage values) on any surfaces of other lens elements in the optical image capturing system are denoted in similar way.

The Lens Element Parameter Related to the Shape of the Lens Element

The critical point C is any point but the axial point on a surface of a specific lens element, where the tangent plane to the surface at that point is perpendicular to the optical axis. Therefore, the perpendicular distance between the critical point C51 on the object-side surface of the fifth lens element and the optical axis is HVT51 (example). The perpendicular distance between a critical point C52 on the image-side surface of the fifth lens element and the optical axis is HVT52 (example). The perpendicular distance between the critical point C61 on the object-side surface of the sixth lens element and the optical axis is HVT61 (example). The perpendicular distance between a critical point C62 on the image-side surface of the sixth lens element and the optical axis is HVT62 (example). The perpendicular distances between the critical point on the image-side surface or object-side surface of other lens elements and the optical axis are denoted in similar fashion.

The inflection point on object-side surface of the sixth lens element that is nearest to the optical axis is denoted by IF611, and the sinkage value of that inflection point IF611 is denoted by SGI611 (example). The sinkage value SGI611 is a horizontal distance paralleling the optical axis, which is measured from an axial point on the object-side surface of the sixth lens element to the inflection point nearest to the optical axis on the object-side surface of the sixth lens element. The distance perpendicular to the optical axis between the inflection point IF611 and the optical axis is HIF611 (example). The inflection point on image-side surface of the sixth lens element that is nearest to the optical axis is denoted by IF621, and the sinkage value of that inflection point IF621 is denoted by SGI621 (example). The sinkage value SGI621 is a horizontal distance paralleling the optical axis, which is measured from the axial point on the image-side surface of the sixth lens element to the inflection point nearest to the optical axis on the image-side surface of the sixth lens element. The distance perpendicular to the optical axis between the inflection point IF621 and the optical axis is HIF621 (example).

The inflection point on object-side surface of the sixth lens element that is second nearest to the optical axis is denoted by IF612, and the sinkage value of that inflection point IF612 is denoted by SGI612 (example). The sinkage value SGI612 is a horizontal distance paralleling the optical axis, which is measured from an axial point on the object-side surface of the sixth lens element to the inflection point nearest to the optical axis on the object-side surface of the sixth lens element. The distance perpendicular to the optical axis between the inflection point IF612 and the optical axis is HIF612 (example). The inflection point on image-side surface of the sixth lens element that is second nearest to the optical axis is denoted by IF622, and the sinkage value of that inflection point IF622 is denoted by SGI622 (example). The sinkage value SGI622 is a horizontal distance paralleling the optical axis, which is measured from the axial point on the image-side surface of the sixth lens element to the inflection point second nearest to the optical axis on the image-side surface of the sixth lens element. The distance perpendicular to the optical axis between the inflection point IF622 and the optical axis is HIF622 (example).

The inflection point on object-side surface of the sixth lens element that is third nearest to the optical axis is denoted by IF613, and the sinkage value of that inflection point IF613 is denoted by SGI613 (example). The sinkage value SGI613 is a horizontal distance paralleling the optical axis, which is measured from an axial point on the object-side surface of the sixth lens element to the inflection point third nearest to the optical axis on the object-side surface of the sixth lens element. The distance perpendicular to the optical axis between the inflection point IF613 and the optical axis is HIF613 (example). The inflection point on image-side surface of the sixth lens element that is third nearest to the optical axis is denoted by IF623, and the sinkage value of that inflection point IF623 is denoted by SGI623 (example). The sinkage value SGI623 is a horizontal distance paralleling the optical axis, which is measured from the axial point on the image-side surface of the sixth lens element to the inflection point third nearest to the optical axis on the image-side surface of the sixth lens element. The distance perpendicular to the optical axis between the inflection point IF623 and the optical axis is HIF623 (example).

The inflection point on object-side surface of the sixth lens element that is fourth nearest to the optical axis is denoted by IF614, and the sinkage value of that inflection point IF614 is denoted by SGI614 (example). The sinkage value SGI614 is a horizontal distance paralleling the optical axis, which is measured from an axial point on the object-side surface of the sixth lens element to the inflection point fourth nearest to the optical axis on the object-side surface of the sixth lens element. The distance perpendicular to the optical axis between the inflection point IF614 and the optical axis is HIF614 (example). The inflection point on image-side surface of the sixth lens element that is fourth nearest to the optical axis is denoted by IF624, and the sinkage value of that inflection point IF624 is denoted by SGI624 (example). The sinkage value SGI624 is a horizontal distance paralleling the optical axis, which is measured from the axial point on the image-side surface of the sixth lens element to the inflection point fourth nearest to the optical axis on the image-side surface of the sixth lens element. The distance perpendicular to the optical axis between the inflection point IF624 and the optical axis is HIF624 (example).

The inflection points on the object-side surface or the image-side surface of the other lens elements and the perpendicular distances between them and the optical axis, or the sinkage values thereof are denoted in the similar way described above.

The Lens Element Parameter Related to the Aberration

Optical distortion for image formation in the optical image capturing system is denoted by ODT. TV distortion for image formation in the optical image capturing system is denoted by TDT. Furthermore, the degree of aberration offset within the range of 50% to 100% field of view of the formed image can be further illustrated. The offset of the spherical aberration is denoted by DFS. The offset of the coma aberration is denoted by DFC.

The transverse aberration of the edge of the aperture is defined as STOP Transverse Aberration (STA), which assesses the specific performance of the optical image capturing system. The tangential fan or sagittal fan may be used to calculate the STA of any fields of view, and in particular, to calculate the STAs of the longest operation wavelength (e.g. 650 nm) and the shortest operation wavelength (e.g. 470 nm), which serve as the standard to indicate the performance. The aforementioned direction of the tangential fan can be further defined as the positive- (overhead-light) and negative- (lower-light) directional tangential fans. The STA of the longest operation wavelength is defined as the distance between the position of the image formed when the longest operation wavelength passing through the edge of the entrance pupil strikes a specific field of view of the first image plane and the image position of the reference primary wavelength (e.g. wavelength of 555 nm) on specific field of view of the first image plane. Whereas the STA of the shortest operation wavelength is defined as the distance between the position of the image formed when the shortest operation wavelength passing through the edge of the entrance pupil strikes a specific field of view of the first image plane and the image position of the reference primary wavelength on a specific field of view of the first image plane. The criteria for the optical image capturing system to be qualified as having excellent performance may be set as: both STA of the incident longest operation wavelength and the STA of the incident shortest operation wavelength at 70% of the field of view of the first image plane (i.e. 0.7 HOI) have to be less than 100 µm or even less than 80 µm.

The optical image capturing system has a maximum image height HOI on the first image plane perpendicular to the optical axis. In the optical image capturing system, the transverse aberration of the visible rays with the longest operation wavelength from the positive-directional tangential fan, which pass through an edge of the entrance pupil and strike at the position of 0.7 HOI on the first image plane, is denoted as PLTA. The transverse aberration of the visible rays with the shortest operation wavelength from the positive-directional tangential fan, which pass through the edge of the entrance pupil and strike at the position of 0.7 HOI on the first image plane, is denoted as PSTA. The transverse aberration of the visible rays with the longest operation wavelength from negative-directional tangential fan, which pass through the edge of the entrance pupil and strike at the position of 0.7 HOI on the first image plane, is denoted as NLTA. The transverse aberration of the visible rays with the shortest operation wavelength from a negative-directional tangential fan, which pass through the edge of the entrance pupil and strike at the position of 0.7 HOI on the first image plane, is denoted as NSTA. The transverse aberration of the visible rays with the longest operation wavelength from a sagittal fan, which pass through the edge of the entrance pupil and strike at the position of 0.7 HOI on the first image plane, is denoted as SLTA. The transverse aberration of the visible rays with the shortest operation wavelength from the sagittal fan, which pass through the edge of the entrance pupil and strike at the position of 0.7 HOI on the first image plane, is denoted as SSTA.

The disclosure provides an optical image capturing system, the object-side surface or the image-side surface of the sixth lens element may have inflection points, such that the angle of incidence from each field of view to the sixth lens element can be adjusted effectively and the optical distortion and the TV distortion can be corrected as well. Besides, the surfaces of the sixth lens element may be endowed with better capability to adjust the optical path, which yields better image quality.

An optical image capturing system is provided in accordance with the present disclosure. In the order from an object side to an image side, the optical image capturing system includes a first lens element, a second lens element, a third lens element, a fourth lens element, a fifth lens element, a sixth lens element, a first image plane, and a second image plane. The first image plane is an image plane specifically for the visible light, and the first image plane is perpendicular to the optical axis; the through-focus modulation transfer rate (value of MTF) at the first spatial frequency has a maximum value at the central field of view of the first image plane; the second image plane is an image plane specifically for the infrared light, and second image plane is perpendicular to the optical axis; the through-focus modulation transfer rate (value of MTF) at the first spatial frequency has a maximum value at the central of field of view of the second image plane. The first through fifth lens elements all have refractive powers. The focal lengths of the first lens element to the sixth lens element are f1, f2, f3, f4, f5 and f6 respectively. The focal length of the optical image capturing system is f. The entrance pupil diameter of the optical image capturing system is HEP. The distance on the optical axis from an object-side surface of the first lens element to the first image plane is HOS. Half of the maximum angle of view of the optical image capturing system is denoted by HAF. The maximum image height on the first image plane perpendicular to the optical axis of the optical image capturing system is HOI. The distance on the optical axis between the first image plane and the second image plane is denoted by FS. The following conditions are satisfied: $1 \leq f/HEP \leq 10$, 0 deg$<HAF \leq 150$ deg, and $|FS| \leq 60$ μm.

Another optical image capturing system is further provided in accordance with the present disclosure. In the order from an object side to an image side, the optical image capturing system includes a first lens element, a second lens element, a third lens element, a fourth lens element, a fifth lens element, a sixth lens element, a first image plane, and a second image plane. The first image plane is an image plane specifically for the visible light, and the first image plane is perpendicular to the optical axis; the through-focus modulation transfer rate (value of MTF) at the first spatial frequency has a maximum value at the central field of view of the first image plane; the second image plane is an image plane specifically for the infrared light, and second image plane is perpendicular to the optical axis; the through-focus modulation transfer rate (value of MTF) at the first spatial frequency has a maximum value at the central of field of view of the second image plane. The first lens element may have refractive power and a convex portion on the object-side surface thereof near the optical axis. The second lens element may have refractive power. The third lens element has refractive power. The fourth, fifth and sixth lens elements have refractive powers. At least one of the first to sixth lens elements may be made of glass and have positive refractive power. The focal lengths of the first to sixth lens elements are f1, f2, f3, f4, f5, and f6 respectively. The focal length of the optical image capturing system is f. The entrance pupil diameter of the optical image capturing system is HEP. The distance on the optical axis from an object-side surface of the first lens element to the first image plane is HOS. Half of the maximum angle of view of the optical image capturing system is denoted by HAF. The maximum image height on the first image plane perpendicular to the optical axis of the optical image capturing system is denoted by HOI. The distance on the optical axis between the first image plane and the second image plane is denoted by FS. The outline curve starting from an axial point on any surface of any one of those lens elements, tracing along the outline of the surface, ending at a coordinate point on the surface that has a vertical height of ½ entrance pupil diameter from the optical axis is defined, and the length of the outline curve is denoted by ARE. The following conditions are satisfied: $1.0 \leq f/HEP \leq 10$, 0 deg$\leq HAF \leq 150$ deg, $0.9 \leq 2(ARE/HEP) \leq 2.0$, and $|FS| \leq 60$ μm.

Yet another optical image capturing system is further provided in accordance with the present disclosure. In the order from an object side to an image side, the optical image capturing system includes a first lens element, a second lens element, a third lens element, a fourth lens element, a first average image plane, and a second average image plane. The first average image plane is an image plane specifically for the visible light, and the first average image plane is perpendicular to the optical axis. The first average image plane is installed at the average position of the defocusing positions, where the values of MTF of the visible light at the central field of view, 0.3 field of view, and the 0.7 field of view are at their respective maximum at the first spatial frequency. The second average image plane is an image plane specifically for the infrared light, and the second average image plane is perpendicular to the optical axis. The second average image plane is installed at the average position of the defocusing positions, where the values of MTF of the infrared light at the central field of view, 0.3 field of view, and the 0.7 field of view are at their respective maximum at the first spatial frequency. The optical image capturing system may include six lens elements with refractive powers. At least one of the first to sixth lens elements may be made of glass. The first to sixth lens elements may have refractive powers. The focal lengths of the first to sixth lens elements are f1, f2, f3, f4, f5 and f6 respectively. The focal length of the optical image capturing system is f. The entrance pupil diameter of the optical image capturing system is HEP. The distance on the optical axis from an object-side surface of the first lens element to the first average image plane is HOS. Half of the maximum angle of view of the optical image capturing system is denoted by HAF. The maximum image height on the first average image plane perpendicular to the optical axis of the optical image capturing system is HOI. An outline curve starting from an axial point on any surface of any one of those lens elements, tracing along the outline of the surface, and ending at a coordinate point on the surface that has a vertical height of ½ entrance pupil diameter from the optical axis is defined, and the length of the outline curve is denoted by ARE. The distance between the first average image plane and the second average image plane is denoted by AFS. The following conditions are satisfied: $1.0 \leq f/HEP \leq 10$, 0 deg$\leq HAF \leq 150$ deg, $0.9 \leq 2(ARE/HEP) \leq 2.0$, and $|AFS| \leq 60$ μm.

The length of the outline curve of any surface of single lens element within the range of maximum effective half diameter affects the performance in correcting the surface aberration and the optical path difference between the rays in each field of view. The longer outline curve may lead to a better performance in aberration correction, but the difficulty of the production may become higher. Hence, the length of the outline curve (ARS) of any surface of a single lens element within the range of the maximum effective half diameter has to be controlled, and especially, the proportional relationship (ARS/TP) between the length of the outline curve (ARS) of the surface within the range of the maximum effective half diameter and the central thickness (TP) of the lens element to which the surface belongs on the optical axis has to be controlled. For example, the length of the maximum effective half diameter outline curve of the object-side surface of the first lens element is denoted as ARS11, and the central thickness of the first lens element on the optical axis is TP1, and the ratio between both of them is ARS11/TP1. The length of the maximum effective half diameter outline curve of the image-side surface of the first lens element is denoted as ARS12, and the ratio between ARS12 and TP1 is ARS12/TP1. The length of the maximum effective half diameter outline curve of the object-side surface of the second lens element is denoted as ARS21, and the central thickness of the second lens element on the optical axis is TP2, and the ratio between both of them is ARS21/TP2. The length of the maximum effective half diameter outline curve of the image-side surface of the second lens element is denoted as ARS22, and the ratio between ARS22 and TP2 is ARS22/TP2. The proportional relationships between the lengths of the maximum effective half diameter outline curve of any surface of the other lens elements and the central thicknesses (TP) of the lens elements to which the surfaces belong on the optical axis are denoted in the similar way.

The length of ½ entrance pupil diameter outline curve of any surface of a single lens element particularly affects its performance in correcting the aberration in the shared region of each field of view and the optical path difference among each field of view. The longer outline curve may lead to a better function of aberration correction, but the difficulty in the production of such lens may become higher. Hence, the length of ½ entrance pupil diameter outline curve of any surface of a single lens element has to be controlled, and especially, the proportional relationship between the length of ½ entrance pupil diameter outline curve of any surface of a single lens element and the central thickness on the optical axis has to be controlled. For example, the length of the ½ entrance pupil diameter outline curve of the object-side surface of the first lens element is denoted as ARE11, and the central thickness of the first lens element on the optical axis is TP1, and the ratio thereof is ARE11/TP1. The length of the ½ entrance pupil diameter outline curve of the image-side surface of the first lens element is denoted as ARE12, and the central thickness of the first lens element on the optical axis is TP1, and the ratio thereof is ARE12/TP1. The length of the ½ entrance pupil diameter outline curve of the object-side surface of the first lens element is denoted as ARE21, and the central thickness of the second lens element on the optical axis is TP2, and the ratio thereof is ARE21/TP2. The length of the ½ entrance pupil diameter outline curve of the image-side surface of the second lens element is denoted as ARE22, and the central thickness of the second lens element on the optical axis is TP2, and the ratio thereof is ARE22/TP2. The ratios of the ½ HEP outline curves on any surface of the remaining lens elements of the optical image capturing system to the central thicknesses (TP) of that lens element can be computed in similar way.

The height of optical system (HOS) may be reduced to achieve the minimization of the optical image capturing system when the absolute value of f1 is larger than f6 (|f1|>f6).

When |f2|+|f3|+|f4|+|f5| and |f1|+|f6| satisfy the aforementioned conditions, at least one of the second through fifth lens elements may have a weak positive refractive power or a weak negative refractive power. The weak refractive power indicates that an absolute value of the focal length of a specific lens element is greater than 10. When at least one of the second through fifth lens elements has the weak positive refractive power, the positive refractive power of the first lens element can be shared by it, such that the unnecessary aberration will not appear too early. On the contrary, when at least one of the second and third lens elements has the weak negative refractive power, the aberration of the optical image capturing system can be slightly corrected.

The sixth lens element may have negative refractive power, and the image-side surface thereof may be a concave surface. With this configuration, the back focal distance of the optical image capturing system may be shortened and the system may be minimized. Besides, at least one surface of the sixth lens element may possess at least one inflection point, which is capable of effectively reducing the incident angle of the off-axis rays, thereby further correcting the off-axis aberration.

BRIEF DESCRIPTION OF THE DRAWINGS

The detailed structure, operating principle and effects of the present disclosure will now be described in more details hereinafter with reference to the accompanying drawings that show various embodiments of the present disclosure as follows.

DESCRIPTION OF THE PREFERRED EMBODIMENTS

Figure 1A:
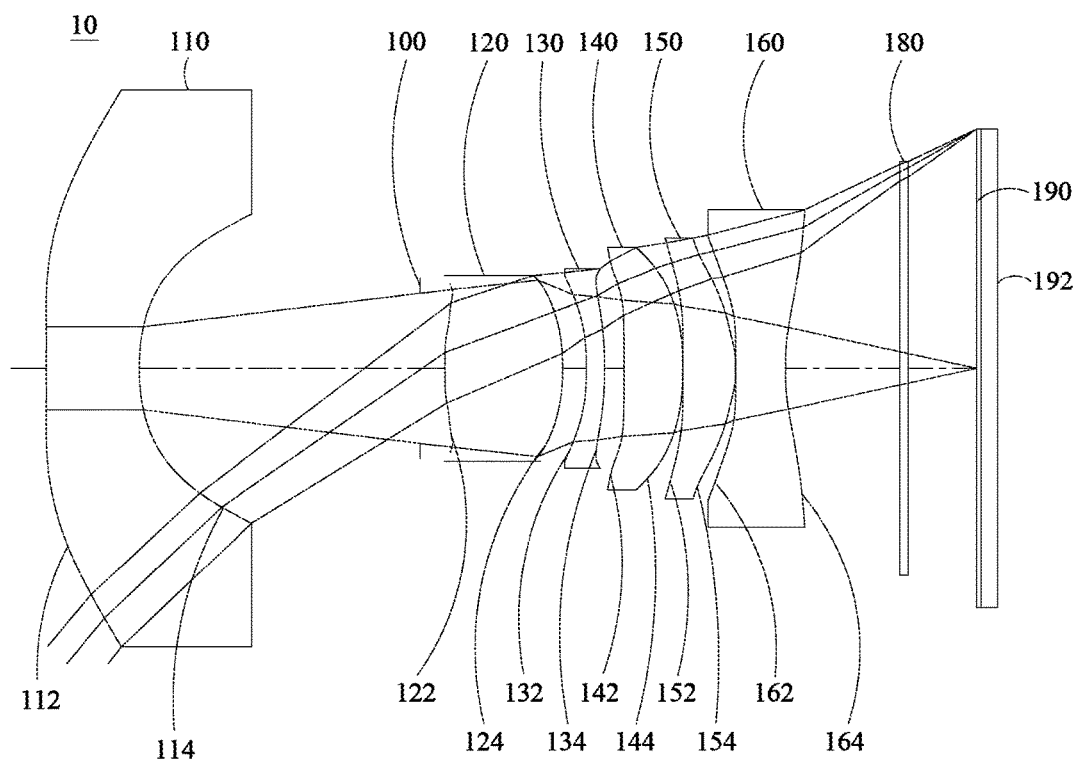
FIG. 1A is a schematic view of the optical image capturing system according to the first embodiment of the present invention.

The present invention has been described with some preferred embodiments thereof and it is understood that many changes and modifications in the described embodiments can be carried out without departing from the scope and the spirit of the invention that is intended to be limited only by the appended claims.

An optical image capturing system is provided, which includes, in the order from an object side to an image side, a first, second, third, fourth, fifth, and sixth lens elements with refractive power and an image plane. The optical image capturing system may further include an image sensing device, which is disposed on an image plane.

The optical image capturing system may use three sets of operation wavelengths, which are 486.1 nm, 587.5 nm and 656.2 nm, respectively, and 587.5 nm is served as the primary reference wavelength and a reference wavelength to obtain technical features of the optical system. The optical image capturing system may also use five sets of wavelengths which are 470 nm, 510 nm, 555 nm, 610 nm and 650 nm, respectively, and 555 nm is served as the primary reference wavelength and a reference wavelength to obtain technical features of the optical system.

The ratio of the focal length f of the optical image capturing system to a focal length fp of each lens element with positive refractive power is PPR. The ratio of the focal length f of the optical image capturing system to a focal length fn of each lens element with negative refractive power is NPR. The sum of the PPR of all lens elements with positive refractive powers is ΣPPR. The sum of the NPR of all lens elements with negative refractive powers is ΣNPR. The total refractive power and the total length of the optical image capturing system can be controlled easily when following conditions are satisfied: 0.5≤ΣPPR/|ΣNPR|≤15. Preferably, the following condition may be satisfied: 1≤ΣPPR/|ΣNPR|≤3.0.

The optical image capturing system may further include an image sensing device which is disposed on an image plane. Half of a diagonal of an effective detection field of the image sensing device (imaging height or the maximum image height of the optical image capturing system) is HOI. The distance on the optical axis from the object-side surface of the first lens element to the image plane is HOS. The following conditions are satisfied: HOS/HOI≤50 and 0.5≤HOS/f≤150. Preferably, the following conditions may be satisfied: 1≤HOS/HOI≤40 and 1≤HOS/f≤140. With this configuration, the size of the optical image capturing system can be kept small, such that a lightweight electronic product is able to accommodate it.

In addition, in the optical image capturing system of the disclosure, according to different requirements, at least one aperture stop may be arranged to reduce stray light and improve the imaging quality.

In the optical image capturing system of the disclosure, the aperture stop may be a front or middle aperture. The front aperture is the aperture stop between a photographed object and the first lens element. The middle aperture is the aperture stop between the first lens element and the image plane. In the case that the aperture stop is the front aperture, a longer distance between the exit pupil and the image plane of the optical image capturing system can be formed, such that more optical elements can be disposed in the optical image capturing system and the efficiency of the image sensing device in receiving image can be improved. In the case that the aperture stop is the middle aperture, the angle of view of the optical image capturing system can be expended, such that the optical image capturing system has the same advantage that is owned by wide angle cameras. The distance from the aperture stop to the image plane is InS. The following condition may be satisfied: $0.1 \leq \text{InS}/\text{HOS} \leq 1.1$. Therefore, the size of the optical image capturing system can be kept small without sacrificing the feature of wide angle of view.

In the optical image capturing system of the disclosure, the distance from the object-side surface of the first lens element to the image-side surface of the sixth lens element is InTL. The sum of central thicknesses of all lens elements with refractive power on the optical axis is $\Sigma TP$. The following condition may be satisfied: $0.1 \leq \Sigma TP/\text{InTL} \leq 0.9$. Therefore, the contrast ratio for the image formation in the optical image capturing system can be improved without sacrificing the yield rate for manufacturing the lens element, and a proper back focal length is provided to accommodate other optical components in the optical image capturing system.

The curvature radius of the object-side surface of the first lens element is R1. The curvature radius of the image-side surface of the first lens element is R2. The following condition is satisfied: $0.001 \leq |R1/R2| \leq 25$. Therefore, the first lens element may have a suitable magnitude of positive refractive power, so as to prevent the longitudinal spherical aberration from increasing too fast. Preferably, the following condition may be satisfied: $0.01 \leq |R1/R2| < 12$.

The curvature radius of the object-side surface of the sixth lens element is R11. The curvature radius of the image-side surface of the sixth lens element is R12. The following condition is satisfied: $-7<(R11-R12)/(R11+R12)<50$. This configuration is beneficial to the correction of the astigmatism generated by the optical image capturing system.

The distance between the first lens element and the second lens element on the optical axis is IN12. The following condition is satisfied: $\text{IN12}/f \leq 60$. Therefore, the chromatic aberration of the lens elements can be mitigated, such that their performance is improved.

The distance between the fifth lens element and the sixth lens element on the optical axis is IN56. The following condition is satisfied: $\text{IN56}/f \leq 3.0$. Therefore, the chromatic aberration of the lens elements can be mitigated, such that their performance is improved.

Central thicknesses of the first lens element and the second lens element on the optical axis are TP1 and TP2, respectively. The following condition may be satisfied: $0.1 \leq (TP1+IN12)/TP2 \leq 10$. Therefore, the sensitivity of the optical image capturing system can be controlled, and its performance can be improved.

Central thicknesses of the fifth lens element and the sixth lens element on the optical axis are TP5 and TP6, respectively, and the distance between that two lens elements on the optical axis is IN56. The following condition may be satisfied: $0.1 \leq (TP6+IN56)/TP5 \leq 15$. Therefore, the sensitivity of the optical image capturing system can be controlled and the total height of the optical image capturing system can be reduced.

The central thicknesses of the second, third and fourth lens elements on the optical axis are TP2, TP3 and TP4, respectively. The distance between the second lens element and the third lens element on the optical axis is IN23; the distance between the third lens element and the fourth lens element on the optical axis is IN34; the distance between the fourth lens element and the fifth lens element on the optical axis is IN45. The distance between the object-side surface of the first lens element and the image-side surface of the sixth lens element is denoted by InTL. The following condition may be satisfied: $0.1 \leq TP4/(IN34+TP4+IN45)<1$. Therefore, the aberration generated when the incident light is travelling inside the optical system can be corrected slightly layer upon layer, and the total height of the optical image capturing system can be reduced.

In the optical image capturing system of the first embodiment, a distance perpendicular to the optical axis between a critical point C61 on an object-side surface of the sixth lens element and the optical axis is HVT61. A distance perpendicular to the optical axis between a critical point C62 on an image-side surface of the sixth lens element and the optical axis is HVT62. A distance in parallel with the optical axis from an axial point on the object-side surface of the sixth lens element to the critical point C61 is SGC61. A distance in parallel with the optical axis from an axial point on the image-side surface of the sixth lens element to the critical point C62 is SGC62. The following conditions may be satisfied: $0 \text{ mm} \leq \text{HVT61} \leq 3 \text{ mm}$, $0 \text{ mm} < \text{HVT62} \leq 6 \text{ mm}$, $0 \leq \text{HVT61}/\text{HVT62}$, $0 \text{ mm} \leq |\text{SGC61}| \leq 0.5 \text{ mm}$; $0 \text{ mm} < |\text{SGC62}| \leq 2 \text{ mm}$, and $0 < |\text{SGC62}|/(|\text{SGC62}|+\text{TP6}) \leq 0.9$. Therefore, the off-axis aberration can be corrected effectively.

The following condition is satisfied for the optical image capturing system of the present disclosure: $0.2 \leq \text{HVT62}/\text{HOI} \leq 0.9$. Preferably, the following condition may be satisfied: $0.3 \leq \text{HVT62}/\text{HOI} \leq 0.8$. Therefore, the aberration of surrounding field of view for the optical image capturing system can be corrected.

The optical image capturing system of the present disclosure may satisfy the following condition: $0 \leq \text{HVT62}/\text{HOS} \leq 0.5$. Preferably, the following condition may be satisfied: $0.2 \leq \text{HVT62}/\text{HOS} \leq 0.45$. Therefore, the aberration of surrounding field of view for the optical image capturing system can be corrected.

In the optical image capturing system of the present disclosure, the distance in parallel with an optical axis from an inflection point on the object-side surface of the sixth lens element that is nearest to the optical axis to an axial point on the object-side surface of the sixth lens element is denoted by SGI611. The distance in parallel with an optical axis from an inflection point on the image-side surface of the sixth lens element that is nearest to the optical axis to an axial point on the image-side surface of the sixth lens element is denoted by SGI621. The following conditions are satisfied: $0<\text{SGI611}/(\text{SGI611}+\text{TP6}) \leq 0.9$ and $0<\text{SGI621}/(\text{SGI621}+\text{TP6}) \leq 0.9$. Preferably, the following conditions may be satisfied: $0.1 \leq \text{SGI611}/(\text{SGI611}+\text{TP6}) \leq 0.6$ and $0.1 \leq \text{SGI621}/(\text{SGI621}+\text{TP6}) \leq 0.6$.

The distance in parallel with the optical axis from the inflection point on the object-side surface of the sixth lens element that is second nearest to the optical axis to an axial point on the object-side surface of the sixth lens element is denoted by SGI612. The distance in parallel with an optical axis from an inflection point on the image-side surface of the sixth lens element that is second nearest to the optical axis to an axial point on the image-side surface of the sixth lens element is denoted by SGI622. The following conditions are satisfied: 0<SGI612/(SGI612+TP6)≤0.9 and 0<SGI622/(SGI622+TP6)≤0.9. Preferably, the following conditions may be satisfied: 0.1≤SGI612/(SGI612+TP6)≤0.6 and 0.1≤SGI622/(SGI622+TP6)≤0.6.

The distance perpendicular to the optical axis between the inflection point on the object-side surface of the sixth lens element that is the nearest to the optical axis and the optical axis is denoted by HIF611. The distance perpendicular to the optical axis between an axial point on the image-side surface of the sixth lens element and an inflection point on the image-side surface of the sixth lens element that is the nearest to the optical axis is denoted by HIF621. The following conditions may be satisfied: 0.001 mm≤|HIF611|≤5 mm and 0.001 mm≤|HIF621|≤5 mm. Preferably, the following conditions may be satisfied: 0.1 mm≤|HIF611|≤3.5 mm and 1.5 mm≤|HIF621|≤3.5 mm.

The distance perpendicular to the optical axis between the inflection point on the object-side surface of the sixth lens element that is second nearest to the optical axis and the optical axis is denoted by HIF612. The distance perpendicular to the optical axis between an axial point on the image-side surface of the sixth lens element and an inflection point on the image-side surface of the sixth lens element that is second nearest to the optical axis is denoted by HIF622. The following conditions may be satisfied: 0.001 mm≤|HIF612|≤5 mm and 0.001 mm≤|HIF622|≤5 mm. Preferably, the following conditions may be satisfied: 0.1 mm≤|HIF622|≤3.5 mm and 0.1 mm≤|HIF612|≤3.5 mm.

The distance perpendicular to the optical axis between the inflection point on the object-side surface of the sixth lens element that is third nearest to the optical axis and the optical axis is denoted by HIF613. The distance perpendicular to the optical axis between an axial point on the image-side surface of the sixth lens element and an inflection point on the image-side surface of the sixth lens element that is third nearest to the optical axis is denoted by HIF623. The following conditions are satisfied: 0.001 mm≤|HIF613|≤5 mm and 0.001 mm≤|HIF623|≤5 mm. Preferably, the following conditions may be satisfied: 0.1 mm≤|HIF623|≤3.5 mm and 0.1 mm≤|HIF613|≤3.5 mm.

The distance perpendicular to the optical axis between the inflection point on the object-side surface of the sixth lens element that is fourth nearest to the optical axis and the optical axis is denoted by HIF614. The distance perpendicular to the optical axis between an axial point on the image-side surface of the sixth lens element and an inflection point on the image-side surface of the sixth lens element that is fourth nearest to the optical axis is denoted by HIF624. The following conditions are satisfied: 0.001 mm≤|HIF614|≤5 mm and 0.001 mm≤|HIF624|≤5 mm. Preferably, the following conditions may be satisfied: 0.1 mm≤|HIF624|≤3.5 mm and 0.1 mm≤|HIF614|≤3.5 mm.

In one embodiment of the optical image capturing system of the present disclosure, the chromatic aberration of the optical image capturing system can be corrected by alternatively arranging the lens elements with large Abbe number and small Abbe number.

The equation for the aforementioned aspheric surface is:

$$z=ch^2/[1+[1-(k+1)c^2h^2]^{0.5}]+A_4h^4+A_6h^6+A_8h^8+A_{10}h^{10}+A_{12}h^{12}+A_{14}h^{14}+A_{16}h^{16}+A_{18}h^{18}+A_{20}h^{20}+\ldots \quad (1),$$

where z is a position value of the position along the optical axis and at the height h which reference to the surface apex; k is the conic coefficient, c is the reciprocal of curvature radius, and $A_4$, $A_6$, $A_8$, $A_{10}$, $A_{12}$, $A_{14}$, $A_{16}$, $A_{18}$, and $A_{20}$ are high order aspheric coefficients.

The optical image capturing system provided by the disclosure, the lens elements may be made of glass or plastic material. If plastic material is adopted to produce the lens elements, the cost of manufacturing as well as the weight of the lens element can be reduced effectively. If lens elements are made of glass, the heat effect can be controlled, and there will be more options to allocation the refractive powers of the lens elements in the optical image capturing system. Besides, the object-side surface and the image-side surface of the first through sixth lens elements may be aspheric, which provides more control variables, such that the number of lens elements used can be reduced in contrast to traditional glass lens element, and the aberration can be reduced too. Thus, the total height of the optical image capturing system can be reduced effectively.

Furthermore, in the optical image capturing system provided by the present disclosure, when the lens element has a convex surface, the surface of that lens element basically has a convex portion in the vicinity of the optical axis. When the lens element has a concave surface, the surface of that lens element basically has a concave portion in the vicinity of the optical axis.

The optical image capturing system of the disclosure can be adapted to the optical image capturing system with automatic focus whenever it is necessary. With the features of a good aberration correction and a high quality image formation, the optical image capturing system can be used in various applications.

The optical image capturing system of the disclosure can include a driving module according to the actual requirements. The driving module may be coupled with the lens elements and enables the movement of the lens elements. The driving module described above may be the voice coil motor (VCM) which is applied to move the lens to focus, or may be the optical image stabilization (OIS) which is applied to reduce the frequency the optical system is out of focus owing to the vibration of the lens during photo or video shooting.

In the optical image capturing system of the present disclosure, at least one lens element among the first, second, third, fourth, fifth and sixth lens elements may be a light filtering element for light with wavelength of less than 500 nm, depending on the design requirements. The light filtering element may be made by coating film on at least one surface of that lens element with certain filtering function, or forming that lens element with material that can filter light with short wavelength.

The image plane of the optical image capturing system of the present disclosure may be a plane or a curved surface, depending on the design requirement. When the image plane is a curved surface (e.g. a spherical surface with curvature radius), the incident angle required such that the rays are focused on the image plane can be reduced. As such, the total track length (TTL) of the optical image capturing system can be minimized, and the relative illumination may be improved as well.

According to the above embodiments, the specific embodiments with figures are presented in detail as below.

The First Embodiment

Figure 1B:
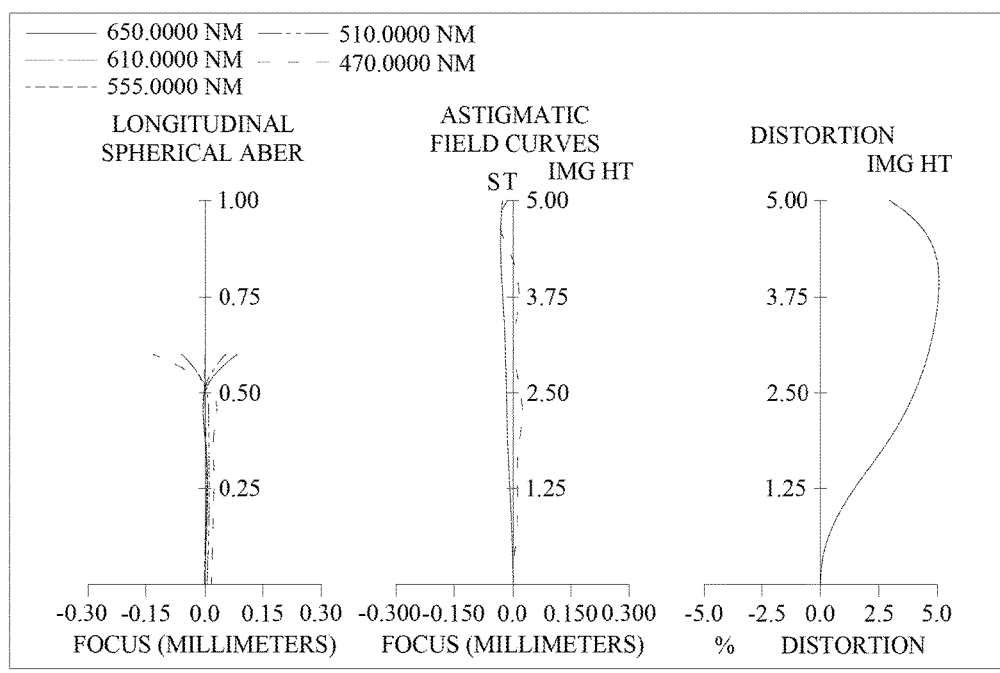
FIG. 1B shows the longitudinal spherical aberration curves, astigmatic field curves, and optical distortion curve of the optical image capturing system in the order from left to right according to the first embodiment of the present invention.
Figure 1C:
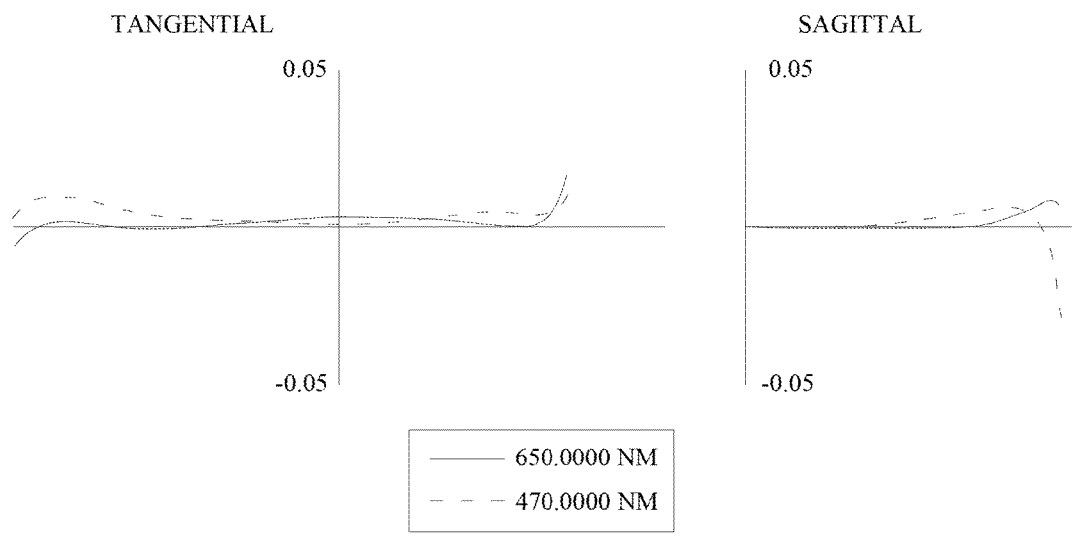
FIG. 1C is a transverse aberration diagram of the longest operation wavelength and the shortest operation wavelength for tangential fan and sagittal fan, in which the longest operation wavelength and the shortest operation wavelength pass through an edge of the entrance pupil and strike at the position of 0.7 HOI on the image plane, according to the first embodiment of the present invention.
Figure 1D:
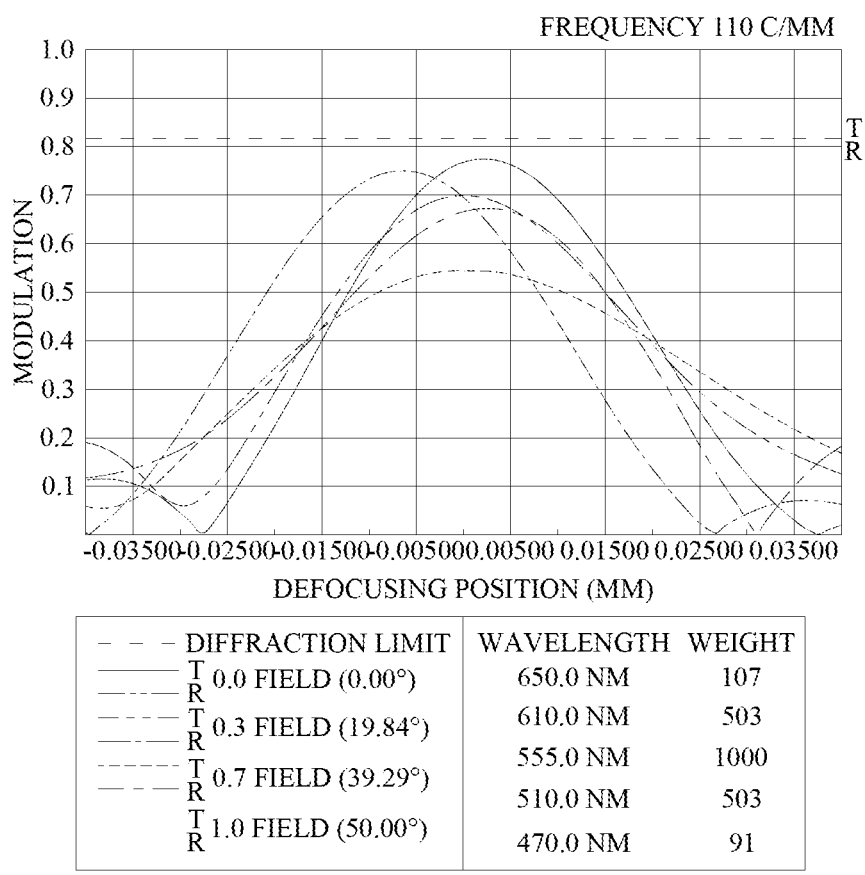
FIG. 1D is a diagram showing the through-focus MTF values of the visible light spectrum at the central field of view, 0.3 field of view, and 0.7 field of view of the first embodiment of the present invention.
Figure 1E:
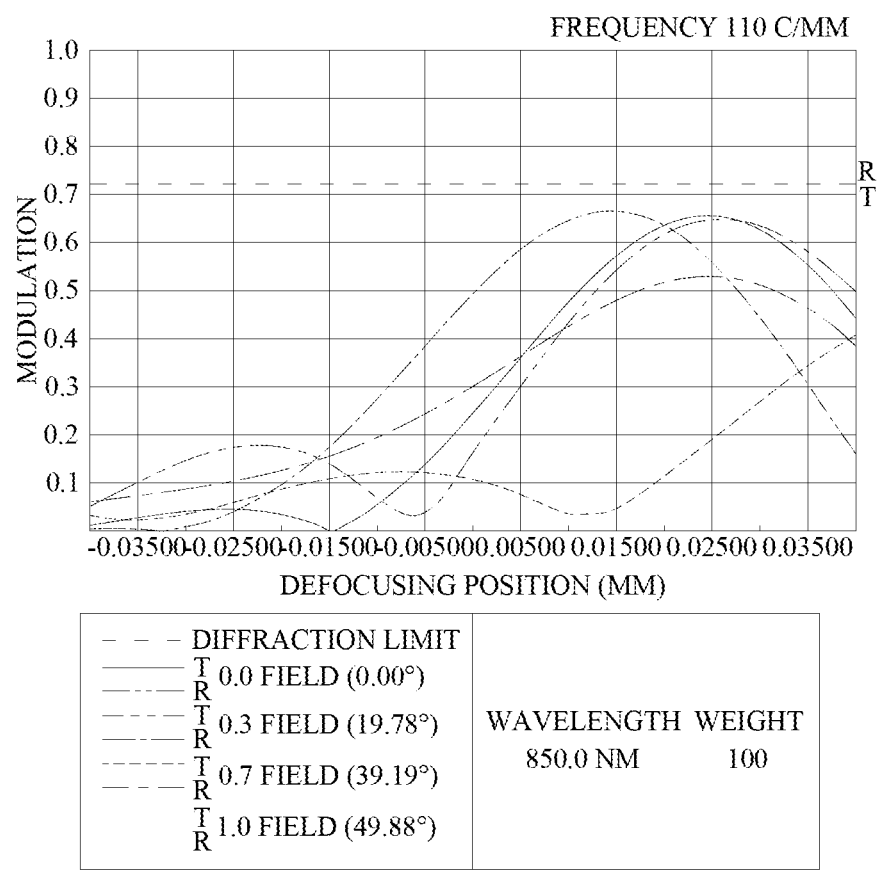
FIG. 1E is a diagram showing the through-focus MTF values of the infrared light spectrum at the central field of view, 0.3 field of view, and 0.7 field of view of the first embodiment of the present disclosure.

Please refer to FIGS. 1A to 1E. FIG. 1A is a schematic view of the optical image capturing system according to the first embodiment of the present invention. FIG. 1B shows the longitudinal spherical aberration curves, astigmatic field curves, and optical distortion curve of the optical image capturing system in the order from left to right according to the first embodiment of the present invention. FIG. 1C is a transverse aberration diagram of the longest operation wavelength and the shortest operation wavelength for tangential fan and sagittal fan, in which the longest operation wavelength and the shortest operation wavelength pass through an edge of the entrance pupil and incident at the position of 0.7 HOI on the image plane, according to the first embodiment of the present invention. FIG. 1D is a diagram showing the through-focus MTF values of the visible light spectrum at the central field of view, 0.3 field of view, and 0.7 field of view of the first embodiment of the present invention. FIG. 1E is a diagram showing the through-focus MTF values of the infrared light spectrum at the central field of view, 0.3 field of view, and 0.7 field of view of the first embodiment of the present disclosure. As shown in FIG. 1A, in the order from the object side to the image side, the optical image capturing system includes a first lens element 110, an aperture stop 100, a second lens element 120, a third lens element 130, a fourth lens element 140, a fifth lens element 150, a sixth lens element 160, an IR-bandstop filter 180, an image plane 190, and an image sensing device 192.

The first lens element 110 has negative refractive power and it is made of plastic material. The first lens element 110 has a concave object-side surface 112 and a concave image-side surface 114, and both of the object-side surface 112 and the image-side surface 114 are aspheric. The object-side surface 112 thereof has two inflection points. The length of outline curve of the maximum effective half diameter of the object-side surface of the first lens element is denoted as ARS11. The length of outline curve of the maximum effective half diameter of the image-side surface of the first lens element is denoted as ARS12. The length of outline curve of ½ entrance pupil diameter (HEP) of the object-side surface of the first lens element is denoted as ARE11, and the length of outline curve of ½ entrance pupil diameter (HEP) of the image-side surface of the first lens element is denoted as ARE12. The central thickness of the first lens element on the optical axis is TP1.

The distance paralleling an optical axis from an inflection point on the object-side surface of the first lens element which is nearest to the optical axis to an axial point on the object-side surface of the first lens element is denoted by SGI111. The distance paralleling an optical axis from an inflection point on the image-side surface of the first lens element which is nearest to the optical axis to an axial point on the image-side surface of the first lens element is denoted by SGI121. The following conditions are satisfied: SGI111=−0.0031 mm, and |SGI111|/(|SGI111|+TP1)= 0.0016.

The distance in parallel with an optical axis from an inflection point on the object-side surface of the first lens element that is second nearest to the optical axis to an axial point on the object-side surface of the first lens element is denoted by SGI112. The distance in parallel with an optical axis from an inflection point on the image-side surface of the first lens element that is second nearest to the optical axis to an axial point on the image-side surface of the first lens element is denoted by SGI122. The following conditions are satisfied: SGI112=1.3178 mm and |SGI112|/(|SGI112|+ TP1)=0.4052.

The distance perpendicular to the optical axis from the inflection point on the object-side surface of the first lens element that is nearest to the optical axis to an axial point on the object-side surface of the first lens element is denoted by HIF111. The distance perpendicular to the optical axis from the inflection point on the image-side surface of the first lens element that is nearest to the optical axis to an axial point on the image-side surface of the first lens element is denoted by HIF121. The following conditions are satisfied: HIF111=0.5557 mm and HIF111/HOI=0.1111.

The distance perpendicular to the optical axis from the inflection point on the object-side surface of the first lens element that is second nearest to the optical axis to an axial point on the object-side surface of the first lens element is denoted by HIF112. The distance perpendicular to the optical axis from the inflection point on the image-side surface of the first lens element that is second nearest to the optical axis to an axial point on the image-side surface of the first lens element is denoted by HIF122. The following conditions are satisfied: HIF112=5.3732 mm and HIF112/ HOI=1.0746.

The second lens element 120 has positive refractive power and it is made of plastic material. The second lens element 120 has a convex object-side surface 122 and a convex image-side surface 124, and both of the object-side surface 122 and the image-side surface 124 are aspheric. The object-side surface 122 has one inflection point. The length of the maximum effective half diameter outline curve of the object-side surface of the second lens element is denoted as ARS21. The length of the maximum effective half diameter outline curve of the image-side surface of the second lens element is denoted as ARS22. The length of the ½ HEP outline curve of the object-side surface of the second lens element is denoted as ARE21, and the length of the ½ HEP outline curve of the image-side surface of the second lens element is denoted as ARE22. The central thickness of the second lens element on the optical axis is TP2.

The distance in parallel with an optical axis from an inflection point on the object-side surface of the second lens element that is nearest to the optical axis to the axial point on the object-side surface of the second lens element is denoted by SGI211. The distance in parallel with an optical axis from an inflection point on the image-side surface of the second lens element that is nearest to the optical axis to the axial point on the image-side surface of the second lens element is denoted by SGI221. The following conditions are satisfied: SGI211=0.1069 mm, |SGI211|/(|SGI211|+TP2)= 0.0412, SGI221=0 mm and |SGI221|/(|SGI221|+TP2)=0.

The distance perpendicular to the optical axis from the inflection point on the object-side surface of the second lens element that is nearest to the optical axis to the axial point on the object-side surface of the second lens element is denoted by HIF211. The distance perpendicular to the optical axis from the inflection point on the image-side surface of the second lens element that is nearest to the optical axis to the axial point on the image-side surface of the second lens element is denoted by HIF221. The following conditions are satisfied: HIF211=1.1264 mm, HIF211/ HOI=0.2253, HIF221=0 mm and HIF221/HOI=0.

The third lens element 130 has negative refractive power and it is made of plastic material. The third lens element 130 has a concave object-side surface 132 and a convex image-side surface 134, and both of the object-side surface 132 and the image-side surface 134 are aspheric. The object-side surface 132 and the image-side surface 134 both have an inflection point. The length of the maximum effective half diameter outline curve of the object-side surface of the third lens element is denoted as ARS31. The length of the maximum effective half diameter outline curve of the image-side surface of the third lens element is denoted as ARS32. The length of the ½ HEP outline curve of the object-side surface of the third lens element is denoted as ARE31, and the length of the ½ HEP outline curve of the image-side surface of the third lens element is denoted as ARS32. The central thickness of the third lens element on the optical axis is TP3.

The distance in parallel with an optical axis from an inflection point on the object-side surface of the third lens element that is nearest to the optical axis to an axial point on the object-side surface of the third lens element is denoted by SGI311. The distance in parallel with an optical axis from an inflection point on the image-side surface of the third lens element that is nearest to the optical axis to an axial point on the image-side surface of the third lens element is denoted by SGI321. The following conditions are satisfied: SGI311=−0.3041 mm, |SGI311|/(|SGI311|+TP3)=0.4445, SGI321=−0.1172 mm and |SGI321|/(|SGI321|+TP3)=0.2357.

The distance perpendicular to the optical axis between the inflection point on the object-side surface of the third lens element that is nearest to the optical axis and the axial point on the object-side surface of the third lens element is denoted by HIF311. The distance perpendicular to the optical axis between the inflection point on the image-side surface of the third lens element that is nearest to the optical axis and the axial point on the image-side surface of the third lens element is denoted by HIF321. The following conditions are satisfied: HIF311=1.5907 mm, HIF311/HOI=0.3181, HIF321=1.3380 mm and HIF321/HOI=0.2676.

The fourth lens element 140 has positive refractive power and it is made of plastic material. The fourth lens element 140 has a convex object-side surface 142 and a concave image-side surface 144; both of the object-side surface 142 and the image-side surface 144 are aspheric. The object-side surface 142 thereof has two inflection points, and the image-side surface 144 has one inflection point. The length of the maximum effective half diameter outline curve of the object-side surface of the fourth lens element is denoted as ARS41. The length of the maximum effective half diameter outline curve of the image-side surface of the fourth lens element is denoted as ARS42. The length of the ½ HEP outline curve of the object-side surface of the fourth lens element is denoted as ARE41, and the length of the ½ HEP outline curve of the image-side surface of the fourth lens element is denoted as ARE42. The central thickness of the fourth lens element on the optical axis is TP4.

The distance in parallel with the optical axis from an inflection point on the object-side surface of the fourth lens element that is nearest to the optical axis to the axial point on the object-side surface of the fourth lens element is denoted by SGI411. The distance in parallel with the optical axis from an inflection point on the image-side surface of the fourth lens element that is nearest to the optical axis to the axial point on the image-side surface of the fourth lens element is denoted by SGI421. The following conditions are satisfied: SGI411=0.0070 mm, |SGI411|/(|SGI411|+TP4)=0.0056, SGI421=0.0006 mm and |SGI421|/(|SGI421|+TP4)=0.0005.

The distance in parallel with an optical axis from an inflection point on the object-side surface of the fourth lens element that is second nearest to the optical axis to the axial point on the object-side surface of the fourth lens element is denoted by SGI412. The distance in parallel with an optical axis from an inflection point on the image-side surface of the fourth lens element that is second nearest to the optical axis to the axial point on the image-side surface of the fourth lens element is denoted by SGI422. The following conditions are satisfied: SGI412=−0.2078 mm and |SGI412|/(|SGI412|+TP4)=0.1439.

The perpendicular distance between the inflection point on the object-side surface of the fourth lens element that is nearest to the optical axis and the optical axis is denoted by HIF411. The perpendicular distance between the inflection point on the image-side surface of the fourth lens element that is nearest to the optical axis and the optical axis is denoted by HIF421. The following conditions are satisfied: HIF411=0.4706 mm, HIF411/HOI=0.0941, HIF421=0.1721 mm and HIF421/HOI=0.0344.

The distance perpendicular to the optical axis between the inflection point on the object-side surface of the fourth lens element that is second nearest to the optical axis and the optical axis is denoted by HIF412. The distance perpendicular to the optical axis between the inflection point on the image-side surface of the fourth lens element that is second nearest to the optical axis and the optical axis is denoted by HIF422. The following conditions are satisfied: HIF412=2.0421 mm and HIF412/HOI=0.4084.

The fifth lens element 150 has positive refractive power and it is made of plastic material. The fifth lens element 150 has a convex object-side surface 152 and a convex image-side surface 154, and both of the object-side surface 152 and the image-side surface 154 are aspheric. The object-side surface 152 has two inflection points and the image-side surface 154 has one inflection point. The length of the maximum effective half diameter outline curve of the object-side surface of the fifth lens element is denoted as ARS51. The length of the maximum effective half diameter outline curve of the image-side surface of the fifth lens element is denoted as ARS52. The length of the ½ HEP outline curve of the object-side surface of the fifth lens element is denoted as ARE51, and the length of the ½ HEP outline curve of the image-side surface of the fifth lens element is denoted as ARE52. The central thickness of the fifth lens element on the optical axis is TP5.

The distance in parallel with an optical axis from an inflection point on the object-side surface of the fifth lens element that is nearest to the optical axis to the axial point on the object-side surface of the fifth lens element is denoted by SGI511. The distance in parallel with an optical axis from an inflection point on the image-side surface of the fifth lens element that is nearest to the optical axis to the axial point on the image-side surface of the fifth lens element is denoted by SGI521. The following conditions are satisfied: SGI511=0.00364 mm, |SGI511|/(|SGI511|+TP5)=0.00338, SGI521=−0.63365 mm and |SGI521|/(|SGI521|+TP5)=0.37154.

The distance in parallel with an optical axis from an inflection point on the object-side surface of the fifth lens element that is second nearest to the optical axis to the axial point on the object-side surface of the fifth lens element is denoted by SGI512. The distance in parallel with an optical axis from an inflection point on the image-side surface of the fifth lens element that is second nearest to the optical axis to the axial point on the image-side surface of the fifth lens element is denoted by SGI522. The following conditions are satisfied: SGI512=−0.32032 mm and |SGI512|/(|SGI512|+TP5)=0.23009.

The distance in parallel with an optical axis from an inflection point on the object-side surface of the fifth lens element that is third nearest to the optical axis to the axial point on the object-side surface of the fifth lens element is denoted by SGI513. The distance in parallel with an optical axis from an inflection point on the image-side surface of the fifth lens element that is third nearest to the optical axis to the axial point on the image-side surface of the fifth lens element is denoted by SGI523. The following conditions are satisfied: SGI513=0 mm, |SGI513|/(|SGI513|+TP5)=0, SGI523=0 mm and |SGI523|/(|SGI523|+TP5)=0.

The distance in parallel with an optical axis from an inflection point on the object-side surface of the fifth lens element that is fourth nearest to the optical axis to the axial point on the object-side surface of the fifth lens element is denoted by SGI514. The distance in parallel with an optical axis from an inflection point on the image-side surface of the fifth lens element that is fourth nearest to the optical axis to the axial point on the image-side surface of the fifth lens element is denoted by SGI524. The following conditions are satisfied: SGI514=0 mm, |SGI514|/(|SGI514|+TP5)=0, SGI524=0 mm and |SGI524|/(|SGI524|+TP5)=0.

The perpendicular distance between the optical axis and the inflection point on the object-side surface of the fifth lens element that is nearest to the optical axis is denoted by HIF511. The perpendicular distance between the optical axis and the inflection point on the image-side surface of the fifth lens element that is nearest to the optical axis is denoted by HIF521. The following conditions are satisfied: HIF511=0.28212 mm, HIF511/HOI=0.05642, HIF521=2.13850 mm and HIF521/HOI=0.42770.

The distance perpendicular to the optical axis between the inflection point on the object-side surface of the fifth lens element that is second nearest to the optical axis and the optical axis is denoted by HIF512. The distance perpendicular to the optical axis between the inflection point on the image-side surface of the fifth lens element that is second nearest to the optical axis and the optical axis is denoted by HIF522. The following conditions are satisfied: HIF512=2.51384 mm and HIF512/HOI=0.50277.

The distance perpendicular to the optical axis between the inflection point on the object-side surface of the fifth lens element that is third nearest to the optical axis and the optical axis is denoted by HIF513. The distance perpendicular to the optical axis between the inflection point on the image-side surface of the fifth lens element that is third nearest to the optical axis and the optical axis is denoted by HIF523. The following conditions are satisfied: HIF513=0 mm, HIF513/HOI=0, HIF523=0 mm and HIF523/HOI=0.

The distance perpendicular to the optical axis between the inflection point on the object-side surface of the fifth lens element that is fourth nearest to the optical axis and the optical axis is denoted by HIF514. The distance perpendicular to the optical axis between the inflection point on the image-side surface of the fifth lens element that is fourth nearest to the optical axis and the optical axis is denoted by HIF524. The following conditions are satisfied: HIF514=0 mm, HIF514/HOI=0, HIF524=0 mm and HIF524/HOI=0.

The sixth lens element 160 has negative refractive power and it is made of plastic material. The sixth lens element 160 has a concave object-side surface 162 and a concave image-side surface 164, and the object-side surface 162 has two inflection points and the image-side surface 164 has one inflection point. Therefore, the incident angle of each field of view on the sixth lens element can be effectively adjusted and the spherical aberration can thus be mitigated. The length of the maximum effective half diameter outline curve of the object-side surface of the sixth lens element is denoted as ARS61. The length of the maximum effective half diameter outline curve of the image-side surface of the sixth lens element is denoted as ARS62. The length of the ½ HEP outline curve of the object-side surface of the sixth lens element is denoted as ARE61, and the length of the ½ HEP outline curve of the image-side surface of the sixth lens element is denoted as ARS62. The central thickness of the sixth lens element on the optical axis is TP6.

The distance in parallel with an optical axis from an inflection point on the object-side surface of the sixth lens element that is nearest to the optical axis to the axial point on the object-side surface of the sixth lens element is denoted by SGI611. The distance in parallel with an optical axis from an inflection point on the image-side surface of the sixth lens element that is nearest to the optical axis to the axial point on the image-side surface of the sixth lens element is denoted by SGI621. The following conditions are satisfied: SGI611=−0.38558 mm, |SGI611|/(|SGI611|+TP6)=0.27212, SGI621=0.12386 mm and |SGI621|/(|SGI621|+TP6)=0.10722.

The distance in parallel with an optical axis from an inflection point on the object-side surface of the sixth lens element that is second nearest to the optical axis to an axial point on the object-side surface of the sixth lens element is denoted by SGI612. The distance in parallel with an optical axis from an inflection point on the image-side surface of the sixth lens element that is second nearest to the optical axis to the axial point on the image-side surface of the sixth lens element is denoted by SGI622. The following conditions are satisfied: SGI612=−0.47400 mm, |SGI612|/(|SGI612|+TP6)=0.31488, SGI622=0 mm and |SGI622|/(|SGI622|+TP6)=0.

The distance perpendicular to the optical axis between the inflection point on the object-side surface of the sixth lens element that is nearest to the optical axis and the optical axis is denoted by HIF611. The distance perpendicular to the optical axis between the inflection point on the image-side surface of the sixth lens element that is nearest to the optical axis and the optical axis is denoted by HIF621. The following conditions are satisfied: HIF611=2.24283 mm, HIF611/HOI=0.44857, HIF621=1.07376 mm and HIF621/HOI=0.21475.

The distance perpendicular to the optical axis between the inflection point on the object-side surface of the sixth lens element that is second nearest to the optical axis and the optical axis is denoted by HIF612. The distance perpendicular to the optical axis between the inflection point on the image-side surface of the sixth lens element that is second nearest to the optical axis and the optical axis is denoted by HIF622. The following conditions are satisfied: HIF612=2.48895 mm and HIF612/HOI=0.49779.

The distance perpendicular to the optical axis between the inflection point on the object-side surface of the sixth lens element that is third nearest to the optical axis and the optical axis is denoted by HIF613. The distance perpendicular to the optical axis between the inflection point on the image-side surface of the sixth lens element that is third nearest to the optical axis and the optical axis is denoted by HIF623. The following conditions are satisfied: HIF613=0 mm, HIF613/HOI=0, HIF623=0 mm and HIF623/HOI=0.

The distance perpendicular to the optical axis between the inflection point on the object-side surface of the sixth lens element that is fourth nearest to the optical axis and the optical axis is denoted by HIF614. The distance perpendicular to the optical axis between the inflection point on the image-side surface of the sixth lens element that is fourth nearest to the optical axis and the optical axis is denoted by HIF624. The following conditions are satisfied: HIF614=0 mm, HIF614/HOI=0, HIF624=0 mm and HIF624/HOI=0.

The IR-bandstop filter 180 is made of glass material. The IR-bandstop filter 180 is disposed between the sixth lens element 160 and the image plane 190, and it does not affect the focal length of the optical image capturing system.

In the optical image capturing system of the first embodiment, the focal length of the optical image capturing system is f, the entrance pupil diameter of the optical image capturing system is HEP, and half of a maximum view angle of the optical image capturing system is HAF. The detailed parameters are shown as below: f=4.075 mm, f/HEP=1.4, HAF=50.001° and tan(HAF)=1.1918.

In the optical image capturing system of the first embodiment, the focal length of the first lens element 110 is f1 and the focal length of the sixth lens element 160 is f6. The following conditions are satisfied: f1=−7.828 mm, |f/f1|=0.52060, f6=−4.886 and |f1|>|f6|.

In the optical image capturing system of the first embodiment, focal lengths of the second lens element 120 to the fifth lens element 150 are f2, f3, f4 and f5, respectively. The following conditions are satisfied: |f2|+|f3|+|f4|+|f5|=95.50815 mm, |f1|+|f6|=12.71352 mm and |f2|+|f3|+|f4|+|f5|>|f1|+|f6|.

The ratio of the focal length f of the optical image capturing system to the focal length fp of each of lens elements with positive refractive power is PPR. The ratio of the focal length f of the optical image capturing system to a focal length fn of each of lens elements with negative refractive power is NPR. In the optical image capturing system of the first embodiment, a sum of the PPR of all lens elements with positive refractive power is ΣPPR=f/f2+f/f4+f/f5=1.63290. The sum of the NPR of all lens elements with negative refractive powers is ΣNPR=|f/f1|+|f/f3|+|f/f6|=1.51305, ΣPPR/ΣNPR=1.07921. The following conditions are also satisfied: |f/f2|=0.69101, |f/f3|=0.15834, |f/f4|=0.06883, |f/f5|=0.87305 and |f/f6|=0.83412.

In the optical image capturing system of the first embodiment, the distance from the object-side surface 112 of the first lens element to the image-side surface 164 of the sixth lens element is InTL. The distance from the object-side surface 112 of the first lens element to the image plane 190 is HOS. The distance from an aperture 100 to an image plane 190 is InS. Half of a diagonal length of an effective detection field of the image sensing device 192 is HOI. The distance from the image-side surface 164 of the sixth lens element to the image plane 190 is BFL. The following conditions are satisfied: InTL+BFL=HOS, HOS=19.54120 mm, HOI=5.0 mm, HOS/HOI=3.90824, HOS/f=4.7952, InS=11.685 mm and InS/HOS=0.59794.

In the optical image capturing system of the first embodiment, a total central thickness of all lens elements with refractive power on the optical axis is ΣTP. The following conditions are satisfied: ΣTP=8.13899 mm and ΣTP/InTL=0.52477. Therefore, the contrast ratio for the image formation in the optical image capturing system can be improved without sacrificing the defect-free rate during the manufacturing of the lens element, and a proper back focal length is provided to accommodate other optical components in the optical image capturing system.

In the optical image capturing system of the first embodiment, the curvature radius of the object-side surface 112 of the first lens element is R1. The curvature radius of the image-side surface 114 of the first lens element is R2. The following condition is satisfied: |R1/R2|=8.99987. Therefore, the first lens element may have a suitable magnitude of positive refractive power, so as to prevent the longitudinal spherical aberration from increasing too fast.

In the optical image capturing system of the first embodiment, the curvature radius of the object-side surface 162 of the sixth lens element is R11. The curvature radius of the image-side surface 164 of the sixth lens element is R12. The following condition is satisfied: (R11−R12)/(R11+R12)=1.27780. Therefore, the astigmatism generated by the optical image capturing system can be corrected.

In the optical image capturing system of the first embodiment, a sum of focal lengths of all lens elements with positive refractive power is ΣPP. The following conditions are satisfied: ΣPP=f2+f4+f5=69.770 mm and f5/(f2+f4+f5)=0.067. With this configuration, the positive refractive power of a single lens element can be distributed to other lens elements with positive refractive powers in an appropriate way, so as to suppress the generation of noticeable aberrations when the incident light is propagating in the optical system.

In the optical image capturing system of the first embodiment, a sum of focal lengths of all lens elements with negative refractive power is ΣNP. The following conditions are satisfied: ΣNP=f1+f3+f6=−38.451 mm and f6/(f1+f3+f6)=0.127. With this configuration, the negative refractive power of the sixth lens element 160 may be distributed to other lens elements with negative refractive power in an appropriate way, so as to suppress the generation of noticeable aberrations when the incident light is propagating in the optical system.

In the optical image capturing system of the first embodiment, the distance between the first lens element 110 and the second lens element 120 on the optical axis is IN12. The following conditions are satisfied: IN12=6.418 mm and IN12/f=1.57491. Therefore, the chromatic aberration of the lens elements can be reduced, such that their performance can be improved.

In the optical image capturing system of the first embodiment, a distance between the fifth lens element 150 and the sixth lens element 160 on the optical axis is IN56. The following conditions are satisfied: IN56=0.025 mm and IN56/f=0.00613. Therefore, the chromatic aberration of the lens elements can be reduced, such that their performance can be improved.

In the optical image capturing system of the first embodiment, central thicknesses of the first lens element 110 and the second lens element 120 on the optical axis are TP1 and TP2, respectively. The following conditions are satisfied: TP1=1.934 mm, TP2=2.486 mm and (TP1+IN12)/TP2=3.36005. Therefore, the sensitivity of the optical image capturing system can be controlled, and the performance can be improved.

In the optical image capturing system of the first embodiment, central thicknesses of the fifth lens element 150 and the sixth lens element 160 on the optical axis are TP5 and TP6, respectively, and the distance between the aforementioned two lens elements on the optical axis is IN56. The following conditions are satisfied: TP5=1.072 mm, TP6=1.031 mm and (TP6+IN56)/TP5=0.98555. Therefore, the sensitivity of the optical image capturing system can be controlled and the total height of the optical image capturing system can be reduced.

In the optical image capturing system of the first embodiment, a distance between the third lens element 130 and the fourth lens element 140 on the optical axis is IN34. The distance between the fourth lens element 140 and the fifth lens element 150 on the optical axis is IN45. The following conditions are satisfied: IN34=0.401 mm, IN45=0.025 mm and TP4/(IN34+TP4+IN45)=0.74376. Therefore, the aberration generated when the incident light is propagating inside the optical system can be corrected slightly layer upon layer, and the total height of the optical image capturing system can be reduced.

In the optical image capturing system of the first embodiment, a distance in parallel with an optical axis from a maximum effective half diameter position to an axial point on the object-side surface 152 of the fifth lens element is InRS51. The distance in parallel with an optical axis from a maximum effective half diameter position to an axial point on the image-side surface 154 of the fifth lens element is InRS52. The central thickness of the fifth lens element 150 is TP5. The following conditions are satisfied: InRS51=−0.34789 mm, InRS52=−0.88185 mm, |InRS51|/TP5=0.32458 and |InRS52|/TP5=0.82276. This configuration is favorable to the manufacturing and forming of lens elements, as well as the minimization of the optical image capturing system.

In the optical image capturing system of the first embodiment, the distance perpendicular to the optical axis between a critical point C51 on the object-side surface 152 of the fifth lens element and the optical axis is HVT51. The distance perpendicular to the optical axis between a critical point C52 on the image-side surface 154 of the fifth lens element and the optical axis is HVT52. The following conditions are satisfied: HVT51=0.515349 mm and HVT52=0 mm.

In the optical image capturing system of the first embodiment, a distance in parallel with an optical axis from a maximum effective half diameter position to an axial point on the object-side surface 162 of the sixth lens element is InRS61. A distance in parallel with an optical axis from a maximum effective half diameter position to an axial point on the image-side surface 164 of the sixth lens element is InRS62. The central thickness of the sixth lens element 160 is TP6. The following conditions are satisfied: InRS61=−0.58390 mm, InRS62=0.41976 mm, |InRS61|/TP6=0.56616 and |InRS62|/TP6=0.40700. This configuration is favorable to the manufacturing and forming of lens elements, as well as the minimization of the optical image capturing system.

In the optical image capturing system of the first embodiment, the distance perpendicular to the optical axis between a critical point C61 on the object-side surface 162 of the sixth lens element and the optical axis is HVT61. The distance perpendicular to the optical axis between a critical point C62 on the image-side surface 164 of the sixth lens element and the optical axis is HVT62. The following conditions are satisfied: HVT61=0 mm and HVT62=0 mm.

In the optical image capturing system of the first embodiment, the following condition may be satisfied: HVT51/HOI=0.1031. Therefore, the aberration of surrounding field of view can be corrected.

In the optical image capturing system of the first embodiment, the following condition may be satisfied: HVT51/HOS=0.02634. Therefore, the aberration of surrounding field of view can be corrected.

In the optical image capturing system of the first embodiment, the second lens element 120, the third lens element 130 and the sixth lens element 160 have negative refractive powers. The Abbe number of the second lens element is NA2. The Abbe number of the third lens element is NA3. The Abbe number of the sixth lens element is NA6. The following condition is satisfied: NA6/NA2≤1. Therefore, the chromatic aberration of the optical image capturing system can be corrected.

In the optical image capturing system of the first embodiment, TV distortion and optical distortion for image formation in the optical image capturing system are TDT and ODT, respectively. The following conditions are satisfied: |TDT|=2.124% and |ODT|=5.076%.

In the present embodiment, the lights of any field of view can be further divided into sagittal ray and tangential ray, and the spatial frequency of 110 cycles/mm serves as the benchmark for assessing the focus shifts and the values of MTF. The focus shifts where the through-focus MTF values of the visible sagittal ray at the central field of view, 0.3 field of view, and 0.7 field of view of the optical image capturing system are at their respective maxima are denoted by VSFS0, VSFS3, and VSFS7 (unit of measurement: mm), respectively. The values of VSFS0, VSFS3, and VSFS7 equal to 0.000 mm, −0.005 mm, and 0.000 mm, respectively. The maximum values of the through-focus MTF of the visible sagittal ray at the central field of view, 0.3 field of view, and 0.7 field of view are denoted by VSMTF0, VSMTF3, and VSMTF7, respectively. The values of VSMTF0, VSMTF3, and VSMTF7 equal to 0.886, 0.885, and 0.863, respectively. The focus shifts where the through-focus MTF values of the visible tangential ray at the central field of view, 0.3 field of view, and 0.7 field of view of the optical image capturing system are at their respective maxima are denoted by VTFS0, VTFS3, and VTFS7 (unit of measurement: mm), respectively. The values of VTFS0, VTFS3, and VTFS7 equal to 0.000 mm, 0.001 mm, and −0.005 mm, respectively. The maximum values of the through-focus MTF of the visible tangential ray at the central field of view, 0.3 field of view, and 0.7 field of view are denoted by VTMTF0, VTMTF3, and VTMTF7, respectively. The values of VTMTF0, VTMTF3, and VTMTF7 equal to 0.886, 0.868, and 0.796, respectively. The average focus shift (position) of both the aforementioned focus shifts of the visible sagittal ray at three fields of view and focus shifts of the visible tangential ray at three fields of view is denoted by AVFS (unit of measurement: mm), which satisfies the absolute value |(VSFS0+VSFS3+VSFS7+VTFS0+VTFS3+VTFS7)/6|=|0.000 mm|.

The focus shifts where the through-focus MTF values of the infrared sagittal ray at the central field of view, 0.3 field of view, and 0.7 field of view of the optical image capturing system are at their respective maxima, are denoted by ISFS0, ISFS3, and ISFS7 (unit of measurement: mm), respectively. The values of ISFS0, ISFS3, and ISFS7 equal to 0.025 mm, 0.020 mm, and 0.020 mm, respectively. The average focus shift (position) of the aforementioned focus shifts of the infrared sagittal ray at three fields of view is denoted by AISFS (unit of measurement: mm). The maximum values of the through-focus MTF of the infrared sagittal ray at the central field of view, 0.3 field of view, and 0.7 field of view are denoted by ISMTF0, ISMTF3, and ISMTF7, respectively. The values of ISMTF0, ISMTF3, and ISMTF7 equal to 0.787, 0.802, and 0.772, respectively. The focus shifts where the through-focus MTF values of the infrared tangential ray at the central field of view, 0.3 field of view, and 0.7 field of view of the optical image capturing system are at their respective maxima are denoted by ITFS0, ITFS3, and ITFS7 (unit of measurement: mm), respectively. The values of ITFS0, ITFS3, and ITFS7 equal to 0.025, 0.035, and 0.035, respectively. The average focus shift (position) of the aforementioned focus shifts of the infrared tangential ray at three fields of view is denoted by AITFS (unit of measurement: mm). The maximum values of the through-focus MTF of the infrared tangential ray at the central field of view, 0.3 field of view, and 0.7 field of view are denoted by ITMTF0, ITMTF3, and ITMTF7, respectively. The values of ITMTF0, ITMTF3, and ITMTF7 equal to 0.787, 0.805, and 0.721, respectively. The average focus shift (position) of both of the aforementioned focus shifts of the infrared sagittal ray at the three fields of view and focus shifts of the infrared tangential ray at the three fields of view is denoted by AIFS (unit of measurement: mm), which equals to the absolute value of |(ISFS0+ISFS3+ISFS7+ITFS0+ITFS3+ITFS7)/6|=|0.02667 mm|.

The focus shift (difference) of the focal points of the visible light from those of the infrared light at their respective central fields of view (RGB/IR) of the overall optical image capturing system (i.e. wavelength of 850 nm versus wavelength of 555 nm, unit of measurement: mm) is denoted by FS (the distance between the first and second image planes on the optical axis), which satisfies the absolute value |(VSFS0+VTFS0)/2−(ISFS0+ITFS0)/2|=|0.025 mm|. The difference (focus shift) between the average focus shift of the visible light in the three fields of view and the average focus shift of the infrared light in the three fields of view (RGB/IR) of the entire optical image capturing system is denoted by AFS (i.e. wavelength of 850 nm versus wavelength of 555 nm, unit of measurement: mm), which may satisfy the condition of |AIFS−AVFS|=|0.02667 mm|.

In the optical image capturing system of the first embodiment, the transverse aberration of the visible rays with the longest operation wavelength from a positive-directional tangential fan, which pass through the edge of the entrance pupil and strike at the position of 0.7 field of view on the first image plane, is denoted as PLTA, and PLTA=0.006 mm. The transverse aberration of the visible rays with the shortest operation wavelength from a positive-directional tangential fan, which pass through the edge of the entrance pupil and strike at the position of 0.7 field of view on the first image plane, is denoted as PSTA, and PSTA=0.005 mm. The transverse aberration of the visible rays with the longest operation wavelength from the negative-directional tangential fan, which pass through the edge of the entrance pupil and strike at the position of 0.7 field of view on the first image plane, is denoted as NLTA, and NLTA=0.004 mm. The transverse aberration of the visible rays with the shortest operation wavelength from the negative-directional tangential fan, which pass through the edge of the entrance pupil and strike at the position of 0.7 field of view on the first image plane, is denoted as NSTA, and NSTA=−0.007 mm. The transverse aberration of the visible rays with the longest operation wavelength from the sagittal fan, which pass through the edge of the entrance pupil and strike at the position of 0.7 field of view on the first image plane, is denoted as SLTA, and SLTA=−0.003 mm. The transverse aberration of the visible rays with the shortest operation wavelength from the sagittal fan, which pass through the edge of the entrance pupil and strike at the position of 0.7 field of view on the first image plane, is denoted as SSTA, and SSTA=0.008 mm.

Table 1 and Table 2 below should be incorporated into the reference of the present embodiment.

TABLE 1

Lens Parameters for the First Embodiment
f (focal length) = 4.075 mm; f/HEP = 1.4; HAF (half angle of view) = 50.000 deg

| Surface No. | | Curvature Radius | Thickness (mm) | Material | Refractive Index | Abbe No. | Focal Length |
|---|---|---|---|---|---|---|---|
| 0 | Object | Plane | Plane | | | | |
| 1 | Lens 1 | −40.99625704 | 1.934 | Plastic | 1.515 | 56.55 | −7.828 |
| 2 | | 4.555209289 | 5.923 | | | | |
| 3 | Aperture Stop | Plane | 0.495 | | | | |
| 4 | Lens 2 | 5.333427366 | 2.486 | Plastic | 1.544 | 55.96 | 5.897 |
| 5 | | −6.781659971 | 0.502 | | | | |
| 6 | Lens 3 | −5.697794287 | 0.380 | Plastic | 1.642 | 22.46 | −25.738 |
| 7 | | −8.883957518 | 0.401 | | | | |
| 8 | Lens 4 | 13.19225664 | 1.236 | Plastic | 1.544 | 55.96 | 59.205 |
| 9 | | 21.55681832 | 0.025 | | | | |
| 10 | Lens 5 | 8.987806345 | 1.072 | Plastic | 1.515 | 56.55 | 4.668 |
| 11 | | −3.158875374 | 0.025 | | | | |
| 12 | Lens 6 | −29.46491425 | 1.031 | Plastic | 1.642 | 22.46 | −4.886 |
| 13 | | 3.593484273 | 2.412 | | | | |
| 14 | IR-bandstop Filter | Plane | 0.200 | | 1.517 | 64.13 | |
| 15 | | Plane | 1.420 | | | | |
| 16 | Image Plane | Plane | | | | | |

Reference Wavelength = 555 nm; Shield Position: The 1$^{st}$ surface with effective aperture radius of 5.800 mm, the 3$^{rd}$ surface with effective aperture radius of 1.570 mm, and the 5$^{th}$ surface with the effective aperture radius of 1.950 mm

TABLE 2

Aspheric Coefficients of the First Embodiment
Table 2: Aspheric Coefficients

| | Surface No. | | | | | |
|---|---|---|---|---|---|---|
| | 1 | 2 | 4 | 5 | 6 | 7 |
| k | 4.310876E+01 | −4.707622E+00 | 2.616025E+00 | 2.445397E+00 | 5.645686E+00 | −2.117147E+01 |
| $A_4$ | 7.054243E−03 | 1.714312E−02 | −8.377541E−03 | −1.789549E−02 | −3.379055E−03 | −1.370959E−02 |
| $A_6$ | −5.233264E−04 | −1.502232E−04 | −1.838068E−03 | −3.657520E−03 | −1.225453E−03 | 6.250200E−03 |
| $A_8$ | 3.077890E−05 | −1.359611E−04 | 1.233332E−03 | −1.131622E−03 | −5.979572E−03 | −5.854426E−03 |
| $A_{10}$ | −1.260650E−06 | 2.680747E−05 | −2.390895E−03 | 1.390351E−03 | 4.556449E−03 | 4.049451E−03 |
| $A_{12}$ | 3.319093E−08 | −2.017491E−06 | 1.998555E−03 | −4.152857E−04 | −1.177175E−03 | −1.314592E−03 |
| $A_{14}$ | −5.051600E−10 | 6.604615E−08 | −9.734019E−04 | 5.487286E−05 | 1.370522E−04 | 2.143097E−04 |
| $A_{16}$ | 3.380000E−12 | −1.301630E−09 | 2.478373E−04 | −2.919339E−06 | −5.974015E−06 | −1.399894E−05 |

TABLE 2-continued

Aspheric Coefficients of the First Embodiment
Table 2: Aspheric Coefficients

| | Surface No. | | | | | |
|---|---|---|---|---|---|---|
| | 8 | 9 | 10 | 11 | 12 | 13 |
| k | −5.287220E+00 | 6.200000E+01 | −2.114008E+01 | −7.699904E+00 | −6.155476E+01 | −3.120467E−01 |
| $A_4$ | −2.937377E−02 | −1.359965E−01 | −1.263831E−01 | −1.927804E−02 | −2.492467E−02 | −3.521844E−02 |
| $A_6$ | 2.743532E−03 | 6.628518E−02 | 6.965399E−02 | 2.478376E−03 | −1.835360E−03 | 5.629654E−03 |
| $A_8$ | −2.457574E−03 | −2.129167E−02 | −2.116027E−02 | 1.438785E−03 | 3.201343E−03 | −5.466925E−04 |
| $A_{10}$ | 1.874319E−03 | 4.396344E−03 | 3.819371E−03 | −7.013749E−04 | −8.990757E−04 | 2.231154E−05 |
| $A_{12}$ | −6.013661E−04 | −5.542899E−04 | −4.040283E−04 | 1.253214E−04 | 1.245343E−04 | 5.548990E−07 |
| $A_{14}$ | 8.792480E−05 | 3.768879E−05 | 2.280473E−05 | −9.943196E−06 | −8.788363E−06 | −9.396920E−08 |
| $A_{16}$ | −4.770527E−06 | −1.052467E−06 | −5.165452E−07 | 2.898397E−07 | 2.494302E−07 | 2.728360E−09 |

The values pertaining to the length of the outline curves are obtainable from the data in Table 1 and Table 2:

| First Embodiment (Primary Reference Wavelength = 555 nm) | | | | | | |
|---|---|---|---|---|---|---|
| ARE | ½(HEP) | ARE value | ARE − 1/2 (HEP) | 2(ARE/HEP) % | TP | ARE/TP (%) |
| 11 | 1.455 | 1.455 | −0.00033 | 99.98% | 1.934 | 75.23% |
| 12 | 1.455 | 1.495 | 0.03957 | 102.72% | 1.934 | 77.29% |
| 21 | 1.455 | 1.465 | 0.00940 | 100.65% | 2.486 | 58.93% |
| 22 | 1.455 | 1.495 | 0.03950 | 102.71% | 2.486 | 60.14% |
| 31 | 1.455 | 1.486 | 0.03045 | 102.09% | 0.380 | 391.02% |
| 32 | 1.455 | 1.464 | 0.00830 | 100.57% | 0.380 | 385.19% |
| 41 | 1.455 | 1.458 | 0.00237 | 100.16% | 1.236 | 117.95% |
| 42 | 1.455 | 1.484 | 0.02825 | 101.94% | 1.236 | 120.04% |
| 51 | 1.455 | 1.462 | 0.00672 | 100.46% | 1.072 | 136.42% |
| 52 | 1.455 | 1.499 | 0.04335 | 102.98% | 1.072 | 139.83% |
| 61 | 1.455 | 1.465 | 0.00964 | 100.66% | 1.031 | 142.06% |
| 62 | 1.455 | 1.469 | 0.01374 | 100.94% | 1.031 | 142.45% |

| ARS | EHD | ARS value | ARS − EHD | (ARS/EHD) % | TP | ARS/TP (%) |
|---|---|---|---|---|---|---|
| 11 | 5.800 | 6.141 | 0.341 | 105.88% | 1.934 | 317.51% |
| 12 | 3.299 | 4.423 | 1.125 | 134.10% | 1.934 | 228.70% |
| 21 | 1.664 | 1.674 | 0.010 | 100.61% | 2.486 | 67.35% |
| 22 | 1.950 | 2.119 | 0.169 | 108.65% | 2.486 | 85.23% |
| 31 | 1.980 | 2.048 | 0.069 | 103.47% | 0.380 | 539.05% |
| 32 | 2.084 | 2.101 | 0.017 | 100.83% | 0.380 | 552.87% |
| 41 | 2.247 | 2.287 | 0.040 | 101.80% | 1.236 | 185.05% |
| 42 | 2.530 | 2.813 | 0.284 | 111.22% | 1.236 | 227.63% |
| 51 | 2.655 | 2.690 | 0.035 | 101.32% | 1.072 | 250.99% |
| 52 | 2.764 | 2.930 | 0.166 | 106.00% | 1.072 | 273.40% |
| 61 | 2.816 | 2.905 | 0.089 | 103.16% | 1.031 | 281.64% |
| 62 | 3.363 | 3.391 | 0.029 | 100.86% | 1.031 | 328.83% |

Table 1 is the detailed structural data for the first embodiment in FIG. 1A, of which the unit for the curvature radius, the central thickness, the distance, and the focal length is millimeters (mm). Surfaces 0-16 illustrate the surfaces from the object side to the image plane in the optical image capturing system. Table 2 shows the aspheric coefficients of the first embodiment, where k is the conic coefficient in the aspheric surface equation, and $A_1$-$A_{20}$ are respectively the first to the twentieth order aspheric surface coefficients. Besides, the tables in the following embodiments correspond to their respective schematic views and the diagrams of aberration curves, and definitions of the parameters in these tables are similar to those in the Table 1 and the Table 2, so the repetitive details will not be given here.

Second Embodiment

Figure 2A:
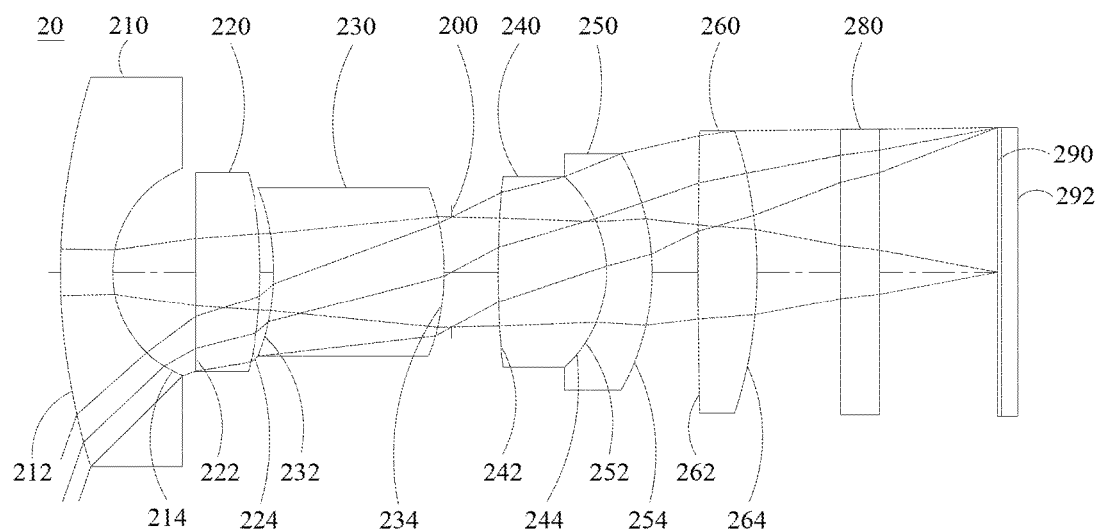
FIG. 2A is a schematic view of the optical image capturing system according to the second embodiment of the present invention.
Figure 2B:
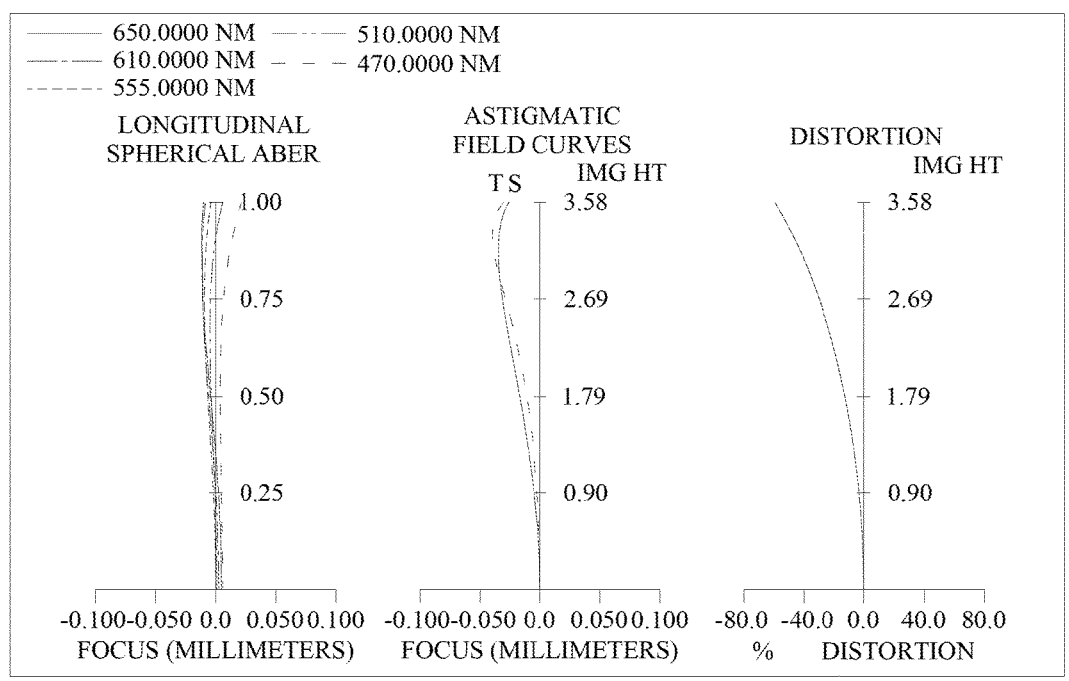
FIG. 2B shows the longitudinal spherical aberration curves, astigmatic field curves, and optical distortion curve of the optical image capturing system in the order from left to right according to the second embodiment of the present invention.
Figure 2C:
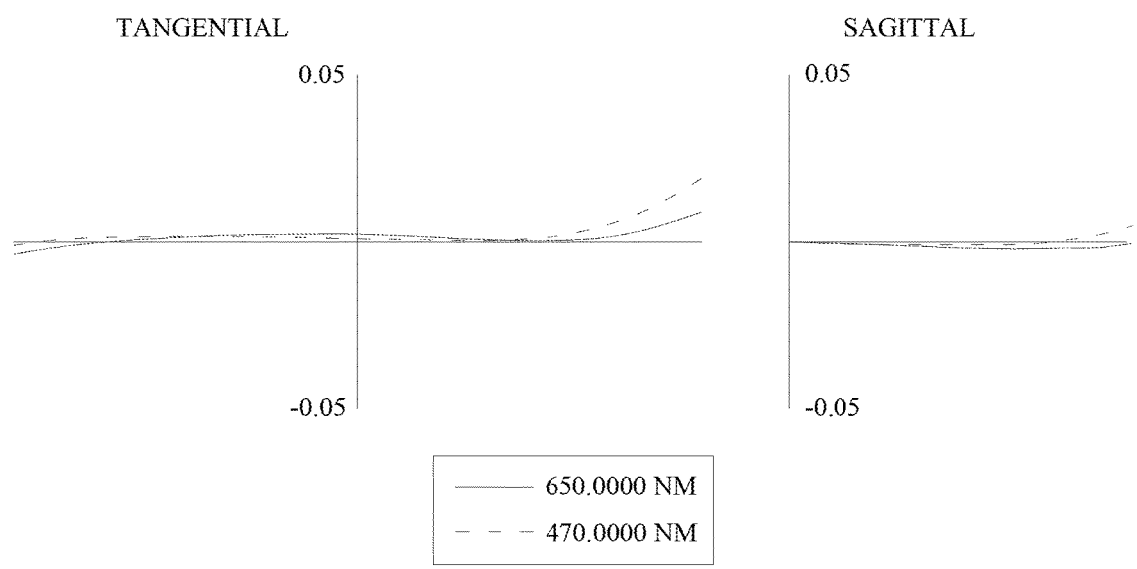
FIG. 2C is a transverse aberration diagram of the longest operation wavelength and the shortest operation wavelength for tangential fan and sagittal fan, in which the longest operation wavelength and the shortest operation wavelength pass through an edge of the entrance pupil and strike at the position of 0.7 HOI on the image plane, according to the second embodiment of the present invention.
Figure 2D:
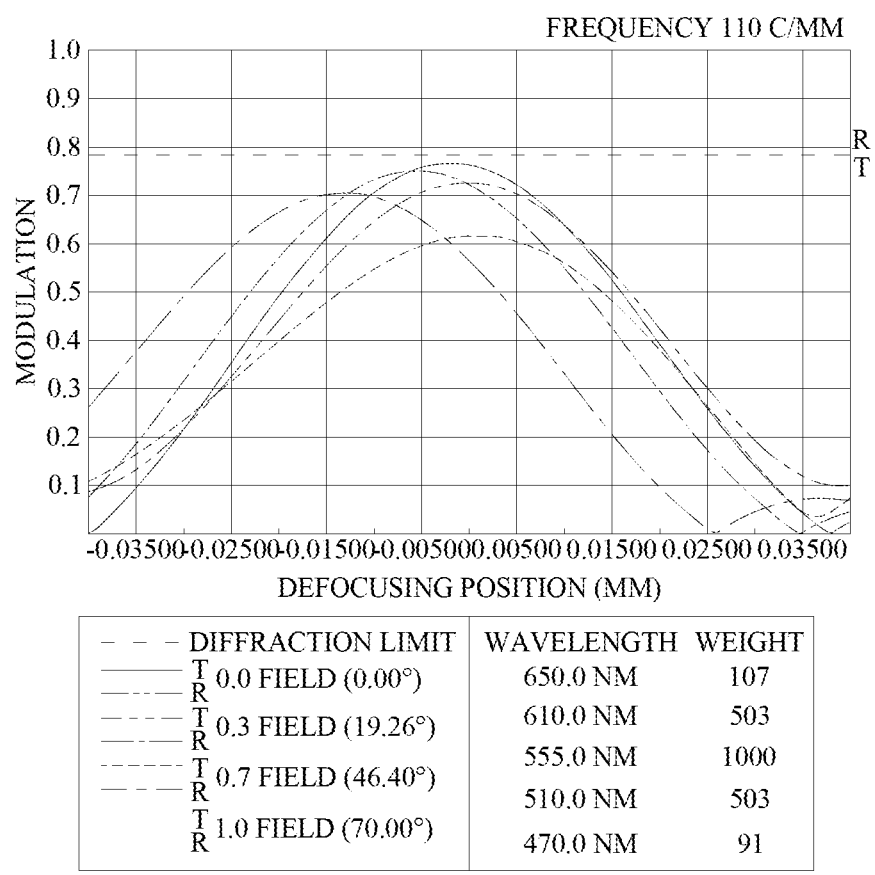
FIG. 2D is a diagram showing the through-focus MTF values of the visible light spectrum at the central field of view, 0.3 field of view, and 0.7 field of view of the second embodiment of the present invention.
Figure 2E:
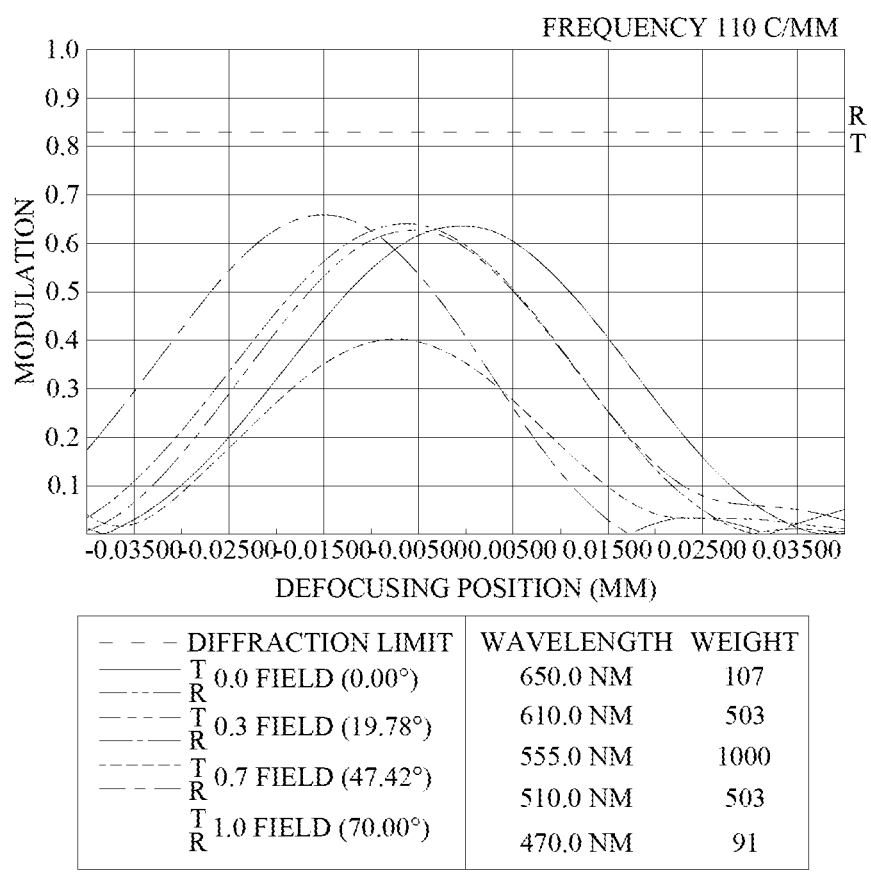
FIG. 2E is a diagram showing the through-focus MTF values of the infrared light spectrum at the central field of view, 0.3 field of view, and 0.7 field of view of the second embodiment of the present disclosure.

Please refer to FIGS. 2A to 2E. FIG. 2A is a schematic view of the optical image capturing system according to the second embodiment of the present invention. FIG. 2B shows the longitudinal spherical aberration curves, astigmatic field curves, and optical distortion curve of the optical image capturing system of the second embodiment, in the order from left to right. FIG. 2C is a transverse aberration diagram at 0.7 HOI on the image plane of the optical image capturing system of the second embodiment. FIG. 2D is a diagram showing the through-focus MTF values of the visible light spectrum at the central field of view, 0.3 field of view, and 0.7 field of view of the second embodiment of the present invention. FIG. 2E is a diagram showing the through-focus MTF values of the infrared light spectrum at the central field of view, 0.3 field of view, and 0.7 field of view of the second embodiment of the present disclosure. As shown in FIG. 2A, in the order from the object side to the image side, the optical image capturing system includes a first lens element 210, a second lens element 220, a third lens element 230, an aperture stop 200, a fourth lens element 240, a fifth lens element 250, a sixth lens element 260, an IR-bandstop filter 280, an image plane 290, and an image sensing device 292.

The first lens element 210 has negative refractive power and is made of glass material. The first lens element 210 has a convex object-side surface 212 and a concave image-side surface 214.

The second lens element 220 has positive refractive power and is made of glass material. The second lens element 220 has a convex object-side surface 222 and a convex image-side surface 224.

The third lens element 230 has positive refractive power and is made of glass material. The third lens element 230 has a concave object-side surface 232 and a convex image-side surface 234.

The fourth lens element 240 has positive refractive power and is made of glass material. The fourth lens element 240 has a convex object-side surface 242 and a convex image-side surface 244.

The fifth lens element 250 has negative refractive power and is made of glass material. The fifth lens element 250 has a concave object-side surface 252 and a convex image-side surface 254.

The sixth lens element 260 has positive refractive power and is made of glass material. The sixth lens element 260 has a convex object-side surface 262 and a convex image-side surface 264. With this configuration, the back focal distance of the optical image capturing system may be shortened and the system may be minimized. Besides, the incident angle of the off-axis rays can be reduced effectively, thereby further correcting the off-axis aberration.

The IR-bandstop filter 280 may be made of glass material and is disposed between the sixth lens element 260 and the image plane 290. The IR-bandstop filter 280 does not affect the focal length of the optical image capturing system.

Table 3 and Table 4 below should be incorporated into the reference of the present embodiment

TABLE 3

Lens Parameters for the Second Embodiment
f (focal length) = 3.220 mm; f/HEP = 2.8; HAF(half angle of view) = 70 deg

| Surface No. | | Curvature Radius | Thickness (mm) | Material | Refractive Index | Abbe No. | Focal Length |
|---|---|---|---|---|---|---|---|
| 0 | Object | 1E+18 | 1E+18 | | | | |
| 1 | Lens 1 | 15.50383959 | 1.333 | Glass | 1.806 | 40.73 | −4.351 |
| 2 | | 2.760266226 | 2.118 | | | | |
| 3 | Lens 2 | 952.4680298 | 1.654 | Glass | 2.002 | 19.32 | 10.125 |
| 4 | | −10.33767361 | 0.348 | | | | |
| 5 | Lens 3 | −5.848965726 | 4.360 | Glass | 1.806 | 40.73 | 19.874 |
| 6 | | −5.720412939 | 0.200 | | | | |
| 7 | Aperture Stop | 1E+18 | 1.178 | | | | |
| 8 | Lens 4 | 22.21817872 | 2.783 | Glass | 1.593 | 68.62 | 4.809 |
| 9 | | −3.127070653 | 0.010 | | | | |
| 10 | Lens 5 | −3.127070653 | 1.158 | Glass | 2.002 | 19.32 | −8.493 |
| 11 | | −5.833948357 | 1.178 | | | | |
| 12 | Lens 6 | 150.2215993 | 1.504 | Glass | 1.593 | 68.62 | 17.449 |
| 13 | | −11.09936717 | 2.150 | | | | |
| 14 | IR-bandstop Filter | 1E+18 | 1.000 | BK_7 | 1.517 | 64.13 | |
| 15 | | 1E+18 | 3.005 | | | | |
| 16 | Image Plane | 1E+18 | −0.005 | | | | |

Reference Wavelength = 555 nm

TABLE 4

The Aspheric Coefficients of the Second Embodiment
Table 4: Aspheric Coefficients

| | Surface No. | | | | | |
|---|---|---|---|---|---|---|
| | 1 | 2 | 3 | 4 | 5 | 6 |
| k | 0.000000E+00 | 0.000000E+00 | 0.000000E+00 | 0.000000E+00 | 0.000000E+00 | 0.000000E+00 |
| $A_4$ | 0.000000E+00 | 0.000000E+00 | 0.000000E+00 | 0.000000E+00 | 0.000000E+00 | 0.000000E+00 |
| $A_6$ | 0.000000E+00 | 0.000000E+00 | 0.000000E+00 | 0.000000E+00 | 0.000000E+00 | 0.000000E+00 |
| $A_8$ | 0.000000E+00 | 0.000000E+00 | 0.000000E+00 | 0.000000E+00 | 0.000000E+00 | 0.000000E+00 |
| $A_{10}$ | 0.000000E+00 | 0.000000E+00 | 0.000000E+00 | 0.000000E+00 | 0.000000E+00 | 0.000000E+00 |

| | Surface No. | | | | | |
|---|---|---|---|---|---|---|
| | 8 | 9 | 10 | 11 | 12 | 13 |
| K | 0.000000E+00 | 0.000000E+00 | 0.000000E+00 | 0.000000E+00 | 0.000000E+00 | 0.000000E+00 |
| $A_4$ | 0.000000E+00 | 0.000000E+00 | 0.000000E+00 | 0.000000E+00 | 0.000000E+00 | 0.000000E+00 |
| $A_6$ | 0.000000E+00 | 0.000000E+00 | 0.000000E+00 | 0.000000E+00 | 0.000000E+00 | 0.000000E+00 |
| $A_8$ | 0.000000E+00 | 0.000000E+00 | 0.000000E+00 | 0.000000E+00 | 0.000000E+00 | 0.000000E+00 |
| $A_{10}$ | 0.000000E+00 | 0.000000E+00 | 0.000000E+00 | 0.000000E+00 | 0.000000E+00 | 0.000000E+00 |

In the second embodiment, the presentation of the aspheric surface equation is similar to that in the first embodiment. Besides, the definitions of parameters in following tables are similar to those in the first embodiment, so the repetitive details will not be given here.

The following values for the conditions can be obtained from the data in Table 3 and Table 4.

| Second Embodiment (Primary Reference Wavelength = 587.5 nm) | | | | | |
|---|---|---|---|---|---|
| |f/f1| | |f/f2| | |f/f3| | |f/f4| | |f/f5| | |f/f6| |
| 0.73995 | 0.31800 | 0.16200 | 0.66956 | 0.37910 | 0.18452 |
| ΣPPR | ΣNPR | ΣPPR/ΣNPR | IN12/f | IN56/f | TP4/(IN34 + TP4 + IN45) |
| 1.01607 | 1.43704 | 0.70706 | 0.65779 | 0.36585 | 0.66719 |
| |f1/f2| | |f2/f3| | (TP1 + IN12)/TP2 | | (TP6 + IN56)/TP5 | |
| 0.42976 | 0.50943 | 2.08622 | | 2.31599 | |

-continued

| Second Embodiment (Primary Reference Wavelength = 587.5 nm) | | | | | |
|---|---|---|---|---|---|
| HOS | InTL | HOS/HOI | InS/HOS | ODT % | TDT % |
| 23.97390 | 17.82400 | 6.69101 | 0.58231 | −59.49890 | 40.99800 |
| HVT51 | HVT52 | HVT61 | HVT62 | HVT62/HOI | HVT62/HOS |
| 0 | 0 | 0 | 0 | 0 | 0 |
| TP2/TP3 | TP3/TP4 | InRS61 | InRS62 | \|InRS61\|/TP6 | \|InRS62\|/TP6 |
| 0.37944 | 1.56676 | 0.03829 | −0.56909 | 0.02546 | 0.37843 |
| PSTA | PLTA | NSTA | NLTA | SSTA | SLTA |
| 0.021 mm | 0.010 mm | −0.001 mm | −0.004 mm | 0.005 mm | −0.00043 mm |
| VSFS0 | VSFS3 | VSFS7 | VTFS0 | VTFS3 | VTFS7 |
| −0.000 | −0.005 | −0.010 | −0.000 | −0.000 | 0.005 |
| VSMTF0 | VSMTF3 | VSMTF7 | VTMTF0 | VTMTF3 | VTMTF7 |
| 0.883 | 0.874 | 0.847 | 0.883 | 0.858 | 0.787 |
| ISFS0 | ISFS3 | ISFS7 | ITFS0 | ITFS3 | ITFS7 |
| 0.005 | −0.000 | −0.000 | 0.005 | 0.010 | 0.020 |
| ISMTF0 | ISMTF3 | ISMTF7 | ITMTF0 | ITMTF3 | ITMTF7 |
| 0.825 | 0.828 | 0.777 | 0.825 | 0.830 | 0.763 |
| FS | AIFS | AVFS | AFS | | |
| 0.005 | 0.007 | −0.002 | 0.008 | | |

The values pertaining to the length of the outline curves are obtainable from the data in Table 3 and Table 4:

| Second Embodiment (Primary Reference Wavelength = 587.5 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 0.575 | 0.574 | −0.00080 | 99.86% | 1.333 | 43.06% |
| 12 | 0.575 | 0.578 | 0.00329 | 100.57% | 1.333 | 43.37% |
| 21 | 0.575 | 0.574 | −0.00093 | 99.84% | 1.654 | 34.70% |
| 22 | 0.575 | 0.574 | −0.00063 | 99.89% | 1.654 | 34.72% |
| 31 | 0.575 | 0.575 | −0.00000 | 100.00% | 4.360 | 13.19% |
| 32 | 0.575 | 0.575 | 0.00004 | 100.01% | 4.360 | 13.19% |
| 41 | 0.575 | 0.574 | −0.00086 | 99.85% | 2.783 | 20.63% |
| 42 | 0.575 | 0.577 | 0.00234 | 100.41% | 2.783 | 20.75% |
| 51 | 0.575 | 0.577 | 0.00234 | 100.41% | 1.158 | 49.85% |
| 52 | 0.575 | 0.575 | 0.00000 | 100.00% | 1.158 | 49.65% |
| 61 | 0.575 | 0.574 | −0.00093 | 99.84% | 1.504 | 38.17% |
| 62 | 0.575 | 0.574 | −0.00067 | 99.88% | 1.504 | 38.19% |

| ARS | EHD | ARS value | ARS − EHD | (ARS/EHD) % | TP | ARS/TP (%) |
|---|---|---|---|---|---|---|
| 11 | 4.965 | 5.053 | 0.08799 | 101.77% | 1.333 | 378.97% |
| 12 | 2.604 | 3.403 | 0.79838 | 130.66% | 1.333 | 255.19% |
| 21 | 2.509 | 2.508 | −0.00092 | 99.96% | 1.654 | 151.61% |
| 22 | 2.277 | 2.296 | 0.01873 | 100.82% | 1.654 | 138.78% |
| 31 | 2.127 | 2.177 | 0.04952 | 102.33% | 4.360 | 49.93% |
| 32 | 1.605 | 1.626 | 0.02122 | 101.32% | 4.360 | 37.29% |
| 41 | 2.000 | 2.002 | 0.00213 | 100.11% | 2.783 | 71.93% |
| 42 | 2.392 | 2.723 | 0.33133 | 113.85% | 2.783 | 97.87% |
| 51 | 2.386 | 2.714 | 0.32812 | 113.75% | 1.158 | 234.40% |
| 52 | 2.973 | 3.118 | 0.14580 | 104.90% | 1.158 | 269.31% |
| 61 | 3.446 | 3.446 | 0.00008 | 100.00% | 1.504 | 229.17% |
| 62 | 3.564 | 3.628 | 0.06384 | 101.79% | 1.504 | 241.27% |

The following values for the conditional expressions can be obtained from the data in Table 3 and Table 4.

| Values Related to Inflection Point of Second Embodiment (Primary Reference Wavelength = 555 nm) | | | | | | | |
|---|---|---|---|---|---|---|---|
| HIF311 | 0 | HIF311/HOI | 0 | SGI311 | 0 | \|SGI311\|/(\|SGI311\| + TP3) | 0 |

Third Embodiment

Figure 3A:
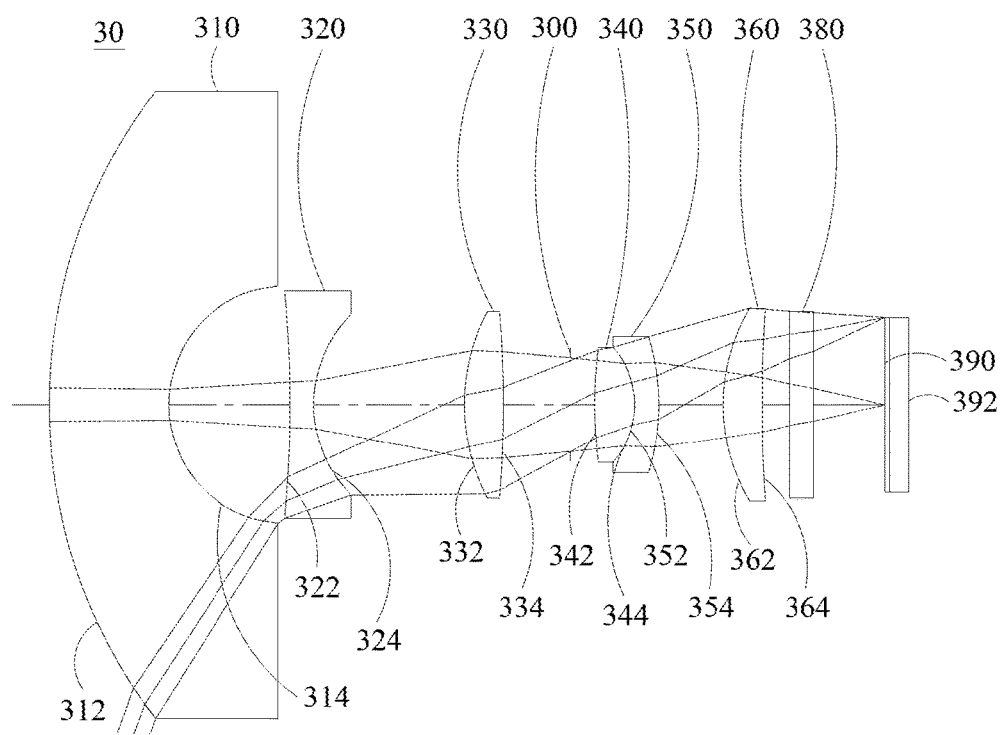
FIG. 3A is a schematic view of the optical image capturing system according to the third embodiment of the present invention.
Figure 3B:
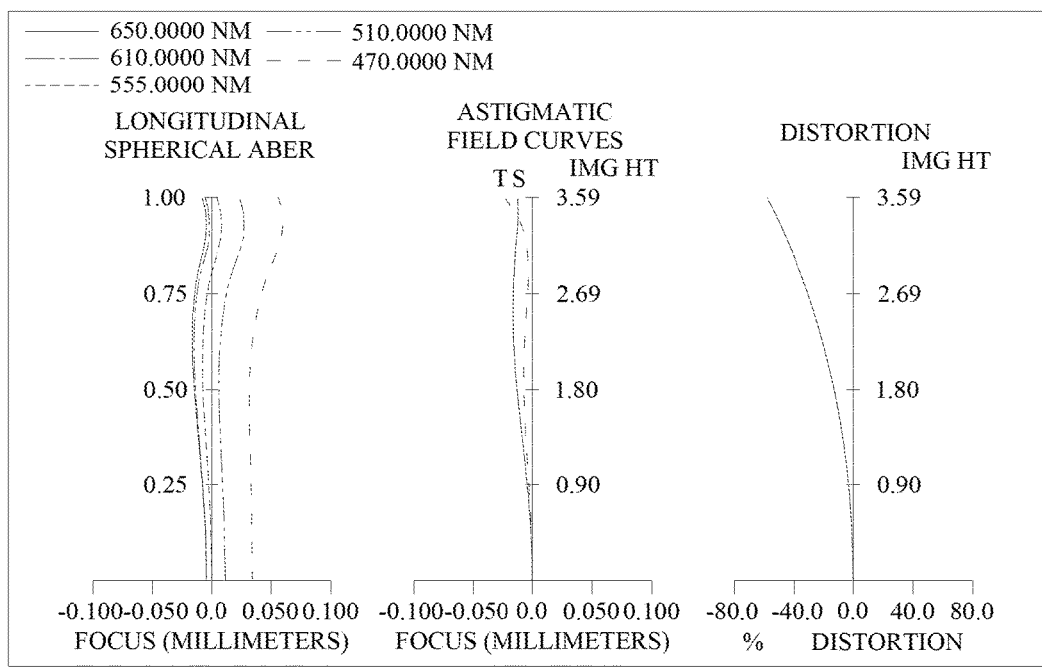
FIG. 3B shows the longitudinal spherical aberration curves, astigmatic field curves, and optical distortion curve of the optical image capturing system in the order from left to right according to the third embodiment of the present invention.
Figure 3C:
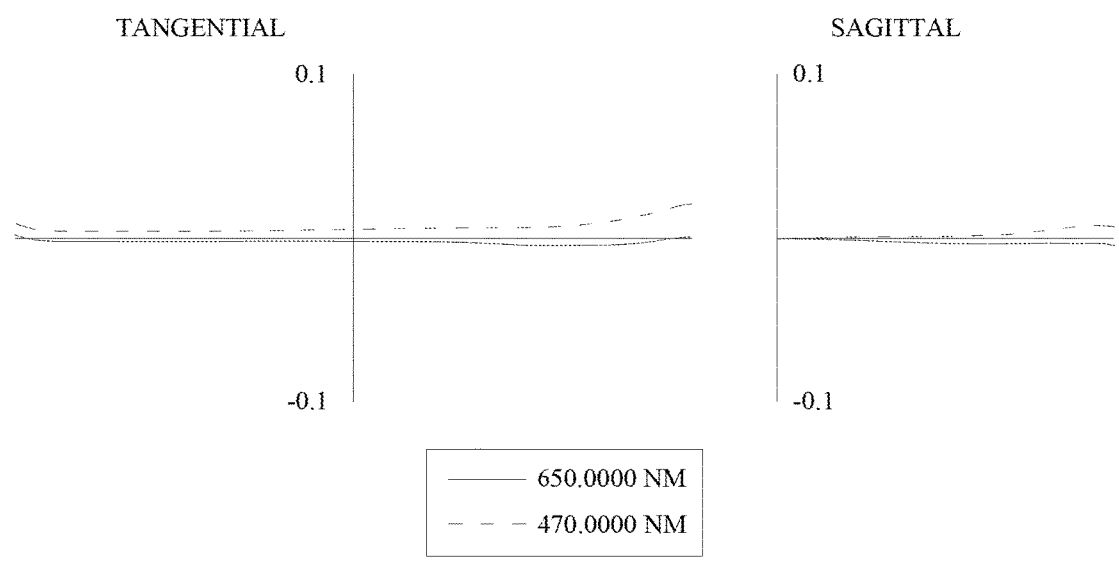
FIG. 3C is a transverse aberration diagram of the longest operation wavelength and the shortest operation wavelength for tangential fan and sagittal fan, in which the longest operation wavelength and the shortest operation wavelength pass through an edge of the entrance pupil and strike at the position of 0.7 HOI on the image plane, according to the third embodiment of the present invention.
Figure 3D:
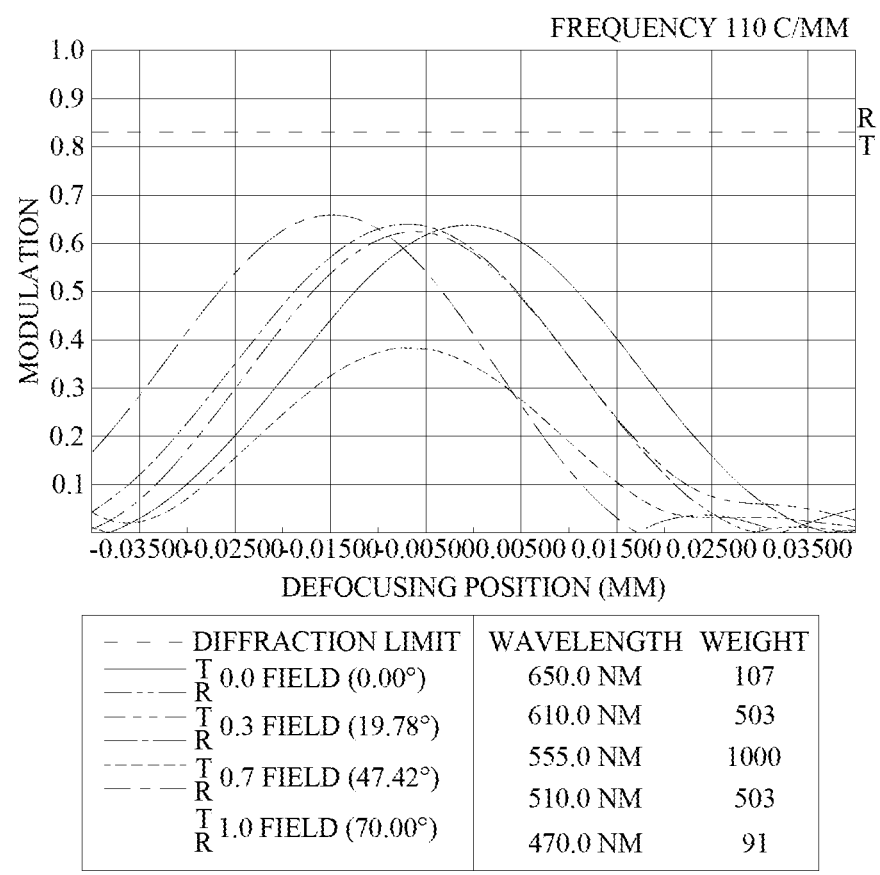
FIG. 3D is a diagram showing the through-focus MTF values of the visible light spectrum at the central field of view, 0.3 field of view, and 0.7 field of view of the third embodiment of the present invention.
Figure 3E:
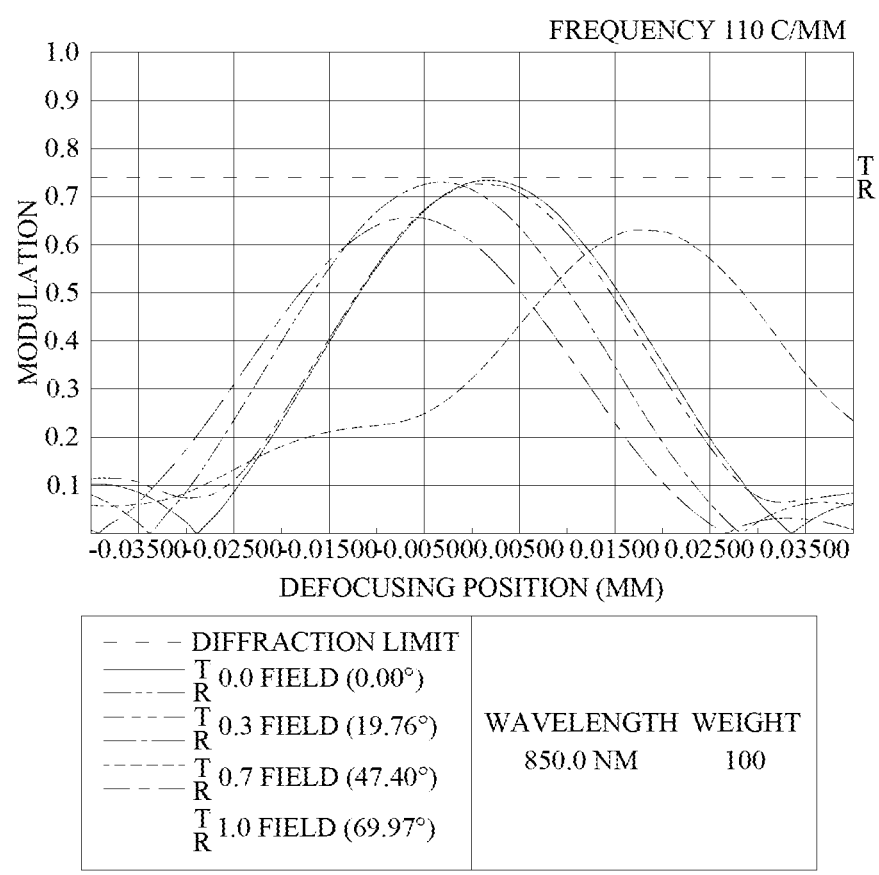
FIG. 3E is a diagram showing the through-focus MTF values of the infrared light spectrum at the central field of view, 0.3 field of view, and 0.7 field of view of the third embodiment of the present disclosure.

Please refer to FIGS. 3A to 3E. FIG. 3A is a schematic view of the optical image capturing system according to the third embodiment of the present invention. FIG. 3B shows the longitudinal spherical aberration curves, astigmatic field curves, and optical distortion curve of the optical image capturing system, in the order from left to right, according to the third embodiment of the present invention. FIG. 3C is a transverse aberration diagram at 0.7 HOI on the image plane of the optical image capturing system of the third embodiment. FIG. 3D is a diagram showing the through-focus MTF values of the visible light spectrum at the central field of view, 0.3 field of view, and 0.7 field of view of the third embodiment of the present invention. FIG. 3E is a diagram showing the through-focus MTF values of the infrared light spectrum at the central field of view, 0.3 field of view, and 0.7 field of view of the third embodiment of the present disclosure. As shown in FIG. 3A, in the order from the object side to the image side, the optical image capturing system includes a first lens element 310, a second lens element 320, a third lens element 330, an aperture stop 300, a fourth lens element 340, a fifth lens element 350, a sixth lens element 360, an IR-bandstop filter 380, an image plane 390, and an image sensing device 392.

The first lens element 310 has negative refractive power and is made of glass material. The first lens element 310 has a convex object-side surface 312 and a concave image-side surface 314.

The second lens element 320 has negative refractive power and is made of glass material. The second lens element 320 has a concave object-side surface 322 and a concave image-side surface 324.

The third lens element 330 has positive refractive power and is made of glass material. The third lens element 330 has a convex object-side surface 332 and a convex image-side surface 334.

The fourth lens element 340 has positive refractive power and is made of glass material. The fourth lens element 340 has a convex object-side surface 342 and a convex image-side surface 344.

The fifth lens element 350 has negative refractive power and is made of glass material. The fifth lens element 350 has a concave object-side surface 352 and a convex image-side surface 354.

The sixth lens element 360 has positive refractive power and is made of glass material. The sixth lens element 360 has a convex object-side surface 362 and a concave image-side surface 364. With this configuration, the back focal distance of the optical image capturing system may be shortened and the system may be minimized. Besides, the incident angle of the off-axis rays can be reduced effectively, thereby further correcting the off-axis aberration.

The IR-bandstop filter 380 is made of glass material and is disposed between the sixth lens element 360 and the image plane 390, without affecting the focal length of the optical image capturing system.

Table 5 and Table 6 below should be incorporated into the reference of the present embodiment.

TABLE 5

Lens Parameters for the Third Embodiment
f (focal length) = 3.13312 mm; f/HEP = 2.2; HAF(half angle of view) = 70 deg

| Surface No. | | Curvature Radius | Thickness (mm) | Material | Refractive Index | Abbe No. | Focal Length |
|---|---|---|---|---|---|---|---|
| 0 | Object | 1E+18 | 1E+18 | | | | |
| 1 | Lens 1 | 21.06858721 | 5.000 | Glass | 1.592 | 67.02 | −12.165 |
| 2 | | 4.902623177 | 5.083 | | | | |
| 3 | Lens 2 | −50.27573594 | 1.000 | Glass | 1.592 | 67.02 | −8.002 |
| 4 | | 5.28482509 | 6.289 | | | | |
| 5 | Lens 3 | 8.156101376 | 1.615 | Glass | 1.834 | 37.29 | 8.516 |
| 6 | | −52.15251242 | 2.843 | | | | |
| 7 | Aperture Stop | 1E+18 | 1.008 | | | | |
| 8 | Lens 4 | 17.62206835 | 1.669 | Glass | 1.623 | 58.12 | 4.898 |
| 9 | | −3.569767174 | 0.005 | | | | |
| 10 | Lens 5 | −3.569767174 | 1.000 | Glass | 2.002 | 19.32 | −6.139 |
| 11 | | −9.586705053 | 2.701 | | | | |
| 12 | Lens 6 | 7.668903113 | 1.633 | Glass | 1.589 | 61.25 | 14.587 |
| 13 | | 64.06146642 | 1.151 | | | | |
| 14 | IR-bandstop Filter | 1E+18 | 1.000 | BK_7 | 1.517 | 64.13 | |
| 15 | | 1E+18 | 3.003 | | | | |
| 16 | Image Plane | 1E+18 | −0.001 | | | | |

Reference Wavelength = 555 nm

Table 6: The Aspheric Coefficients of the Third Embodiment

TABLE 6

Aspheric Coefficients

| Surface No. | 1 | 2 | 3 | 4 | 5 | 6 | 8 |
|---|---|---|---|---|---|---|---|
| k | 0.000000E+00 | 0.000000E+00 | 0.000000E+00 | 0.000000E+00 | 0.000000E+00 | 0.000000E+00 | 0.000000E+00 |
| $A_4$ | 0.000000E+00 | 0.000000E+00 | 0.000000E+00 | 0.000000E+00 | 0.000000E+00 | 0.000000E+00 | 0.000000E+00 |
| $A_6$ | 0.000000E+00 | 0.000000E+00 | 0.000000E+00 | 0.000000E+00 | 0.000000E+00 | 0.000000E+00 | 0.000000E+00 |
| $A_8$ | 0.000000E+00 | 0.000000E+00 | 0.000000E+00 | 0.000000E+00 | 0.000000E+00 | 0.000000E+00 | 0.000000E+00 |
| $A_{10}$ | 0.000000E+00 | 0.000000E+00 | 0.000000E+00 | 0.000000E+00 | 0.000000E+00 | 0.000000E+00 | 0.000000E+00 |

| Surface No. | 9 | 10 | 11 | 12 | 13 |
|---|---|---|---|---|---|
| k | 0.000000E+00 | 0.000000E+00 | 0.000000E+00 | 0.000000E+00 | 0.000000E+00 |
| $A_4$ | 0.000000E+00 | 0.000000E+00 | 0.000000E+00 | 0.000000E+00 | 0.000000E+00 |
| $A_6$ | 0.000000E+00 | 0.000000E+00 | 0.000000E+00 | 0.000000E+00 | 0.000000E+00 |
| $A_8$ | 0.000000E+00 | 0.000000E+00 | 0.000000E+00 | 0.000000E+00 | 0.000000E+00 |
| $A_{10}$ | 0.000000E+00 | 0.000000E+00 | 0.000000E+00 | 0.000000E+00 | 0.000000E+00 |

In the third embodiment, the presentation of the aspheric surface equation is similar to that in the first embodiment. Besides, the definitions of parameters in following tables are similar to those in the first embodiment, so the repetitive details will not be given here.

The following values for the conditional expressions can be obtained from the data in Table 5 and Table 6.

| Third Embodiment (Primary Reference Wavelength = 555 nm) | | | | | |
|---|---|---|---|---|---|
| \|f/f1\| | \|f/f2\| | \|f/f3\| | \|f/f4\| | \|f/f5\| | \|f/f6\| |
| 0.25756 | 0.39154 | 0.36791 | 0.63964 | 0.51037 | 0.21479 |
| ΣPPR | ΣNPR | ΣPPR/\|ΣNPR\| | IN12/f | IN56/f | TP4/(IN34 +TP4 +IN45) |
| 1.00755 | 1.23180 | 0.81795 | 1.62242 | 0.86193 | 0.30210 |
| \|f1/f2\| | \|f2/f3\| | (TP1 + IN12)/TP2 | | (TP6 + IN56)/TP5 | |
| 1.52020 | 0.93966 | 10.08325 | | 4.33367 | |
| HOS | InTL | HOS/HOI | InS/HOS | ODT % | TDT % |
| 34.99940 | 29.84690 | 9.76818 | 0.37626 | −58.38520 | 39.32430 |
| HVT51 | HVT52 | HVT61 | HVT62 | HVT62/HOI | HVT62/HOS |
| 0 | 0 | 0 | 0 | 0 | 0 |
| TP2/TP3 | TP3/TP4 | InRS61 | InRS62 | \|InRS61\|/TP6 | \|InRS62\|/TP6 |
| 0.61916 | 0.96750 | 1.11307 | 0.12094 | 0.68155 | 0.07406 |
| PSTA | PLTA | NSTA | NLTA | SSTA | SLTA |
| 0.023 mm | 0.001 mm | 0.010 mm | 0.002 mm | 0.008 mm | −0.005 mm |
| VSFS0 | VSFS3 | VSFS7 | VTFS0 | VTFS3 | VTFS7 |
| 0.005 | −0.005 | −0.010 | 0.005 | −0.005 | −0.005 |
| VSMTF0 | VSMTF3 | VSMTF7 | VTMTF0 | VTMTF3 | VTMTF7 |
| 0.809 | 0.811 | 0.822 | 0.809 | 0.798 | 0.675 |
| ISFS0 | ISFS3 | ISFS7 | ITFS0 | ITFS3 | ITFS7 |
| −0.000 | −0.005 | −0.005 | −0.000 | −0.000 | 0.020 |
| ISMTF0 | ISMTF3 | ISMTF7 | ITMTF0 | ITMTF3 | ITMTF7 |
| 0.862 | 0.860 | 0.837 | 0.862 | 0.861 | 0.829 |
| FS | AIFS | AVFS | AFS | | |
| 0.005 | 0.002 | −0.003 | 0.004 | | |

The values pertaining to the length of the outline curves are obtainable from the data in Table 5 and Table 6:

| Third Embodiment (Primary Reference Wavelength = 555 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 0.712 | 0.712 | 0.00006 | 100.01% | 5.000 | 14.24% |
| 12 | 0.712 | 0.715 | 0.00245 | 100.34% | 5.000 | 14.29% |
| 21 | 0.712 | 0.712 | −0.00005 | 99.99% | 1.000 | 71.20% |
| 22 | 0.712 | 0.714 | 0.00210 | 100.29% | 1.000 | 71.42% |
| 31 | 0.712 | 0.713 | 0.00084 | 100.12% | 1.615 | 44.14% |
| 32 | 0.712 | 0.712 | −0.00005 | 99.99% | 1.615 | 44.09% |
| 41 | 0.712 | 0.712 | 0.00012 | 100.02% | 1.669 | 42.66% |
| 42 | 0.712 | 0.717 | 0.00473 | 100.66% | 1.669 | 42.94% |
| 51 | 0.712 | 0.717 | 0.00473 | 100.66% | 1.000 | 71.68% |
| 52 | 0.712 | 0.713 | 0.00058 | 100.08% | 1.000 | 71.27% |
| 61 | 0.712 | 0.713 | 0.00095 | 100.13% | 1.633 | 43.66% |
| 62 | 0.712 | 0.712 | −0.00006 | 99.99% | 1.633 | 43.60% |
| ARS | EHD | ARS value | ARS − EHD | (ARS/EHD) % | TP | ARS/TP (%) |
| 11 | 13.287 | 14.377 | 1.09006 | 108.20% | 5.000 | 287.54% |
| 12 | 4.900 | 7.541 | 2.64033 | 153.88% | 5.000 | 150.81% |
| 21 | 4.825 | 4.831 | 0.00647 | 100.13% | 1.000 | 483.14% |
| 22 | 3.806 | 4.248 | 0.44195 | 111.61% | 1.000 | 424.78% |
| 31 | 3.713 | 3.854 | 0.14128 | 103.81% | 1.615 | 238.61% |
| 32 | 3.860 | 3.863 | 0.00253 | 100.07% | 1.615 | 239.15% |
| 41 | 2.307 | 2.313 | 0.00582 | 100.25% | 1.669 | 138.53% |
| 42 | 2.388 | 2.616 | 0.22746 | 109.52% | 1.669 | 156.70% |
| 51 | 2.385 | 2.611 | 0.22585 | 109.47% | 1.000 | 261.05% |
| 52 | 2.800 | 2.840 | 0.04037 | 101.44% | 1.000 | 284.04% |
| 61 | 4.057 | 4.275 | 0.21787 | 105.37% | 1.633 | 261.77% |
| 62 | 4.016 | 4.018 | 0.00175 | 100.04% | 1.633 | 246.01% |

The following values for the conditional expressions can be obtained from the data in Table 5 and Table 6.

| Values Related to Inflection Point of Third Embodiment (Primary Reference Wavelength = 555 nm) | | | | | | | |
|---|---|---|---|---|---|---|---|
| HIF311 | 0 | HIF311/HOI | 0 | SGI311 | 0 | \|SGI311\|/(\|SGI311\| + TP3) | 0 |

Fourth Embodiment

Figure 4A:
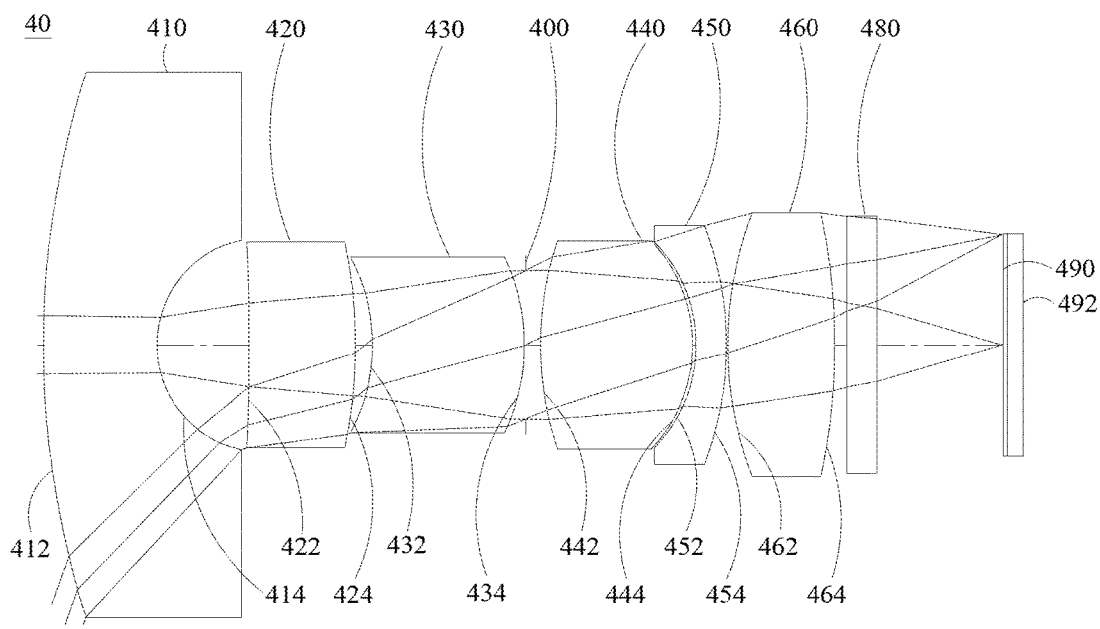
FIG. 4A is a schematic view of the optical image capturing system according to the fourth embodiment of the present invention.
Figure 4B:
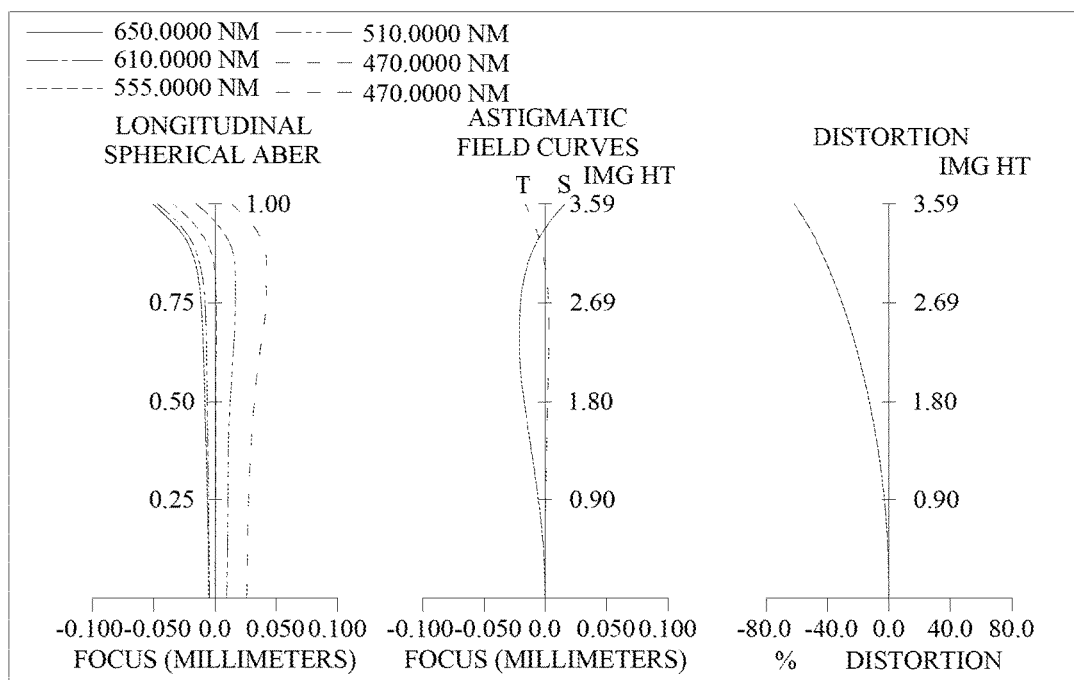
FIG. 4B shows the longitudinal spherical aberration curves, astigmatic field curves, and optical distortion curve of the optical image capturing system in the order from left to right according to the fourth embodiment of the present invention.
Figure 4C:
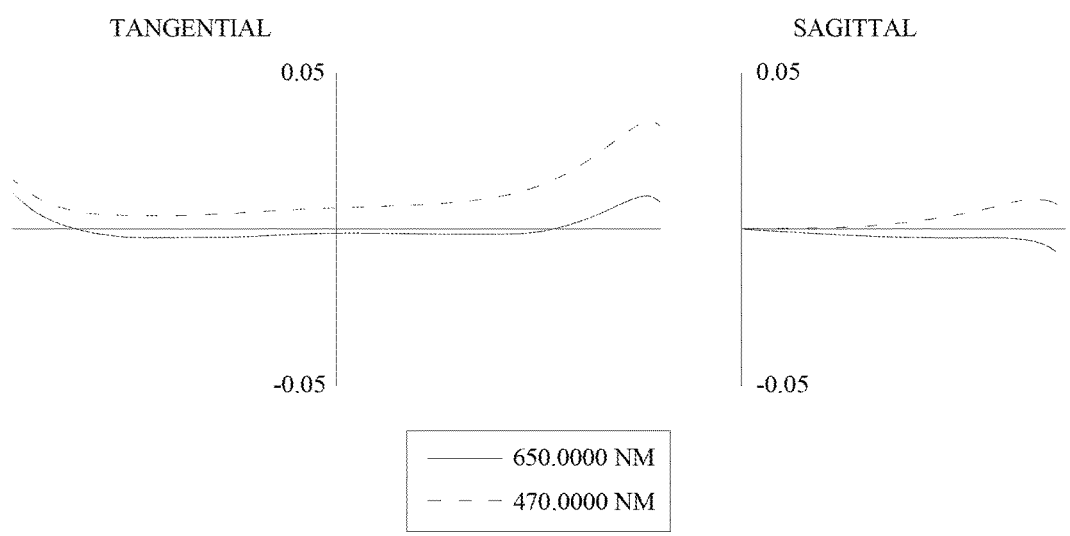
FIG. 4C is a transverse aberration diagram of the longest operation wavelength and the shortest operation wavelength for tangential fan and sagittal fan, in which the longest operation wavelength and the shortest operation wavelength pass through an edge of the entrance pupil and strike at the position of 0.7 HOI on the image plane, according to the fourth embodiment of the present invention.
Figure 4D:
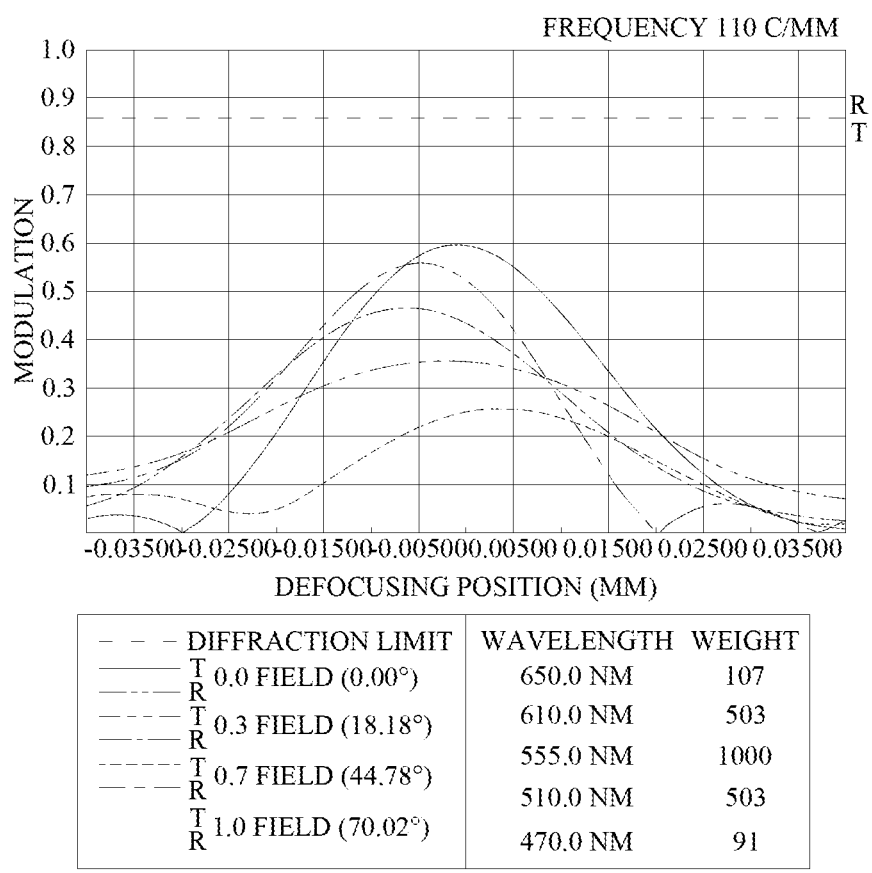
FIG. 4D is a diagram showing the through-focus MTF values of the visible light spectrum at the central field of view, 0.3 field of view, and 0.7 field of view of the fourth embodiment of the present invention.
Figure 4E:
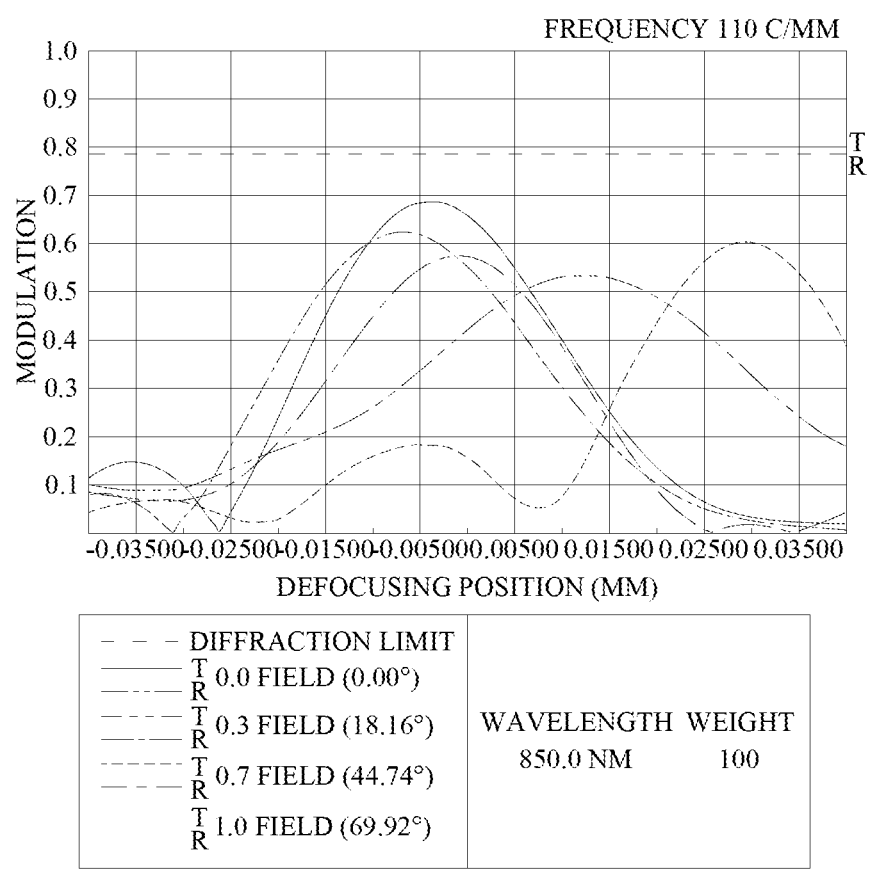
FIG. 4E is a diagram showing the through-focus MTF values of the infrared light spectrum at the central field of view, 0.3 field of view, and 0.7 field of view of the fourth embodiment of the present disclosure.

Please refer to FIGS. 4A to 4E. FIG. 4A is a schematic view of the optical image capturing system according to the fourth embodiment of the present invention. FIG. 4B shows the longitudinal spherical aberration curves, astigmatic field curves, and optical distortion curve of the optical image capturing system, in the order from left to right, according to the fourth embodiment of the present invention. FIG. 4C is a transverse aberration diagram at 0.7 HOI on the image plane of the optical image capturing system of the fourth embodiment. FIG. 4D is a diagram showing the through-focus MTF values of the visible light spectrum at the central field of view, 0.3 field of view, and 0.7 field of view of the fourth embodiment of the present invention. FIG. 4E is a diagram showing the through-focus MTF values of the infrared light spectrum at the central field of view, 0.3 field of view, and 0.7 field of view of the fourth embodiment of the present disclosure. As shown in FIG. 4A, in the order from the object side to the image side, the optical image capturing system includes a first lens element 410, a second lens element 420, a third lens element 430, an aperture stop 400, a fourth lens element 440, a fifth lens element 450, a sixth lens element 460, an IR-bandstop filter 480, an image plane 490, and an image sensing device 492.

The first lens element 410 has negative refractive power and is made of glass material. The first lens element 410 has a convex object-side surface 412 and a concave image-side surface 414.

The second lens element 420 has positive refractive power and is made of glass material. The second lens element 420 has a concave object-side surface 422 and a convex image-side surface 424.

The third lens element 430 has positive refractive power and is made of glass material. The third lens element 430 has a concave object-side surface 432 and a convex image-side surface 434.

The fourth lens element 440 has positive refractive power and is made of glass material. The fourth lens element 440 has a convex object-side surface 442 and a convex image-side surface 444.

The fifth lens element 450 has negative refractive power and is made of glass material. The fifth lens element 450 has a concave object-side surface 452 and a convex image-side surface 454.

The sixth lens element 460 has positive refractive power and is made of glass material. The sixth lens element 460 has a convex object-side surface 462 and a convex image-side surface 464. With this configuration, the back focal distance of the optical image capturing system may be shortened and the system may be minimized. Besides, the incident angle of the off-axis rays can be reduced effectively, thereby further correcting the off-axis aberration.

The IR-bandstop filter 480 is made of glass material and is disposed between the sixth lens element 460 and the image plane 490. The IR-bandstop filter 480 does not affect the focal length of the optical image capturing system.

Table 7 and Table 8 below should be incorporated into the reference of the present embodiment.

TABLE 7

Lens Parameters for the Fourth Embodiment
f(focal length) = 3.424 mm; f/HEP = 1.8; HAF(half angle of view) = 70 deg

| Surface No. | | Curvature Radius | Thickness (mm) | Material | Refractive Index | Abbe No. | Focal Length |
|---|---|---|---|---|---|---|---|
| 0 | Object | 1E+18 | 1E+18 | | | | |
| 1 | Lens 1 | 28.44749113 | 3.743 | Glass | 1.646 | 53.81 | −6.471 |
| 2 | | 3.467764375 | 3.045 | | | | |
| 3 | Lens 2 | −85.77732511 | 3.507 | Glass | 2.003 | 19.32 | 19.073 |
| 4 | | −16.08019123 | 0.559 | | | | |
| 5 | Lens 3 | −6.023474643 | 5.000 | Glass | 1.622 | 59.37 | 50.168 |
| 6 | | −6.662393423 | 0.050 | | | | |
| 7 | Aperture Stop | 1E+18 | 0.514 | | | | |
| 8 | Lens 4 | 10.55942956 | 5.000 | Glass | 1.593 | 68.62 | 6.395 |
| 9 | | −4.890551494 | 0.116 | | | | |
| 10 | Lens 5 | −4.752212769 | 1.000 | Glass | 2.003 | 19.32 | −9.148 |
| 11 | | −10.79771251 | 0.050 | | | | |
| 12 | Lens 6 | 11.79403333 | 3.533 | Glass | 1.593 | 68.62 | 13.181 |
| 13 | | −20.73414644 | 0.409 | | | | |
| 14 | IR-bandstop Filter | 1E+18 | 1.000 | BK_7 | 1.517 | 64.13 | |
| 15 | | 1E+18 | 4.147 | | | | |
| 16 | Image Plane | 1E+18 | 0.000 | | | | |

Reference Wavelength = 555 nm

Table 8: The Aspheric Coefficients of the Fourth Embodiment

TABLE 8

Aspheric Coefficients

| Surface No. | 1 | 2 | 3 | 4 | 5 | 6 | 8 |
|---|---|---|---|---|---|---|---|
| k | 0.000000E+00 | 0.000000E+00 | 0.000000E+00 | 0.000000E+00 | 0.000000E+00 | 0.000000E+00 | 0.000000E+00 |
| $A_4$ | 0.000000E+00 | 0.000000E+00 | 0.000000E+00 | 0.000000E+00 | 0.000000E+00 | 0.000000E+00 | 0.000000E+00 |
| $A_6$ | 0.000000E+00 | 0.000000E+00 | 0.000000E+00 | 0.000000E+00 | 0.000000E+00 | 0.000000E+00 | 0.000000E+00 |
| $A_8$ | 0.000000E+00 | 0.000000E+00 | 0.000000E+00 | 0.000000E+00 | 0.000000E+00 | 0.000000E+00 | 0.000000E+00 |
| $A_{10}$ | 0.000000E+00 | 0.000000E+00 | 0.000000E+00 | 0.000000E+00 | 0.000000E+00 | 0.000000E+00 | 0.000000E+00 |

| Surface No. | 9 | 10 | 11 | 12 | 13 |
|---|---|---|---|---|---|
| k | 0.000000E+00 | 0.000000E+00 | 0.000000E+00 | 0.000000E+00 | 0.000000E+00 |
| $A_4$ | 0.000000E+00 | 0.000000E+00 | 0.000000E+00 | 0.000000E+00 | 0.000000E+00 |
| $A_6$ | 0.000000E+00 | 0.000000E+00 | 0.000000E+00 | 0.000000E+00 | 0.000000E+00 |
| $A_8$ | 0.000000E+00 | 0.000000E+00 | 0.000000E+00 | 0.000000E+00 | 0.000000E+00 |
| $A_{10}$ | 0.000000E+00 | 0.000000E+00 | 0.000000E+00 | 0.000000E+00 | 0.000000E+00 |

In the fourth embodiment, the form of the aspheric surface equation is similar to that in the first embodiment. Besides, the definitions of parameters in following tables are similar to those in the first embodiment, so the repetitive details will not be given here.

The following values for the conditional expressions can be obtained from the data in Table 7 and Table 8.

| Fourth Embodiment (Primary Reference Wavelength = 555 nm) | | | | | |
|---|---|---|---|---|---|
| \|f/f1\| | \|f/f2\| | \|f/f3\| | \|f/f4\| | \|f/f5\| | \|f/f6\| |
| 0.52908 | 0.17950 | 0.06824 | 0.53538 | 0.37423 | 0.25974 |
| ΣPPR | ΣNPR | ΣPPR/\|ΣNPR\| | IN12/f | IN56/f | TP4/(IN34 + TP4 + IN45) |
| 1.49231 | 0.70858 | 2.10606 | 0.88945 | 0.01460 | 0.88028 |
| \|f1/f2\| | \|f2/f3\| | (TP1 + IN12)/TP2 | | (TP6 + IN56)/TP5 | |
| 0.33926 | 0.38019 | 1.93566 | | 3.58290 | |
| HOS | InTL | HOS/HOI | InS/HOS | ODT % | TDT % |
| 31.67120 | 26.11600 | 8.83930 | 0.49787 | −61.95350 | 43.27780 |
| HVT51 | HVT52 | HVT61 | HVT62 | HVT62/HOI | HVT62/HOS |
| 0 | 0 | 0 | 0 | 0 | 0 |
| TP2/TP3 | TP3/TP4 | InRS61 | InRS62 | \|InRS61\|/TP6 | \|InRS62\|/TP6 |
| 0.70133 | 1.00000 | 0.80181 | −0.44655 | 0.22695 | 0.12640 |
| PSTA | PLTA | NSTA | NLTA | SSTA | SLTA |
| 0.036 mm | 0.009 mm | 0.017 mm | 0.013 mm | 0.006 mm | −0.011 mm |
| VSFS0 | VSFS3 | VSFS7 | VTFS0 | VTFS3 | VTFS7 |
| −0.000 | −0.005 | −0.000 | −0.000 | 0.005 | 0.005 |
| VSMTF0 | VSMTF3 | VSMTF7 | VTMTF0 | VTMTF3 | VTMTF7 |
| 0.785 | 0.705 | 0.781 | 0.785 | 0.573 | 0.515 |
| ISFS0 | ISFS3 | ISFS7 | ITFS0 | ITFS3 | ITFS7 |
| −0.005 | −0.010 | −0.000 | −0.005 | 0.005 | 0.030 |
| ISMTF0 | ISMTF3 | ISMTF7 | ITMTF0 | ITMTF3 | ITMTF7 |
| 0.827 | 0.796 | 0.825 | 0.827 | 0.709 | 0.794 |
| FS | AIFS | AVFS | AFS | | |
| 0.005 | 0.003 | 0.001 | 0.002 | | |

The values pertaining to the length of the outline curves are obtainable from the data in Table 7 and Table 8:

| Fourth Embodiment (Primary Reference Wavelength = 555 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 0.951 | 0.951 | 0.00017 | 100.02% | 3.743 | 25.42% |
| 12 | 0.951 | 0.963 | 0.01234 | 101.30% | 3.743 | 25.74% |
| 21 | 0.951 | 0.951 | 0.00001 | 100.00% | 3.507 | 27.12% |
| 22 | 0.951 | 0.952 | 0.00055 | 100.06% | 3.507 | 27.14% |
| 31 | 0.951 | 0.955 | 0.00399 | 100.42% | 5.000 | 19.10% |
| 32 | 0.951 | 0.954 | 0.00325 | 100.34% | 5.000 | 19.09% |
| 41 | 0.951 | 0.952 | 0.00128 | 100.14% | 5.000 | 19.05% |
| 42 | 0.951 | 0.957 | 0.00609 | 100.64% | 5.000 | 19.14% |
| 51 | 0.951 | 0.957 | 0.00646 | 100.68% | 1.000 | 95.75% |
| 52 | 0.951 | 0.952 | 0.00123 | 100.13% | 1.000 | 95.22% |
| 61 | 0.951 | 0.952 | 0.00103 | 100.11% | 3.533 | 26.95% |
| 62 | 0.951 | 0.951 | 0.00033 | 100.03% | 3.533 | 26.93% |
| ARS | EHD | ARS value | ARS − EHD | (ARS/EHD) % | TP | ARS/TP (%) |
| 11 | 9.064 | 9.225 | 0.16074 | 101.77% | 3.743 | 246.49% |
| 12 | 3.416 | 4.847 | 1.43077 | 141.88% | 3.743 | 129.52% |
| 21 | 3.382 | 3.383 | 0.00070 | 100.02% | 3.507 | 96.47% |
| 22 | 2.936 | 2.953 | 0.01640 | 100.56% | 3.507 | 84.20% |
| 31 | 2.886 | 3.009 | 0.12268 | 104.25% | 5.000 | 60.17% |
| 32 | 2.660 | 2.736 | 0.07611 | 102.86% | 5.000 | 54.73% |
| 41 | 2.880 | 2.917 | 0.03686 | 101.28% | 5.000 | 58.34% |
| 42 | 3.409 | 3.771 | 0.36212 | 110.62% | 5.000 | 75.41% |
| 51 | 3.370 | 3.746 | 0.37594 | 111.16% | 1.000 | 374.61% |
| 52 | 3.913 | 4.003 | 0.09042 | 102.31% | 1.000 | 400.31% |
| 61 | 4.336 | 4.440 | 0.10391 | 102.40% | 3.533 | 125.68% |
| 62 | 4.345 | 4.377 | 0.03214 | 100.74% | 3.533 | 123.91% |

The following values for the conditional expressions can be obtained from the data in Table 7 and Table 8.

| Values Related to Inflection Point of Fourth Embodiment (Primary Reference Wavelength = 555 nm) | | | | | | | |
|---|---|---|---|---|---|---|---|
| HIF411 | 0 | HIF411/HOI | 0 | SGI411 | 0 | \|SGI411\|/ (\|SGI411\| + TP4) | 0 |

Fifth Embodiment

Figure 5A:
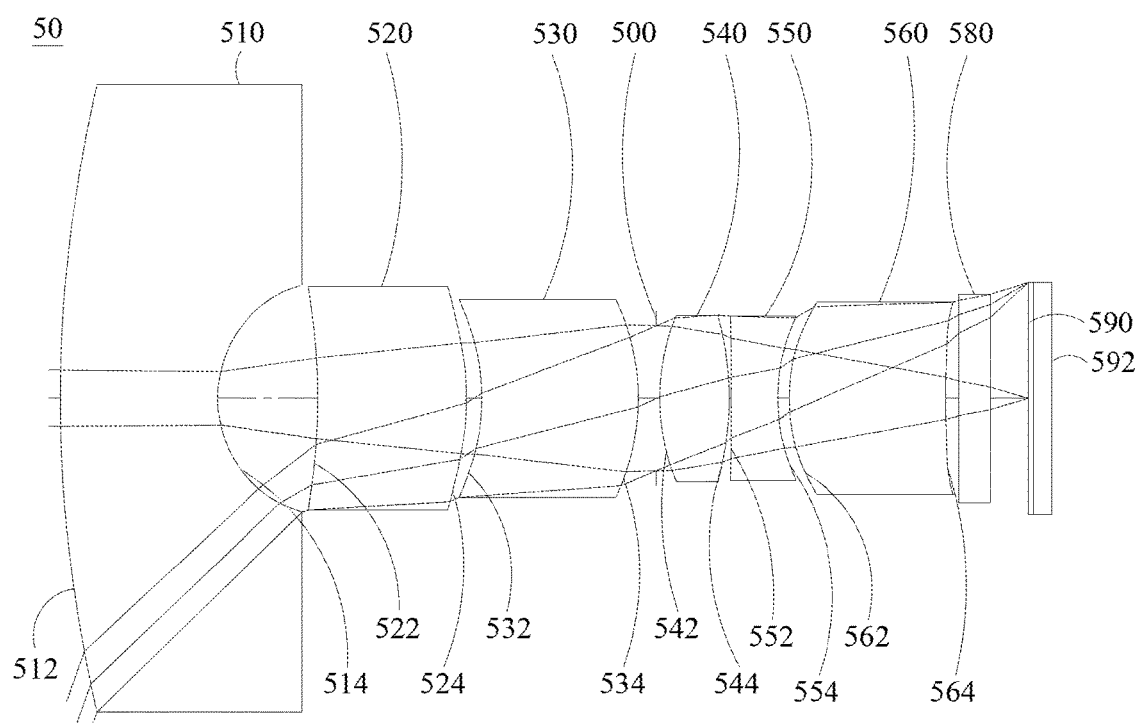
FIG. 5A is a schematic view of the optical image capturing system according to the fifth embodiment of the present invention.
Figure 5B:
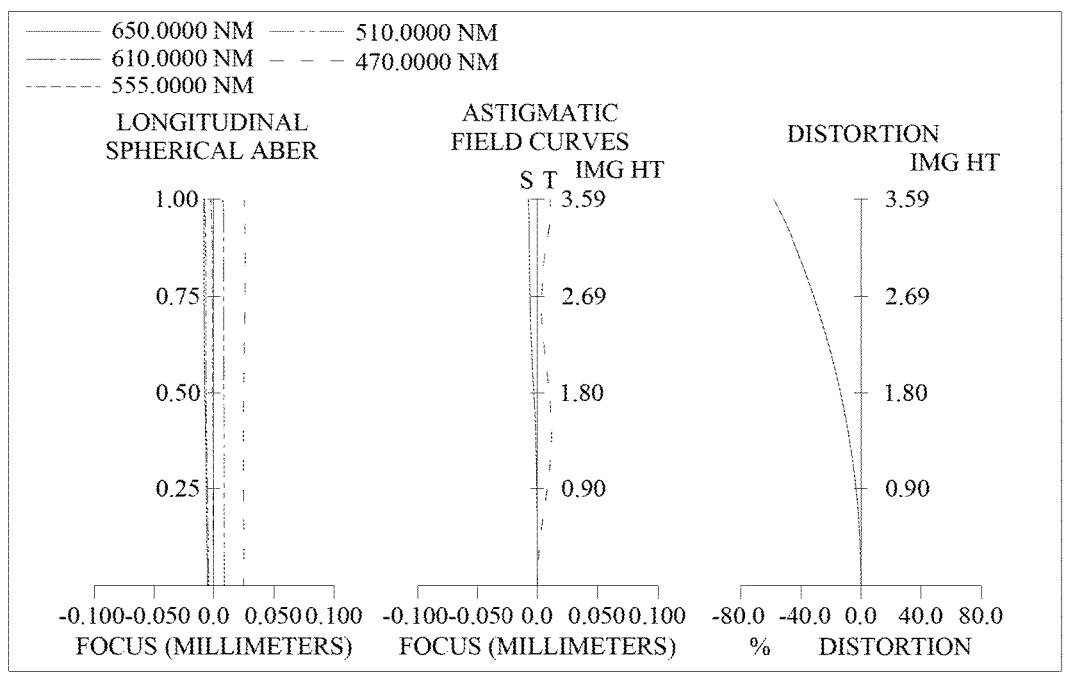
FIG. 5B shows the longitudinal spherical aberration curves, astigmatic field curves, and optical distortion curve of the optical image capturing system in the order from left to right according to the fifth embodiment of the present invention.
Figure 5C:
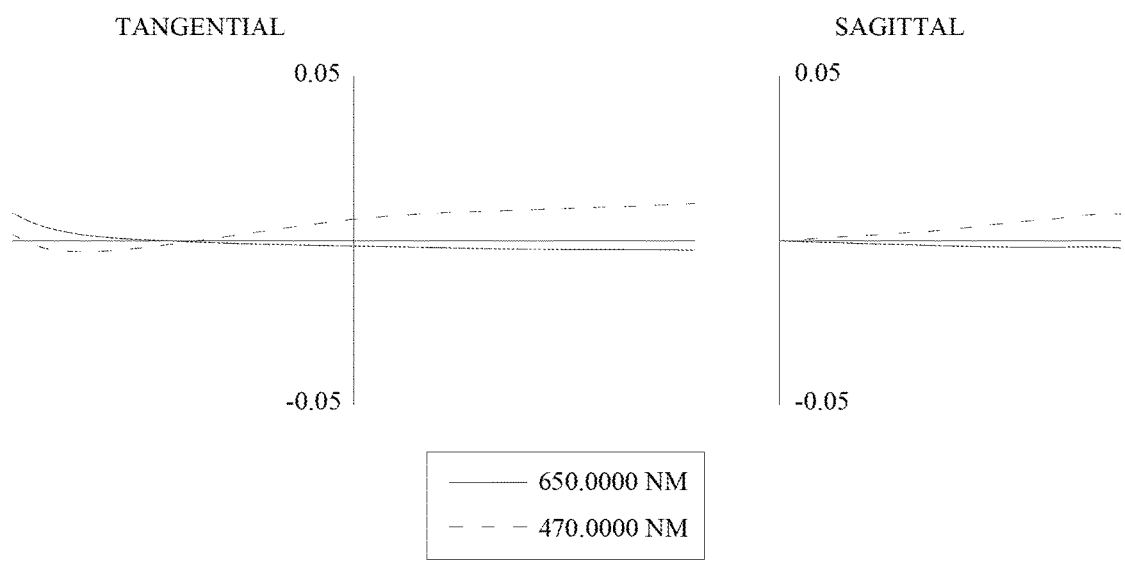
FIG. 5C is a transverse aberration diagram of the longest operation wavelength and the shortest operation wavelength for tangential fan and sagittal fan, in which the longest operation wavelength and the shortest operation wavelength pass through an edge of the entrance pupil and strike at the position of 0.7 HOI on the image plane, according to the fifth embodiment of the present invention.
Figure 5D:
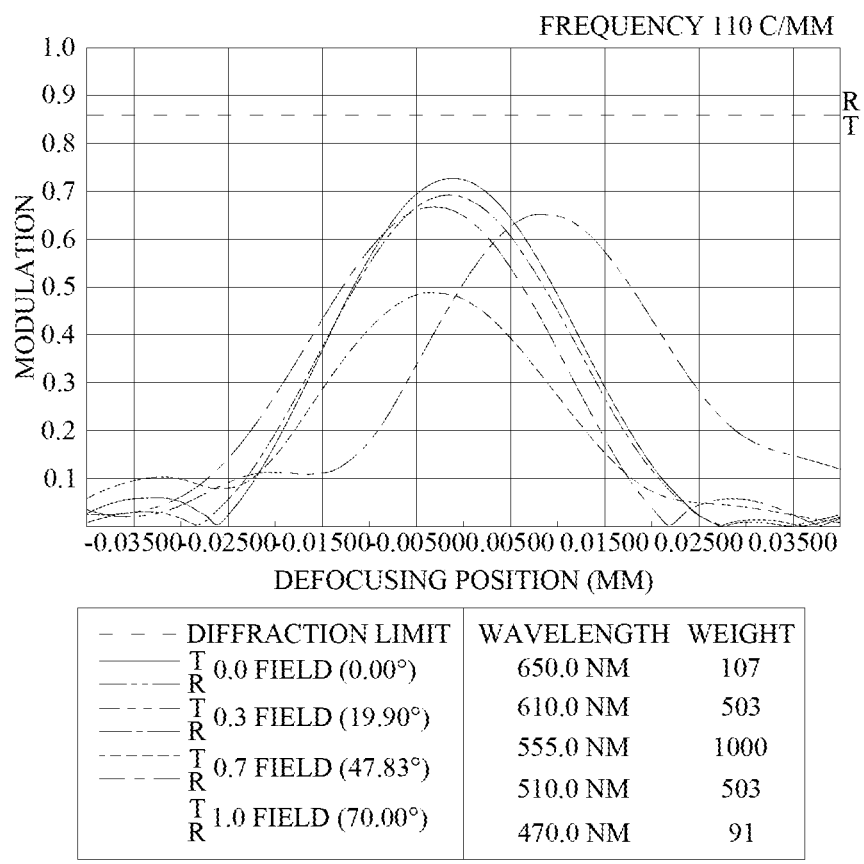
FIG. 5D is a diagram showing the through-focus MTF values of the visible light spectrum at the central field of view, 0.3 field of view, and 0.7 field of view of the fifth embodiment of the present invention.
Figure 5E:
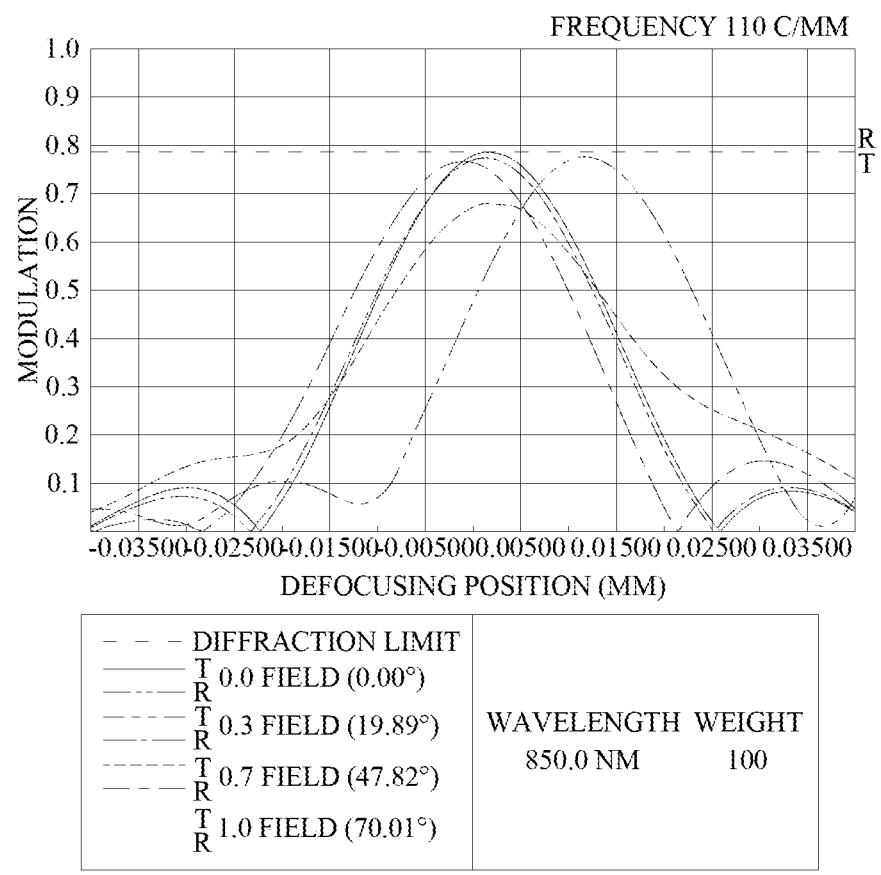
FIG. 5E is a diagram showing the through-focus MTF values of the infrared light spectrum at the central field of view, 0.3 field of view, and 0.7 field of view of the fifth embodiment of the present disclosure.

Please refer to FIGS. 5A to 5E. FIG. 5A is a schematic view of the optical image capturing system according to the fifth embodiment of the present invention. FIG. 5B shows the longitudinal spherical aberration curves, astigmatic field curves, and optical distortion curve of the optical image capturing system, in the order from left to right, according to the fifth embodiment of the present invention. FIG. 5C is a transverse aberration diagram at 0.7 HOI on the image plane of the optical image capturing system of the fifth embodiment. FIG. 5D is a diagram showing the through-focus MTF values of the visible light spectrum at the central field of view, 0.3 field of view, and 0.7 field of view of the fifth embodiment of the present invention. FIG. 5E is a diagram showing the through-focus MTF values of the infrared light spectrum at the central field of view, 0.3 field of view, and 0.7 field of view of the fifth embodiment of the present disclosure. As shown in FIG. 5A, in the order from an object side to an image side, the optical image capturing system includes a first lens element 510, a second lens element 520, a third lens element 530, an aperture stop 500, a fourth lens element 540, a fifth lens element 550, a sixth lens element 560, an IR-bandstop filter 580, an image plane 590, and an image sensing device 592.

The first lens element 510 has negative refractive power and is made of glass material. The first lens element 510 has a convex object-side surface 512 and a concave image-side surface 514, and both object-side surface 512 and image-side surface 514 are aspheric.

The second lens element 520 has positive refractive power and is made of glass material. The second lens element 520 has a concave object-side surface 522 and a convex image-side surface 524, and both object-side surface 522 and image-side surface 524 are aspheric.

The third lens element 530 has positive refractive power and is made of glass material. The third lens element 530 has a concave object-side surface 532 and a convex image-side surface 534, and both object-side surface 532 and image-side surface 534 are aspheric.

The fourth lens element 540 has positive refractive power and is made of glass material. The fourth lens element 540 has a convex object-side surface 542 and a convex image-side surface 544. Both object-side surface 542 and image-side surface 544 are aspheric.

The fifth lens element 550 has negative refractive power and is made of glass material. The fifth lens element 550 has a concave object-side surface 552 and a concave image-side surface 554. Both object-side surface 552 and image-side surface 554 are aspheric.

The sixth lens element 560 has positive refractive power and is made of glass material. The sixth lens element 560 has a convex object-side surface 562 and a concave image-side surface 564. Both object-side surface 562 and image-side surface 564 are aspheric. With this configuration, the back focal distance of the optical image capturing system may be shortened and the system may be minimized. Besides, the incident angle of the off-axis rays can be reduced effectively, thereby further correcting the off-axis aberration.

The IR-bandstop filter 580 is made of glass material and is disposed between the sixth lens element 560 and the image plane 590 without affecting the focal length of the optical image capturing system.

Table 9 and Table 10 below should be incorporated into the reference of the present embodiment.

TABLE 9

Lens Parameters for the Fifth Embodiment
f(focal length) = 3.127 mm; f/HEP = 1.8; HAF(half angle of view) = 70 deg

| Surface No. | | Curvature Radius | Thickness (mm) | Material | Refractive Index | Abbe No. | Focal Length |
|---|---|---|---|---|---|---|---|
| 0 | Object | 1E+18 | 1E+18 | | | | |
| 1 | Lens 1 | 38.52959102 | 5.000 | Glass | 1.642 | 47.71 | −6.638 |
| 2 | | 3.656930247 | 3.206 | | | | |
| 3 | Lens 2 | −19.03679349 | 4.722 | Glass | 2.002 | 21.75 | 13.091 |
| 4 | | −8.777441966 | 0.491 | | | | |
| 5 | Lens 3 | −6.302756358 | 5.000 | Glass | 1.599 | 63.03 | 36.670 |
| 6 | | −6.357767215 | 0.573 | | | | |
| 7 | Aperture Stop | 1E+18 | 0.110 | | | | |
| 8 | Lens 4 | 6.553909147 | 2.213 | Glass | 1.609 | 61.98 | 6.375 |
| 9 | | −8.370818948 | 0.050 | | | | |
| 10 | Lens 5 | −309.8312771 | 1.494 | Glass | 2.003 | 19.32 | −5.611 |
| 11 | | 5.79800065 | 0.361 | | | | |
| 12 | Lens 6 | 5.438259454 | 5.000 | Glass | 1.626 | 58.42 | 9.049 |
| 13 | | 82.45234349 | 0.409 | | | | |
| 14 | IR-bandstop Filter | 1E+18 | 1.000 | BK_7 | 1.517 | 64.13 | |
| 15 | | 1E+18 | 1.213 | | | | |
| 16 | Image Plane | 1E+18 | 0.000 | | | | |

Reference Wavelength = 555 nm

Table 10: The Aspheric Coefficients of the Fifth Embodiment

TABLE 10

Aspheric Coefficients

| Surface No. | 1 | 2 | 3 | 4 | 5 | 6 | 8 |
|---|---|---|---|---|---|---|---|
| k | 0.000000E+00 | 0.000000E+00 | 5.145221E−02 | 2.221990E−03 | 5.078937E−03 | −6.610452E−02 | −9.215798E−02 |
| $A_4$ | −9.044622E−06 | 3.330375E−04 | 8.977547E−05 | 8.316463E−04 | 8.913196E−04 | 8.067903E−04 | 2.833138E−04 |
| $A_6$ | 0.000000E+00 | 0.000000E+00 | 0.000000E+00 | 0.000000E+00 | 0.000000E+00 | 0.000000E+00 | 0.000000E+00 |
| $A_8$ | 0.000000E+00 | 0.000000E+00 | 0.000000E+00 | 0.000000E+00 | 0.000000E+00 | 0.000000E+00 | 0.000000E+00 |
| $A_{10}$ | 0.000000E+00 | 0.000000E+00 | 0.000000E+00 | 0.000000E+00 | 0.000000E+00 | 0.000000E+00 | 0.000000E+00 |

| Surface No. | 9 | 10 | 11 | 12 | 13 |
|---|---|---|---|---|---|
| k | −1.091084E−04 | −7.119537E+01 | −1.898911E−02 | −8.950428E−02 | 1.814825E+00 |
| $A_4$ | 9.664308E−04 | −1.096479E−04 | 9.053700E−06 | 4.303931E−04 | 9.087982E−04 |
| $A_6$ | 0.000000E+00 | 0.000000E+00 | 0.000000E+00 | −5.396444E−05 | 1.430575E−04 |
| $A_8$ | 0.000000E+00 | 0.000000E+00 | 0.000000E+00 | 0.000000E+00 | 0.000000E+00 |
| $A_{10}$ | 0.000000E+00 | 0.000000E+00 | 0.000000E+00 | 0.000000E+00 | 0.000000E+00 |

In the fifth embodiment, the form of the aspheric surface equation is similar to that in the first embodiment. Besides, the definitions of parameters in following tables are similar to those in the first embodiment, so the repetitive details will not be given here.

The following values for the conditional expressions can be obtained from the data in Table 9 and Table 10:

| Fifth Embodiment (Primary Reference Wavelength = 555 nm) | | | | | |
|---|---|---|---|---|---|
| \|f/f1\| | \|f/f2\| | \|f/f3\| | \|f/f4\| | \|f/f5\| | \|f/f6\| |
| 0.47108 | 0.23887 | 0.08528 | 0.49054 | 0.55735 | 0.34556 |
| ΣPPR | ΣNPR | ΣPPR/\|ΣNPR\| | IN12/f | IN56/f | TP4/(IN34 + TP4 + IN45) |
| 0.92138 | 1.26730 | 0.72704 | 1.02515 | 0.11552 | 0.75103 |
| \|f1/f2\| | \|f2/f3\| | (TP1 + IN12)/TP2 | | (TP6 + IN56)/TP5 | |
| 0.50707 | 0.35700 | 1.73787 | | 3.58923 | |
| HOS | InTL | HOS/HOI | InS/HOS | ODT % | TDT % |
| 30.84160 | 28.21980 | 8.60776 | 0.38422 | −58.29760 | 38.24270 |
| HVT51 | HVT52 | HVT61 | HVT62 | HVT62/HOI | HVT62/ HOS |
| 0 | 0 | 0 | 0 | 0 | 0 |
| TP2/TP3 | TP3/TP4 | InRS61 | InRS62 | \|InRS61\|/TP6 | \|InRS62\|/TP6 |
| 0.94435 | 2.25940 | 0.78775 | 0.22621 | 0.15755 | 0.04524 |
| PSTA | PLTA | NSTA | NLTA | SSTA | SLTA |
| 0.012 mm | −0.003 mm | 0.002 mm | 0.009 mm | 0.009 mm | −0.002 mm |
| VSFS0 | VSFS3 | VSFS7 | VTFS0 | VTFS3 | VTFS7 |
| −0.000 | −0.000 | −0.000 | −0.000 | 0.010 | −0.000 |
| VSMTF0 | VSMTF3 | VSMTF7 | VTMTF0 | VTMTF3 | VTMTF7 |
| 0.876 | 0.863 | 0.845 | 0.876 | 0.848 | 0.740 |
| ISFS0 | ISFS3 | ISFS7 | ITFS0 | ITFS3 | ITFS7 |
| −0.000 | −0.000 | −0.000 | −0.000 | 0.010 | −0.000 |
| ISMTF0 | ISMTF3 | ISMTF7 | ITMTF0 | ITMTF3 | ITMTF7 |
| 0.890 | 0.886 | 0.883 | 0.890 | 0.884 | 0.833 |
| FS | AIFS | AVFS | AFS | | |
| 0.000 | 0.002 | 0.002 | 0.000 | | |

The values pertaining to the length of the outline curves are obtainable from the data in Table 9 and Table 10:

| Fifth Embodiment (Primary Reference Wavelength = 555 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 0.869 | 0.868 | −0.00058 | 99.93% | 5.000 | 17.36% |
| 12 | 0.869 | 0.876 | 0.00775 | 100.89% | 5.000 | 17.53% |
| 21 | 0.869 | 0.868 | −0.00035 | 99.96% | 4.722 | 18.39% |
| 22 | 0.869 | 0.869 | 0.00073 | 100.08% | 4.722 | 18.41% |
| 31 | 0.869 | 0.871 | 0.00206 | 100.24% | 5.000 | 17.41% |
| 32 | 0.869 | 0.871 | 0.00201 | 100.23% | 5.000 | 17.41% |
| 41 | 0.869 | 0.871 | 0.00192 | 100.22% | 2.213 | 39.34% |
| 42 | 0.869 | 0.870 | 0.00086 | 100.10% | 2.213 | 39.29% |
| 51 | 0.869 | 0.868 | −0.00065 | 99.92% | 1.494 | 58.11% |
| 52 | 0.869 | 0.871 | 0.00262 | 100.30% | 1.494 | 58.33% |
| 61 | 0.869 | 0.872 | 0.00310 | 100.36% | 5.000 | 17.44% |
| 62 | 0.869 | 0.868 | −0.00063 | 99.93% | 5.000 | 17.36% |
| ARS | EHD | ARS value | ARS − EHD | (ARS/EHD) % | TP | ARS/TP (%) |
| 11 | 9.966 | 10.063 | 0.09650 | 100.97% | 5.000 | 201.26% |
| 12 | 3.536 | 4.842 | 1.30517 | 136.91% | 5.000 | 96.83% |
| 21 | 3.500 | 3.517 | 0.01738 | 100.50% | 4.722 | 74.49% |
| 22 | 3.231 | 3.284 | 0.05277 | 101.63% | 4.722 | 69.54% |
| 31 | 3.093 | 3.202 | 0.10877 | 103.52% | 5.000 | 64.03% |
| 32 | 2.721 | 2.796 | 0.07486 | 102.75% | 5.000 | 55.91% |
| 41 | 2.504 | 2.571 | 0.06714 | 102.68% | 2.213 | 116.18% |
| 42 | 2.585 | 2.618 | 0.03269 | 101.26% | 2.213 | 118.30% |
| 51 | 2.561 | 2.561 | −0.00033 | 99.99% | 1.494 | 171.46% |
| 52 | 2.516 | 2.602 | 0.08639 | 103.43% | 1.494 | 174.23% |
| 61 | 2.872 | 3.020 | 0.14852 | 105.17% | 5.000 | 60.41% |
| 62 | 3.032 | 3.054 | 0.02233 | 100.74% | 5.000 | 61.09% |

The following values for the conditional expressions can be obtained from the data in Table 9 and Table 10.

| Values Related to Inflection Point of Fifth Embodiment (Primary Reference Wavelength = 555 nm) | | | | | | | |
|---|---|---|---|---|---|---|---|
| HIF411 | 0 | HIF411/HOI | 0 | SGI411 | 0 | \|SGI411\|/(\|SGI411\| + TP4) | 0 |

Sixth Embodiment

Figure 6A:
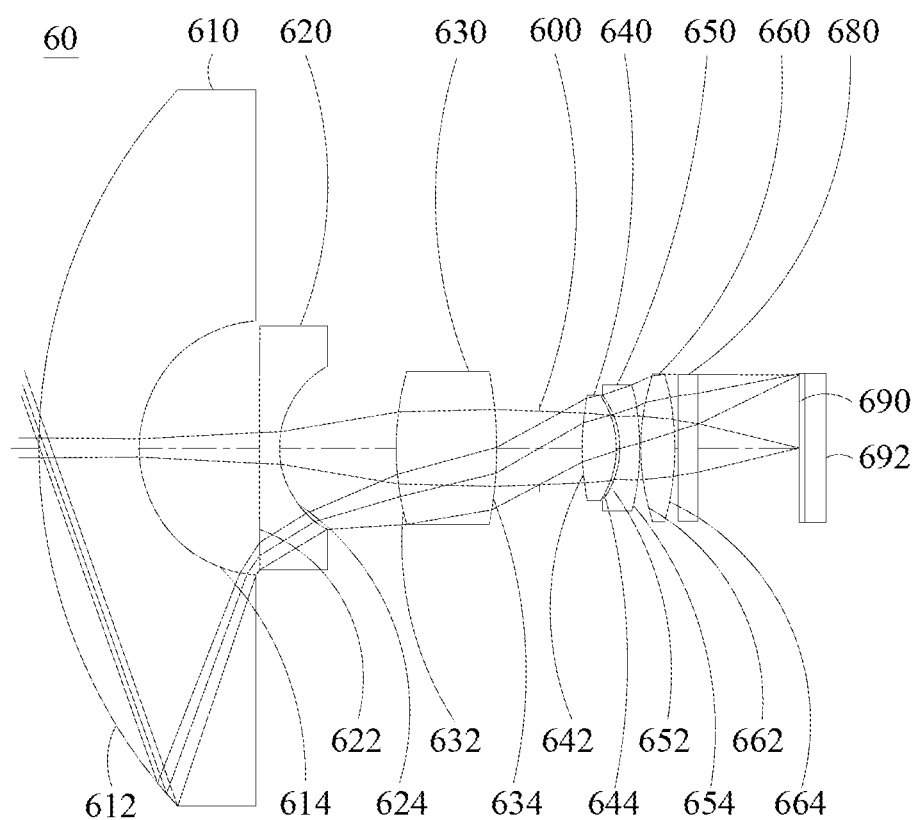
FIG. 6A is a schematic view of the optical image capturing system according to the sixth embodiment of the present invention.
Figure 6B:
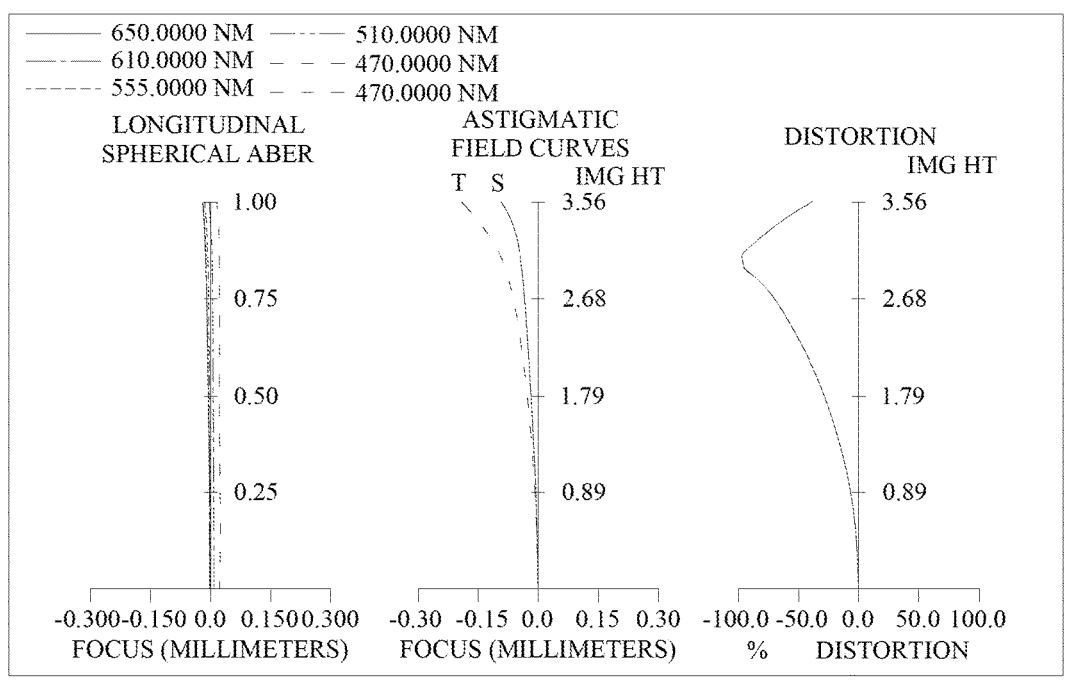
FIG. 6B shows the longitudinal spherical aberration curves, astigmatic field curves, and optical distortion curve of the optical image capturing system in the order from left to right according to the sixth embodiment of the present invention.
Figure 6C:
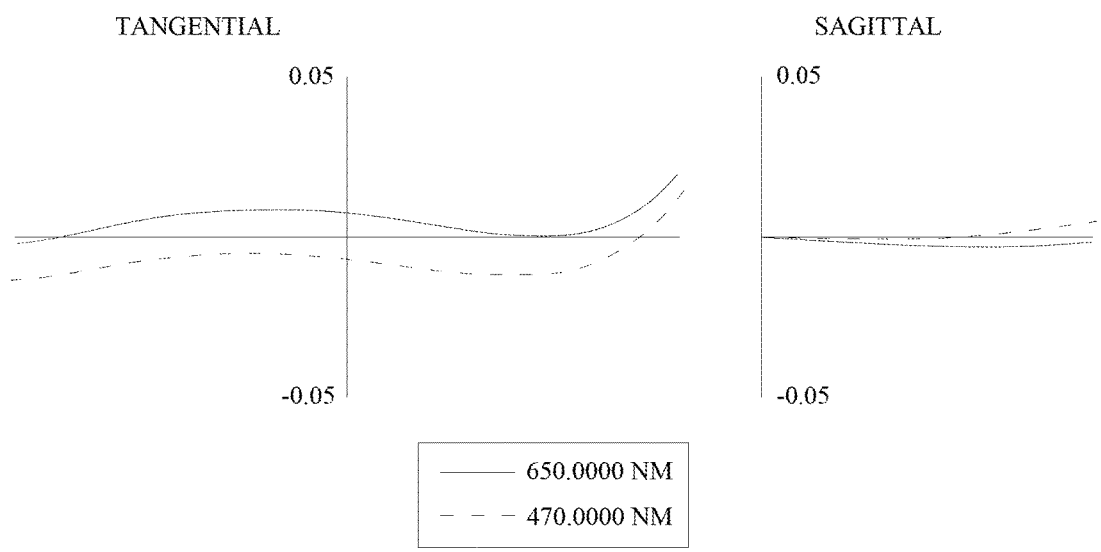
FIG. 6C is a transverse aberration diagram of the longest operation wavelength and the shortest operation wavelength for tangential fan and sagittal fan, in which the longest operation wavelength and the shortest operation wavelength pass through an edge of the entrance pupil and strike at the position of 0.7 HOI on the image plane, according to the sixth embodiment of the present invention.
Figure 6D:
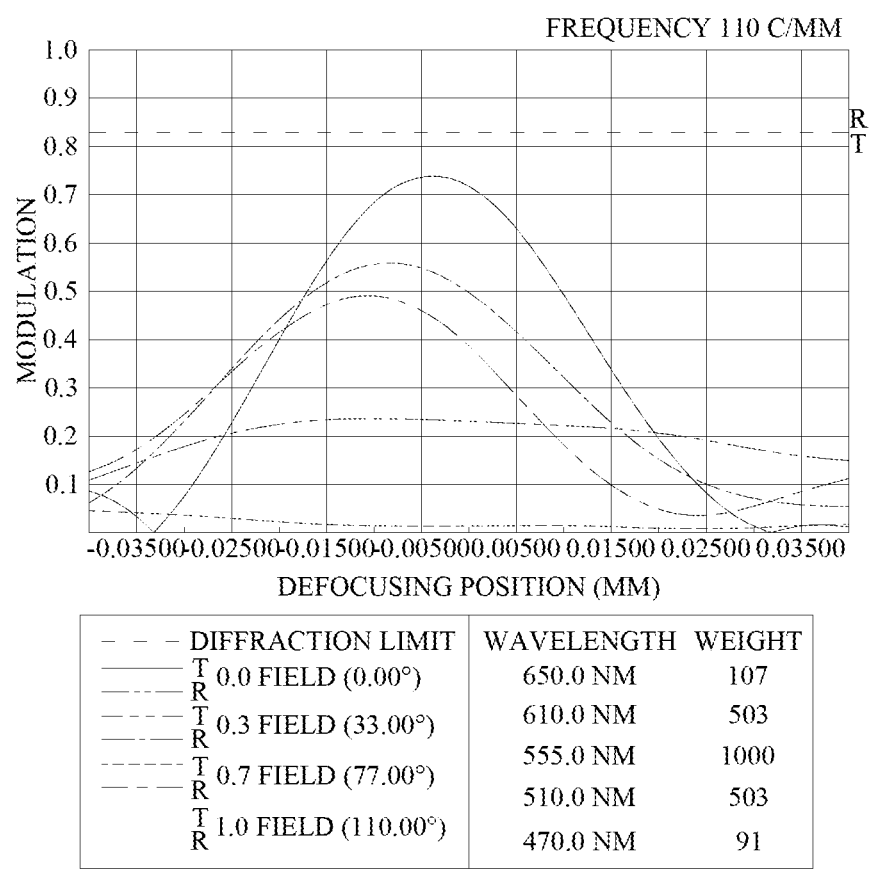
FIG. 6D is a diagram showing the through-focus MTF values of the visible light spectrum at the central field of view, 0.3 field of view, and 0.7 field of view of the sixth embodiment of the present invention.
Figure 6E:
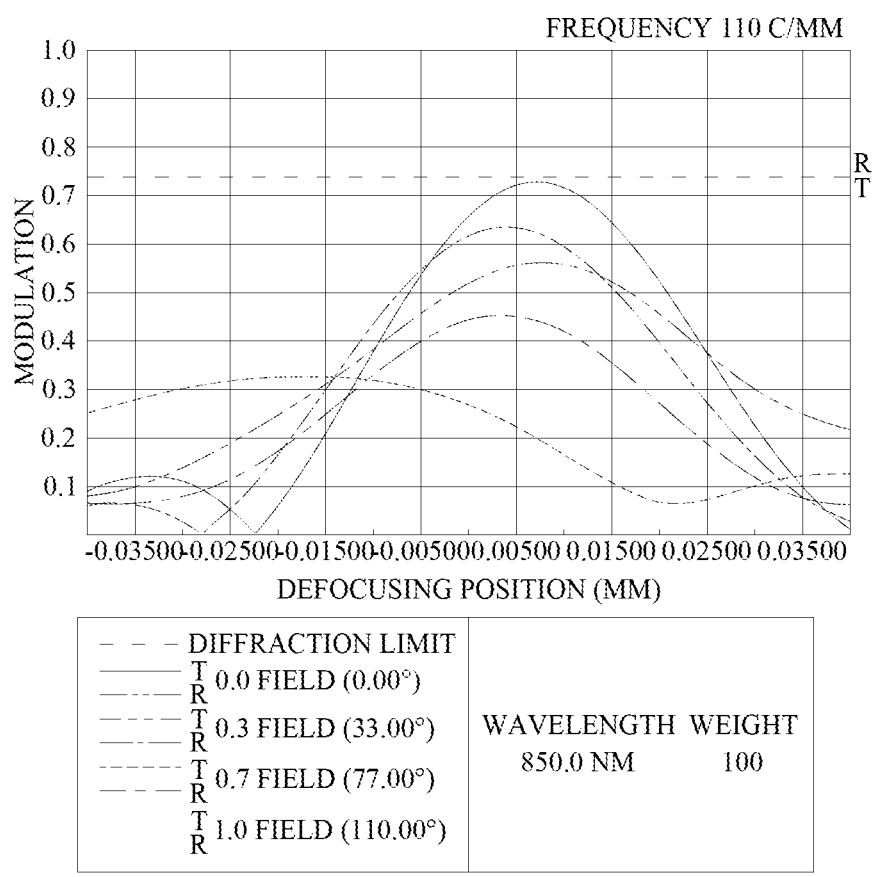
FIG. 6E is a diagram showing the through-focus MTF values of the infrared light spectrum at the central field of view, 0.3 field of view, and 0.7 field of view of the sixth embodiment of the present disclosure.

Please refer to FIGS. 6A to 6E. FIG. 6A is a schematic view of the optical image capturing system according to the sixth embodiment of the present invention. FIG. 6B shows the longitudinal spherical aberration curves, astigmatic field curves, and optical distortion curve of the optical image capturing system, in the order from left to right, according to the sixth embodiment of the present invention. FIG. 6C is a transverse aberration diagram at 0.7 HOI on the image plane of the optical image capturing system of the sixth embodiment. FIG. 6D is a diagram showing the through-focus MTF values of the visible light spectrum at the central field of view, 0.3 field of view, and 0.7 field of view of the sixth embodiment of the present invention. FIG. 6E is a diagram showing the through-focus MTF values of the infrared light spectrum at the central field of view, 0.3 field of view, and 0.7 field of view of the sixth embodiment of the present disclosure. As shown in FIG. 6A, in the order from an object side to an image side, the optical image capturing system includes a first lens element 610, a second lens element 620, a third lens element 630, an aperture stop 600, a fourth lens element 640, a fifth embodiment 650, a sixth embodiment 660, an IR-bandstop filter 680, an image plane 690, and an image sensing device 692.

The first lens element 610 has negative refractive power and is made of glass material. The first lens element 610 has a convex object-side surface 612 and a concave image-side surface 614.

The second lens element 620 has negative refractive power and is made of glass material. The second lens element 620 has a convex object-side surface 622 and a concave image-side surface 624.

The third lens element 630 has positive refractive power and is made of glass material. The third lens element 630 has a convex object-side surface 632 and a convex image-side surface 634.

The fourth lens element 640 has positive refractive power and is made of glass material. The fourth lens element 640 has a convex object-side surface 642 and a convex image-side surface 644.

The fifth lens element 650 has negative refractive power and is made of glass material. The fifth lens element 650 has a concave object-side surface 652 and a convex image-side surface 654.

The sixth lens element 660 has positive refractive power and is made of glass material. The sixth lens element 660 has a convex object-side surface 662 and a convex image-side surface 664. With this configuration, the back focal distance of the optical image capturing system may be shortened and the system may be minimized. Besides, the incident angle of the off-axis rays can be reduced effectively, thereby further correcting the off-axis aberration.

The IR-bandstop filter 680 is made of glass material and is disposed between the sixth lens element 660 and the image plane 690, without affecting the focal length of the optical image capturing system.

Table 11 and Table 12 below should be incorporated into the reference of the present embodiment.

TABLE 11

Lens Parameters for the Sixth Embodiment
f(focal length) = 2.124 mm; f/HEP = 2.2; HAF(half angle of view) = 110 deg

| Surface No. | | Curvature Radius | Thickness (mm) | Material | Refractive Index | Abbe No. | Focal Length |
|---|---|---|---|---|---|---|---|
| 0 | Object | 1E+18 | 1E+18 | | | | |
| 1 | Lens 1 | 25.10767651 | 5.000 | Glass | 2.001 | 29.13 | −9.285 |
| 2 | | 6.132862678 | 5.989 | | | | |
| 3 | Lens 2 | 815.0717393 | 1.000 | Glass | 1.599 | 66.37 | −7.445 |
| 4 | | 4.444833556 | 5.803 | | | | |
| 5 | Lens 3 | 13.03307924 | 5.000 | Glass | 1.849 | 34.26 | 9.740 |
| 6 | | −18.90345949 | 2.151 | | | | |
| 7 | Aperture Stop | 1E+18 | 2.115 | | | | |
| 8 | Lens 4 | 13.09930283 | 1.689 | Glass | 1.593 | 68.62 | 5.873 |
| 9 | | −4.530224397 | 0.173 | | | | |
| 10 | Lens 5 | −4.20527175 | 1.000 | Glass | 2.003 | 19.32 | −6.811 |
| 11 | | −12.07694553 | 0.050 | | | | |
| 12 | Lens 6 | 10.89874425 | 1.698 | Glass | 1.593 | 68.62 | 10.058 |
| 13 | | −12.47490715 | 0.169 | | | | |
| 14 | IR-bandstop Filter | 1E+18 | 1.000 | BK_7 | 1.517 | 64.13 | |
| 15 | | 1E+18 | 5.027 | | | | |
| 16 | Image Plane | 1E+18 | 0.000 | | | | |

Reference Wavelength = 555 nm; Shield Position: The 11$^{th}$ surface with effective aperture radius of 3.050 mm Table 12: The Aspheric Coefficients of the Sixth Embodiment

TABLE 12

Aspheric Coefficients

| Surface No. | 1 | 2 | 3 | 4 | 5 | 6 | 8 |
|---|---|---|---|---|---|---|---|
| k | 0.000000E+00 | 0.000000E+00 | 0.000000E+00 | 0.000000E+00 | 0.000000E+00 | 0.000000E+00 | 0.000000E+00 |
| $A_4$ | 0.000000E+00 | 0.000000E+00 | 0.000000E+00 | 0.000000E+00 | 0.000000E+00 | 0.000000E+00 | 0.000000E+00 |
| $A_6$ | 0.000000E+00 | 0.000000E+00 | 0.000000E+00 | 0.000000E+00 | 0.000000E+00 | 0.000000E+00 | 0.000000E+00 |
| $A_8$ | 0.000000E+00 | 0.000000E+00 | 0.000000E+00 | 0.000000E+00 | 0.000000E+00 | 0.000000E+00 | 0.000000E+00 |
| $A_{10}$ | 0.000000E+00 | 0.000000E+00 | 0.000000E+00 | 0.000000E+00 | 0.000000E+00 | 0.000000E+00 | 0.000000E+00 |

| Surface No. | 9 | 10 | 11 | 12 | 13 |
|---|---|---|---|---|---|
| k | 0.000000E+00 | 0.000000E+00 | 0.000000E+00 | 0.000000E+00 | 0.000000E+00 |
| $A_4$ | 0.000000E+00 | 0.000000E+00 | 0.000000E+00 | 0.000000E+00 | 0.000000E+00 |
| $A_6$ | 0.000000E+00 | 0.000000E+00 | 0.000000E+00 | 0.000000E+00 | 0.000000E+00 |
| $A_8$ | 0.000000E+00 | 0.000000E+00 | 0.000000E+00 | 0.000000E+00 | 0.000000E+00 |
| $A_{10}$ | 0.000000E+00 | 0.000000E+00 | 0.000000E+00 | 0.000000E+00 | 0.000000E+00 |

In the sixth embodiment, the form of the aspheric surface equation is similar to that in the first embodiment. Besides, the definitions of parameters in following tables are similar to those in the first embodiment, so the repetitive details will not be given here.

The following values for the conditional expressions can be obtained from the data in Table 11 and Table 12:

| Sixth Embodiment (Primary Reference Wavelength = 555 nm) | | | | | |
|---|---|---|---|---|---|
| \|f/f1\| | \|f/f2\| | \|f/f3\| | \|f/f4\| | \|f/f5\| | \|f/f6\| |
| 0.22875 | 0.28530 | 0.21805 | 0.36166 | 0.31185 | 0.21116 |
| ΣPPR | ΣNPR | ΣPPR/\|ΣNPR\| | IN12/f | IN56/f | TP4/(IN34 + TP4 + IN45) |
| 1.23713 | 0.51405 | 2.40663 | 2.81976 | 0.02354 | 0.27561 |
| \|f1/f2\| | \|f2/f3\| | (TP1 + IN12)/TP2 | | (TP6 + IN56)/TP5 | |
| 1.24718 | 0.76430 | 10.98894 | | 1.74830 | |
| HOS | InTL | HOS/HOI | InS/HOS | ODT % | TDT % |
| 37.86470 | 31.66910 | 10.56788 | 0.34125 | −161.40000 | 118.88600 |
| HVT51 | HVT52 | HVT61 | HVT62 | HVT62/HOI | HVT62/HOS |
| 0 | 0 | 0 | 0 | 0 | 0 |
| TP2/TP3 | TP3/TP4 | InRS61 | InRS62 | \|InRS61\|/TP6 | \|InRS62\|/TP6 |
| 0.20000 | 2.96019 | 0.57225 | −0.51589 | 0.33696 | 0.30377 |
| PSTA | PLTA | NSTA | NLTA | SSTA | SLTA |
| 0.015 mm | 0.021 mm | −0.014 mm | −0.002 mm | 0.005 mm | −0.002 mm |
| VSFS0 | VSFS3 | VSFS7 | VTFS0 | VTFS3 | VTFS7 |
| −0.005 | −0.005 | −0.005 | −0.005 | −0.005 | −0.020 |
| VSMTF0 | VSMTF3 | VSMTF7 | VTMTF0 | VTMTF3 | VTMTF7 |
| 0.875 | 0.782 | 0.754 | 0.875 | 0.594 | 0.196 |
| ISFS0 | ISFS3 | ISFS7 | ITFS0 | ITFS3 | ITFS7 |
| 0.005 | 0.005 | 0.010 | 0.005 | 0.010 | −0.005 |
| ISMTF0 | ISMTF3 | ISMTF7 | ITMTF0 | ITMTF3 | ITMTF7 |
| 0.863 | 0.811 | 0.730 | 0.863 | 0.755 | 0.519 |
| FS | AIFS | AVFS | AFS | | |
| 0.010 | 0.005 | −0.008 | 0.013 | | |

The values pertaining to the length of the outline curves are obtainable from the data in Table 11 and Table 12:

| Sixth Embodiment (Primary Reference Waveleneth = 555 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 0.483 | 0.482 | −0.00068 | 99.86% | 5.000 | 9.64% |
| 12 | 0.483 | 0.482 | −0.00021 | 99.96% | 5.000 | 9.65% |
| 21 | 0.483 | 0.482 | −0.00071 | 99.85% | 1.000 | 48.20% |
| 22 | 0.483 | 0.483 | 0.00024 | 100.05% | 1.000 | 48.29% |
| 31 | 0.483 | 0.482 | −0.00060 | 99.88% | 5.000 | 9.64% |
| 32 | 0.483 | 0.482 | −0.00066 | 99.86% | 5.000 | 9.64% |
| 41 | 0.483 | 0.482 | −0.00060 | 99.88% | 1.689 | 28.54% |
| 42 | 0.483 | 0.483 | 0.00020 | 100.04% | 1.689 | 28.59% |
| 51 | 0.483 | 0.483 | 0.00035 | 100.07% | 1.000 | 48.31% |
| 52 | 0.483 | 0.482 | −0.00058 | 99.88% | 1.000 | 48.21% |
| 61 | 0.483 | 0.482 | −0.00055 | 99.89% | 1.698 | 28.39% |
| 62 | 0.483 | 0.482 | −0.00059 | 99.88% | 1.698 | 28.39% |

| ARS | EHD | ARS value | ARS − EHD | (ARS/EHD) % | TP | ARS/TP (%) |
|---|---|---|---|---|---|---|
| 11 | 17.550 | 19.433 | 1.88282 | 110.73% | 5.000 | 388.66% |
| 12 | 6.129 | 9.389 | 3.26039 | 153.20% | 5.000 | 187.78% |
| 21 | 5.991 | 5.991 | −0.00017 | 100.00% | 1.000 | 599.11% |
| 22 | 3.968 | 4.904 | 0.93606 | 123.59% | 1.000 | 490.42% |
| 31 | 3.723 | 3.775 | 0.05162 | 101.39% | 5.000 | 75.49% |
| 32 | 3.008 | 3.020 | 0.01189 | 100.40% | 5.000 | 60.40% |
| 41 | 2.547 | 2.562 | 0.01549 | 100.61% | 1.689 | 151.70% |
| 42 | 2.626 | 2.800 | 0.17394 | 106.62% | 1.689 | 165.76% |
| 51 | 2.606 | 2.811 | 0.20450 | 107.85% | 1.000 | 281.06% |
| 52 | 3.050 | 3.082 | 0.03236 | 101.06% | 1.000 | 308.24% |
| 61 | 3.496 | 3.558 | 0.06232 | 101.78% | 1.698 | 209.50% |
| 62 | 3.562 | 3.612 | 0.05023 | 101.41% | 1.698 | 212.70% |

The following values for the conditional expressions can be obtained from the data in Table 11 and Table 12:

| Values Related to Inflection Point of Sixth Embodiment (Primary Reference Wavelength = 555 nm) | | | | | | | |
|---|---|---|---|---|---|---|---|
| HIF411 | 0 | HIF411/HOI | 0 | SGI411 | 0 | \|SGI411\|/ (\|SGI411\| + TP4) | 0 |

Although the present invention is disclosed by the aforementioned embodiments, those embodiments do not serve to limit the scope of the present invention. A person skilled in the art could perform various alterations and modifications to the present invention, without departing from the spirit and the scope of the present invention. Hence, the scope of the present invention should be defined by the following appended claims.

Despite the fact that the present invention is specifically presented and illustrated with reference to the exemplary embodiments thereof, it should be apparent to a person skilled in the art that, various modifications could be performed to the forms and details of the present invention, without departing from the scope and spirit of the present invention defined in the claims and their equivalence.

What is claimed is:

1. An optical image capturing system, from an object side to an image side, comprising:
   a first lens element with refractive power;
   a second lens element with refractive power;
   a third lens element with refractive power;
   a fourth lens element with refractive power;
   a fifth lens element with refractive power;
   a sixth lens element with refractive power;
   a first image plane, which is an image plane specifically for visible light and perpendicular to an optical axis; a through-focus modulation transfer rate (value of MTF) at a first spatial frequency having a maximum value at central field of view of the first image plane; and
   a second image plane, which is an image plane specifically for infrared light and perpendicular to the optical axis; the through-focus modulation transfer rate (value of MTF) at the first spatial frequency having a maximum value at central of field of view of the second image plane;
   wherein the optical image capturing system comprises only six lens elements with refractive powers, and the optical image capturing system has a maximum image height HOI on the first image plane that is perpendicular to the optical axis; at least one of the six lens elements has positive refractive power; focal lengths of the six lens elements are respectively f1, f2, f3, f4, f5 and f6, and a focal length of the optical image capturing system is f, and an entrance pupil diameter of the optical image capturing system is HEP; a distance on the optical axis from an object-side surface of the first lens element to the first image plane is HOS, a distance on the optical axis from the object-side surface of the first lens element to an image-side surface of the sixth lens element is InTL, half of a maximum angle of view of the optical image capturing system is denoted by HAF; a distance on the optical axis between the first image plane and the second image plane is denoted by FS; conditions as follows are satisfied: 1.0≤f/HEP≤10.0, 0 deg<HAF≤150 deg, and |FS|≤60 μm.

2. The optical image capturing system of claim 1, wherein a wavelength of the infrared light ranges from 700 nm to 1300 nm, and the first spatial frequency is denoted by SP1, which satisfies the following condition: SP1≤440 cycles/mm.

3. The optical image capturing system of claim 1, wherein an outline curve starting from an axial point on any surface of any one of the six lens elements, tracing along an outline of the surface, and ending at a coordinate point on the surface that has a vertical height of ½ entrance pupil diameter from the optical axis, has a length denoted by ARE, the following condition is satisfied: 0.9≤2(ARE/HEP)≤2.0.

4. The optical image capturing system of claim 1, wherein at least one lens element among the first lens element to the sixth lens element is made of glass.

5. The optical image capturing system of claim 1, wherein the optical image capturing system satisfies the following condition: HOS/HOI≥1.2.

6. The optical image capturing system of claim 1, wherein an outline curve starting from an axial point on an object-side surface of the sixth lens element, tracing along an outline of the object-side surface, and ending at a coordinate point on the surface that has a vertical height of ½ entrance pupil diameter from the optical axis, has a length denoted by ARE61; an outline curve starting from an axial point on the image-side surface of the sixth lens element, tracing along an outline of the image-side surface, and ending at a coordinate point on the surface that has a vertical height of ½ entrance pupil diameter from the optical axis, has a length denoted by ARE62; a central thickness of the sixth lens element on the optical axis is TP6, which satisfies the conditions as follows: 0.05≤ARE61/TP6≤35, and 0.05≤ARE62/TP6≤35.

7. The optical image capturing system of claim 1, wherein TV distortion for image formation in the optical image capturing system is TDT; transverse aberration of visible rays with longest operation wavelength from a positive-directional tangential ray fan, which pass through an edge of an entrance pupil and strike at a position of 0.7 HOI on the first image plane, is denoted by PLTA, and transverse aberration of visible rays with shortest operation wavelength from the positive-directional tangential ray fan, which pass through the edge of the entrance pupil and strike at the position of 0.7 HOI on the first image plane, is denoted by PSTA; transverse aberration of visible rays with the longest operation wavelength from a negative-directional tangential ray fan, which pass through the edge of the entrance pupil and strike at the position of 0.7 HOI on the first image plane, is denoted by NLTA, and transverse aberration of visible rays with the shortest operation wavelength from a negative-directional tangential ray fan, which pass through the edge of the entrance pupil and strike at the position of 0.7 HOI on the first image plane, is denoted by NSTA; transverse aberration of visible rays with the longest operation wavelength from a sagittal ray fan, which pass through the edge of the entrance pupil and strike at the position of 0.7 HOI on the first image plane, is denoted by SLTA, transverse aberration of visible rays with the shortest operation wavelength from the sagittal ray fan, which pass through the edge of the entrance pupil and strike at the position of 0.7 HOI on the first image plane, is denoted by SSTA; conditions as follows are satisfied: PLTA≤100 μm, PSTA≤100 μm, NLTA≤100 μm, NSTA≤100 μm, SLTA≤=100 μm, SSTA≤5100 μm, and |TDT|<250%.

8. The optical image capturing system of claim 1, further comprising an aperture stop; wherein a distance from the aperture stop to the first image plane on the optical axis is InS, which satisfies condition as follows: 0.2≤InS/HOS≤1.1.

9. An optical image capturing system, from an object side to an image side, comprising:
a first lens element with refractive power;
a second lens element with refractive power;
a third lens element with refractive power;
a fourth lens element with refractive power;
a fifth lens element with refractive power;
a sixth lens element with refractive power;
a first image plane, which is an image plane specifically for visible light and perpendicular to an optical axis; a through-focus modulation transfer rate (value of MTF) at a first spatial frequency having a maximum value at central field of view of the first image plane, and the first spatial frequency being 110 cycles/mm; and
a second image plane, which is an image plane specifically for infrared light and perpendicular to the optical axis; the through-focus modulation transfer rate (value of MTF) at the first spatial frequency having a maximum value at central of field of view of the second image plane, and the first spatial frequency being 110 cycles/mm,
wherein the optical image capturing system comprises only six lens elements with refractive powers; the optical image capturing system has a maximum image height HOI on the first image plane that is perpendicular to the optical axis; at least one of the six elements is made of glass and has positive refractive power; focal lengths of the six lens elements are respectively f1, f2, f3, f4, f5 and f6; a focal length of the optical image capturing system is f; an entrance pupil diameter of the optical image capturing system is denoted by HEP; a distance on an optical axis from an object-side surface of the first lens element to the first image plane is HOS, a distance on the optical axis from the object-side surface of the first lens element to an image-side surface of the sixth lens element is InTL, and half of a maximum angle of view of the optical image capturing system is denoted by HAF; a distance on the optical axis between the first image plane and the second image plane is denoted by FS; an outline curve starting from an axial point on any surface of any one of the six lens elements, tracing along an outline of the surface, and ending at a coordinate point on the surface that has a vertical height of ½ entrance pupil diameter from the optical axis, has a length denoted by ARE; conditions as follows are satisfied: 1.0≤f/HEP≤10.0, 0 deg<HAF≤150 deg, |FS|≤60 μm, and 0.9≤2(ARE/HEP)≤2.0.

10. The optical image capturing system of claim 9, wherein there is an air gap between any pair of adjacent lens elements among the six lens elements.

11. The optical image capturing system of claim 9, wherein a maximum effective half diameter of any surface of any one of the six lens elements is denoted by EHD; an outline curve starting from the axial point on any surface of any one of those lens elements, tracing along an outline of the surface, and ending at a point which defines the maximum effective half diameter, has a length denoted by ARS; conditions as follows are satisfied: 0.9≤ARS/EHD≤2.0.

12. The optical image capturing system of claim 9, wherein the six lens elements are all made from glass.

13. The optical image capturing system of claim 9, wherein the optical image capturing system satisfies the following condition: HOS/HOI≥1.4.

14. The optical image capturing system of claim 9, wherein at least one lens element among the first lens element, the second lens element, the third lens element, the fourth lens element, the fifth lens element and the sixth lens element is a filtering element for light with wavelength of less than 500 nm.

15. The optical image capturing system of claim 9, wherein a distance on the optical axis between the fifth lens element and the sixth lens element is IN56, which satisfies condition as follows: 0<IN56/f≤3.0.

16. The optical image capturing system of claim 9, wherein a distance on the optical axis between the fifth lens element and the sixth lens element is IN56, and central thicknesses of the fifth and sixth lens elements on the optical axis are TP5 and TP6, respectively; the following conditions are satisfied: 0.1≤(TP6+IN56)/TP5≤50.

17. The optical image capturing system of claim 9, wherein at least one lens element among the first to sixth lens elements has at least one inflection point on at least one surface thereof.

18. An optical image capturing system, from an object side to an image side, comprising:
 a first lens element with refractive power;
 a second lens element with refractive power;
 a third lens element with refractive power;
 a fourth lens element with refractive power;
 a fifth lens element with refractive power;
 a sixth lens element with refractive power;
 a first average image plane, which is an image plane specifically for visible light and perpendicular to an optical axis; the first average image plane being installed at the average position of the defocusing positions, where through-focus modulation transfer rates (values of MTF) of the visible light at central field of view, 0.3 field of view, and 0.7 field of view are respectively at corresponding maximum value at a first spatial frequency; the first spatial frequency being 110 cycles/mm; and
 a second average image plane, which is an image plane specifically for infrared light and perpendicular to the optical axis; the second average image plane being installed at the average position of the defocusing positions, where through-focus modulation transfer rates of the infrared light (values of MTF) at central field of view, 0.3 field of view, and 0.7 field of view are at their respective maximum at the first spatial frequency; the first spatial frequency being 110 cycles/mm;
 wherein the optical image capturing system comprises only six lens elements with refractive powers; at least one of the first to sixth lens elements is made of glass; the optical image capturing system has a maximum image height HOI on the first average image plane that is perpendicular to the optical axis; focal lengths of the first lens element to the sixth lens elements are f1, f2, f3, f4, f5 and f6, respectively; a focal length of the optical image capturing system is f; an entrance pupil diameter of the optical image capturing system is HEP; a distance on the optical axis from an object-side surface of the first lens element to the first average image plane is HOS; a distance on the optical axis from the object-side surface of the first lens element to an image-side surface of the sixth lens element is InTL, half of a maximum angle of view of the optical image capturing system is denoted by HAF; an outline curve starting from an axial point on any surface of any one of the six lens elements, tracing along an outline of the surface, and ending at a coordinate point on the surface that has a vertical height of ½ entrance pupil diameter from the optical axis, has a length denoted by ARE; a distance on the optical axis between the first average image plane and the second average image plane is denoted by AFS, and conditions as follows are satisfied: 1≤f/HEP≤10, 0 deg<HAF≤150 deg, |AFS|≤60 μm, and 0.9≤2(ARE/HEP)≤2.0.

19. The optical image capturing system of claim 18, wherein a maximum effective half diameter of any surface of any one of the six lens elements is denoted by EHD; an outline curve starting from the axial point on any surface of any one of those lens elements, tracing along an outline of the surface, and ending at a point which defines the maximum effective half diameter, has a length denoted by ARS; conditions as follows are satisfied: 0.9≤ARS/EHD≤2.0.

20. The optical image capturing system of claim 18, wherein there is an air gap between any pair of adjacent lens elements among the six lens elements.

21. The optical image capturing system of claim 18, wherein the optical image capturing system satisfies the following condition: HOS/HOI≥1.6.

22. The optical image capturing system of claim 18, wherein a linear magnification of an image formed by the optical image capturing system on the second average image plane is LM, which satisfies the following condition: LM≥0.0003.

23. The optical image capturing system of claim 18, further comprising an aperture stop and an image sensing device; wherein the image sensing device is disposed on the first average image plane and comprises at least 100 thousand pixels, a distance on the optical axis from the aperture stop to the first average image plane is InS; condition as follows is satisfied: 0.2≤InS/HOS≤1.1.

* * * * *